(12) United States Patent
Ham et al.

(10) Patent No.: US 11,768,654 B2
(45) Date of Patent: Sep. 26, 2023

(54) DISPLAY APPARATUS INCLUDING A VIBRATION DEVICE

(71) Applicant: LG Display Co., Ltd., Seoul (KR)

(72) Inventors: Sungsu Ham, Paju-si (KR); Sungtae Lee, Paju-si (KR); Joongsup Han, Paju-si (KR); Uihyeon Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 178 days.

(21) Appl. No.: 17/190,788

(22) Filed: Mar. 3, 2021

(65) Prior Publication Data

US 2021/0279026 A1    Sep. 9, 2021

(30) Foreign Application Priority Data

Mar. 4, 2020  (KR) .................. 10-2020-0027267

(51) Int. Cl.
*G06F 3/16* (2006.01)
*G06F 1/16* (2006.01)
*G10K 9/122* (2006.01)

(52) U.S. Cl.
CPC .............. *G06F 3/16* (2013.01); *G06F 1/1605* (2013.01); *G10K 9/122* (2013.01)

(58) Field of Classification Search
CPC ..... G06F 3/01; G06F 3/16; G06F 1/16; G06F 1/1605; G10K 9/122; G10K 9/125; H01L 51/52; H01L 41/00; H01L 41/04; H01L 41/08; H01L 41/09; H01L 41/22; H01L 41/25; H01L 41/18; H01L 41/37; H01L 41/083; H01L 41/113; H01L 41/047; H01L 41/187; H01L 41/193; H01L 41/257; H04R 1/00; H04R 1/02; H04R 1/32; H04R 5/02; H04R 17/00; H04N 5/64; A61B 8/00; A61B 8/14

See application file for complete search history.

(56) References Cited

U.S. PATENT DOCUMENTS

| | | | |
|---|---|---|---|
| 9,839,411 B2 * | 12/2017 | Nishikubo | ........... A61B 8/4494 |
| 10,609,500 B2 | 3/2020 | Bocko | |
| 11,297,439 B2 | 4/2022 | Shin et al. | |
| 2006/0078138 A1 * | 4/2006 | Wada | ..................... H04R 1/028 381/306 |

(Continued)

FOREIGN PATENT DOCUMENTS

| | | |
|---|---|---|
| CN | 108293166 A | 7/2018 |
| CN | 110854262 A | 2/2020 |

(Continued)

OTHER PUBLICATIONS

Office Action dated Mar. 24, 2022, issued in corresponding Taiwanese Patent Application No. 110107650.

(Continued)

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

A display apparatus includes a display panel configured to display an image, and a vibration device on a rear surface of the display panel to vibrate the display panel to generate a sound, the vibration device including a vibration array including a plurality of vibration modules.

43 Claims, 17 Drawing Sheets

(56) References Cited

U.S. PATENT DOCUMENTS

| | | | | |
|---|---|---|---|---|
| 2009/0127977 | A1* | 5/2009 | So | H01L 27/20 |
| | | | | 310/322 |
| 2011/0006638 | A1* | 1/2011 | Ostrovskii | H03H 9/568 |
| | | | | 310/320 |
| 2012/0220872 | A1* | 8/2012 | Nishikubo | B06B 1/064 |
| | | | | 600/443 |
| 2013/0077443 | A1* | 3/2013 | Onishi | G01S 7/521 |
| | | | | 310/322 |
| 2013/0167881 | A1* | 7/2013 | Korbler | H01L 41/37 |
| | | | | 29/25.35 |
| 2014/0159542 | A1* | 6/2014 | Lee | H01L 41/45 |
| | | | | 29/25.35 |
| 2015/0341714 | A1* | 11/2015 | Ahn | H04M 1/03 |
| | | | | 381/333 |
| 2017/0280234 | A1* | 9/2017 | Choi | G06F 1/1605 |
| 2019/0018448 | A1* | 1/2019 | Lee | H04R 1/025 |
| 2019/0028669 | A1* | 1/2019 | Shin | G02F 1/133308 |
| 2021/0124423 | A1* | 4/2021 | Fan | G06F 1/1652 |
| 2022/0123267 | A1* | 4/2022 | Menke | H01L 51/5268 |
| 2022/0125590 | A1* | 4/2022 | Friis | A61F 2/30771 |

FOREIGN PATENT DOCUMENTS

| | | |
|---|---|---|
| JP | 3168484 U | 6/2011 |
| JP | 2019-504531 A | 2/2019 |

OTHER PUBLICATIONS

Office Action dated Apr. 20, 2022, issued in corresponding Japanese Patent Application No. 2021-034499.

* cited by examiner

DISPLAY APPARATUS INCLUDING A VIBRATION DEVICE

CROSS-REFERENCE TO RELATED APPLICATIONS

This application claims the benefit of and priority to Korean Patent Application No. 10-2020-0027267 filed on Mar. 4, 2020, the entirety of which is hereby incorporated by reference.

BACKGROUND

Technical Field

The present disclosure relates to a display apparatus.

Discussion of the Related Art

In display apparatuses, a display panel displays an image, and a separate speaker should be installed for providing a sound. When a speaker is in a display apparatus, the speaker occupies a space; due to this, the design and spatial disposition of the display apparatus are limited.

A speaker applied to display apparatuses may be, for example, an actuator, including a magnet and a coil. However, when the actuator is applied to the display apparatuses, a thickness thereof is large. Piezoelectric elements that enable thinness to be implemented are attracting much attention.

Because the piezoelectric elements are fragile, the piezoelectric elements are easily damaged by an external impact, and thus the reliability of sound reproduction is low. Also, when a speaker such as a piezoelectric element is applied to a flexible display apparatus, there is a problem where damage occurs due to a fragile characteristic.

SUMMARY

The inventors have recognized problems described above and have performed various experiments for implementing a vibration device for enhancing the quality of a sound and a sound pressure characteristic. Therefore, through the various experiments, the inventors have invented a display apparatus having a new structure, which includes a vibration device for enhancing the quality of a sound and a sound pressure characteristic.

Accordingly, embodiments of the present disclosure are directed to a display apparatus that substantially obviates one or more problems due to limitations and disadvantages of the related art.

An aspect of the present disclosure is to provide a display apparatus including a vibration device, which is disposed on a rear surface of a display panel and vibrates the display panel to generate a sound, thereby enhancing a sound pressure characteristic.

Additional features and aspects will be set forth in part in the description that follows, and in part will become apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display panel configured to display an image, and a vibration device on a rear surface of the display panel to vibrate the display panel to generate a sound, the vibration device including a vibration array including a plurality of vibration modules.

In another aspect of the present disclosure, a display apparatus comprises a display panel configured to display an image and including a first region and a second region, a first vibration array in the first region, the first vibration array including a plurality of first vibration modules, and a second vibration array in the second region, the second vibration array including a plurality of second vibration modules.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1:
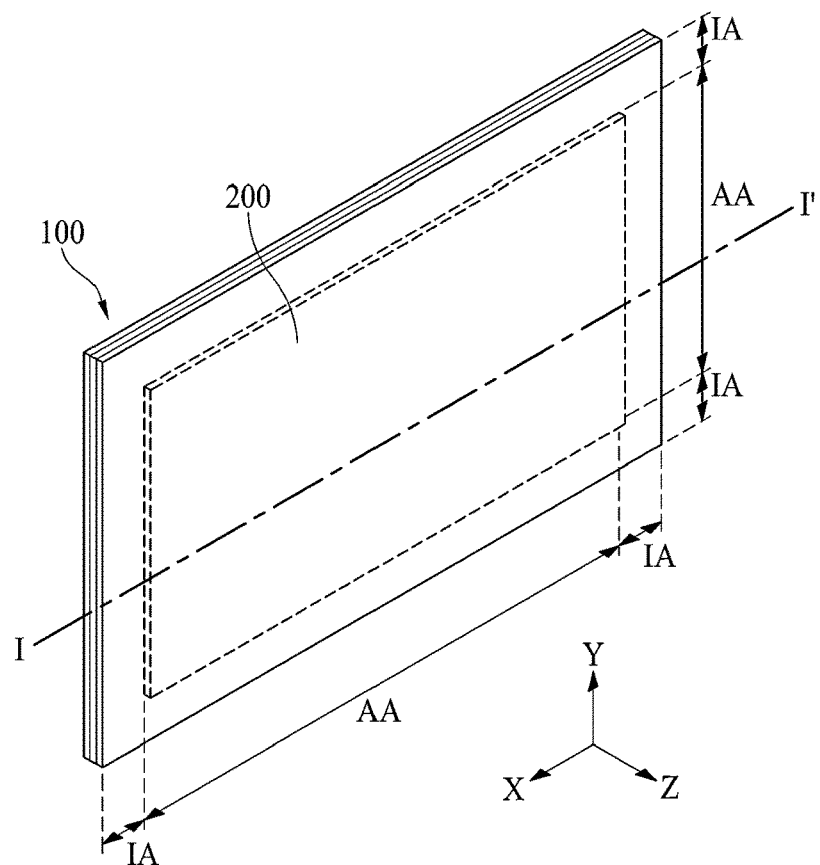
FIG. 1 illustrates a display apparatus according to an embodiment of the present disclosure.

Reference will now be made in detail to embodiments of the present disclosure, examples of which may be illustrated in the accompanying drawings.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

Throughout the drawings and the detailed description, unless otherwise described, the same drawing reference numerals should be understood to refer to the same elements, features, and structures. The relative size and depiction of these elements may be exaggerated for clarity, illustration, and convenience. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used. In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms.

The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to the present embodiment may use all types of display panels such as a liquid crystal display panel, an organic light emitting diode (OLED) display panel, and an electroluminescent display panel, but is not limited to a specific display panel, which is vibrated by a sound generation device according to the present embodiment to output a sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot light emitting layer, or the like). As another example, the layer provided on the array substrate may include a micro light emitting diode.

The display panel may further include a backing such as a metal plate attached on the display panel. However, the present embodiment is not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

In a case where a speaker is provided in a display apparatus so as to realize a sound in the display apparatus, the speaker may be implemented as a film type, and thus, a thickness of the display apparatus may be thin. A film-type vibration module may be manufactured to have a large area, and may be applied to a display apparatus having a large area. However, because the film type vibration module is low in a piezoelectric characteristic, it may be difficult to apply the film-type vibration module to a large area due to a low vibration. When ceramic is used for enhancing a piezoelectric characteristic, the film type vibration module may weak in durability, and a size of ceramic may be limited. When a vibration module including a piezoelectric composite including piezoelectric ceramic is applied to a display apparatus, because the piezoelectric composite vibrates in a horizontal direction with respect to a left-right direction (for example, a horizontal direction with respect to a left-right direction of the display apparatus), it may unable to sufficiently vibrate the display apparatus in a vertical (or front-to-rear) direction. Thus, it may difficult to apply the vibration module to the display apparatus, and it may unable to output a desired sound to a forward region in front of the display apparatus.

In a case where a film type piezoelectric element is applied to a display apparatus, there may be a problem where a sound pressure characteristic is lower than that of a speaker such as an exciter. In a case where a stack type piezoelectric element where a plurality of film type piezoelectric elements are stacked as a plurality of layers is applied to a display apparatus, power consumption may increase, and a thickness of the display apparatus may be thickened. Also, when one vibration device is disposed on a rear surface of a display panel (for example, a rear surface of a mobile display apparatus), a mono sound may be output, but the inventors have recognized a problem where it is difficult to output a stereo sound. Therefore, a vibration device may be further disposed at an edge (or a periphery) of a display panel so as to implement a stereo sound, but the inventors have recognized a problem where it is difficult to place an exciter in a flexible display apparatus where a curved portion is provided in a display panel, and when a speaker including piezoelectric ceramic is provided, the piezoelectric ceramic is breakable.

Therefore, the inventors have performed various experiments for implementing a vibration device which may realize a stereo sound characteristic, may be applied to a flexible display apparatus, and may vibrate in a vertical direction with respect to a widthwise direction of the display panel. Through the various experiments, the inventors have invented a display apparatus including a vibration device having a new structure, which may realize a stereo sound characteristic and may be applied to a flexible display apparatus. This will be described below in detail.

Figure 2:
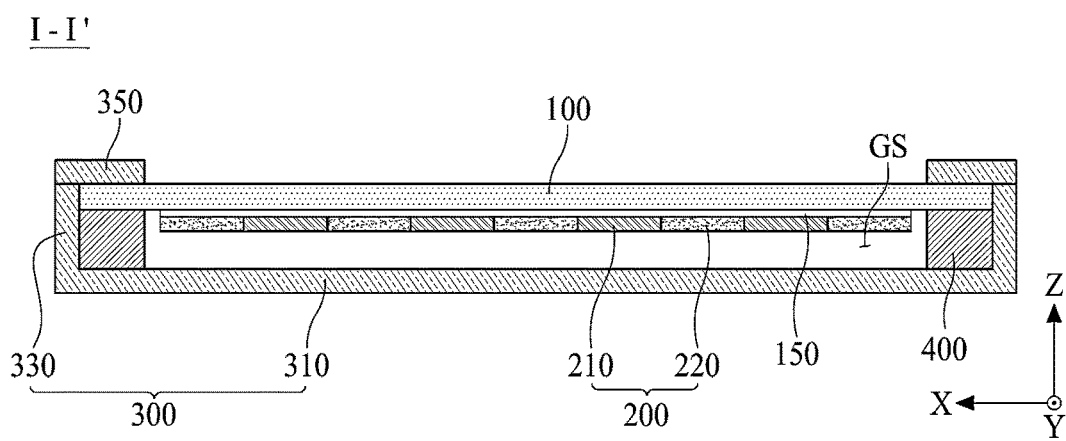
FIG. 2 is a cross-sectional view taken along line I-I' illustrated in FIG. 1.

FIG. 1 illustrates a display apparatus according to an embodiment of the present disclosure. FIG. 2 is a cross-sectional view taken along line I-I' illustrated in FIG. 1.

With reference to FIGS. 1 and 2, a display apparatus according to an embodiment of the present disclosure may include a display panel 100 and a vibration device 200 on a rear surface of the display panel 100. A "rear surface" may denote a surface of the display panel opposite to a front surface of the display panel including the display area for displaying an image.

The display panel 100 may display an electronic image or a digital image. For example, the display panel 100 may output light to display an image. The display panel 100 may be a curved display panel, or may be any type of display panel, such as a liquid crystal display panel, an organic light-emitting display panel, a quantum dot light-emitting display panel, a micro light-emitting diode display panel, and an electrophoresis display panel. The display panel 100 may be a flexible display panel. For example, a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel 100 according to an embodiment of the present disclosure may include a display area AA (or an active area) for displaying an image according to driving of the plurality of pixels, and a non-display area IA (or an inactive area) surrounding the display area AA.

The display panel 100 according to an embodiment of the present disclosure may include a pixel array layer (or a display unit) configured to include an anode electrode, a cathode electrode, and an organic compound layer. The display panel 100 may be configured to display an image in a type such as a top emission type, a bottom emission type, or a dual emission type, based on a structure of the pixel array layer. For example, in the top emission type, an image may be displayed by outputting visible light generated from the pixel array layer to the forward region in front of a base substrate of the display panel 100. In the bottom emission type, an image may be displayed by outputting visible light generated from the pixel array layer to the backward region in rear of a base substrate of the display panel 100.

The display panel 100 according to an embodiment of the present disclosure may include a pixel array part disposed in a pixel area configured by a plurality of gate lines and/or a plurality of data lines. The pixel array part may include a plurality of pixels which display an image on the basis of a signal supplied to each of signal lines. The signal lines may include a gate line, a data line, and a pixel driving power line.

Each of the plurality of pixels may include a pixel circuit layer including a driving thin film transistor (TFT) provided in the pixel area, an anode electrode electrically connected to the driving TFT, a light emitting device layer formed on the anode electrode, and a cathode electrode electrically connected to the light emitting device layer.

The driving TFT may be provided in a transistor region of each pixel area disposed on a substrate. The driving TFT may include a gate electrode, a gate insulation layer, a semiconductor layer, a source electrode, and a drain electrode. The semiconductor layer of the driving TFT may include silicon such as amorphous-silicon (a-Si), polysilicon (poly-Si), or low temperature poly-Si or may include oxide such as indium-gallium-zinc-oxide (IGZO), but is not limited thereto.

The anode electrode may be provided in an opening region disposed in each pixel area and may be electrically connected to the driving TFT.

The light emitting device layer according to an embodiment of the present disclosure may include an organic light emitting device formed on the anode electrode. The organic light emitting device may be implemented so that each pixel emits light of the same color (for example, white light), or may be implemented so that pixels emit lights of different colors (for example, red light, green light, and blue light).

According to another embodiment of the present disclosure, the light emitting device layer may include a micro light emitting diode (or a micro light emitting diode device) electrically connected to each of an anode electrode and a cathode electrode. The micro light emitting diode may be a light emitting diode implemented as an integrated circuit (IC) or chip type and may include a first terminal electrically connected to the anode electrode and a second terminal electrically connected to the cathode electrode. The cathode electrode may be connected to a light emitting device of a light emitting device layer provided in each pixel area in common.

An encapsulation part may be formed on the substrate to surround the pixel array part, thereby preventing oxygen or water from penetrating into the light emitting device layer of the pixel array part. The encapsulation part according to an embodiment of the present disclosure may be formed in a multi-layer structure where an organic material layer and an inorganic material layer are alternately stacked, but is not limited thereto. The inorganic material layer may prevent oxygen or water from penetrating into the light emitting device layer of the pixel array part. The organic material layer may be formed to have a thickness which is relatively thicker than the inorganic material layer, so as to cover particles occurring in a manufacturing process. For example, the encapsulation part may include a first inorganic layer, an organic layer on the first inorganic layer, and a second inorganic layer on the organic layer. The organic layer may be a particle cover layer. The touch panel may be disposed on the encapsulation part, or may be disposed on a rear surface of the pixel array part.

The display panel 100 according to an embodiment of the present disclosure may include an upper substrate, a lower substrate, and a liquid crystal layer.

The upper substrate may be a first substrate or a thin film transistor (TFT) array substrate and may include a pixel array (or a display part or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The upper substrate may further include a pad part provided at a first edge (or a first periphery or a first non-display part) thereof and a gate driving circuit provided at a second edge (or a second periphery or a second non-display part) thereof.

The pad part may transfer a signal, supplied from the outside, to the pixel array and/or the gate driving circuit. For example, the pad part may include a plurality of data pads connected to a plurality of data lines through a plurality of data link lines and/or a plurality of gate input pads connected to the gate driving circuit through a gate control signal line. For example, a size of the upper substrate may be greater than that of the lower substrate, but embodiments of the present disclosure are not limited thereto.

The gate driving circuit according to an embodiment of the present disclosure may be embedded (or integrated) into a second edge of the upper substrate and may be connected to the plurality of gate lines. For example, the gate driving circuit may be implemented with a shift register including a transistor, which is formed through the same process as the TFT provided in the pixel area. According to another embodiment of the present disclosure, the gate driving circuit may be implemented as an integrated circuit (IC) and may be provided in a panel driving circuit, without being embedded into the upper substrate.

The lower substrate may be a second substrate or a color filter array substrate and may include a pixel pattern, including an opening area overlapping with the pixel area formed in the upper substrate, and a color filter layer formed in the opening area. The lower substrate may have a size which is less than that of the upper substrate, but embodiments of the present disclosure are not limited thereto. For example, the lower substrate may overlap a portion, other than the first edge, of the upper substrate. The lower substrate may be bonded to a portion, other than the first edge, of the upper substrate with a liquid crystal layer therebetween using a sealant.

The liquid crystal layer may be interposed between the upper substrate and the lower substrate and may include a liquid crystal including liquid crystal molecules where an alignment direction thereof is changed based on an electric field generated by the common voltage and a data voltage applied to a pixel electrode for each pixel.

A lower polarization member may be attached on a lower surface of the lower substrate and may polarize light which is incident from the backlight and travels to the liquid crystal layer. An upper polarization member may be attached on an upper surface of the upper substrate and may polarize light which passes through the upper substrate and is output to the outside.

The display panel 100 according to an embodiment of the present disclosure may drive the liquid crystal layer based on an electric field which is generated in each pixel by the data voltage and the common voltage applied to each pixel, and thus, may display an image based on light passing through the liquid crystal layer.

According to another embodiment of the present disclosure, in the display panel 100, the upper substrate may be implemented as the color filter array substrate, and the lower substrate may be implemented as the TFT array substrate. For example, the display panel 100 according to another embodiment of the present disclosure may have a type where an upper portion and a lower portion of the display panel 100 according to an embodiment of the present disclosure are reversed therebetween. For example, a pad part of the display panel 100 according to another embodiment of the present disclosure may be covered by a separate mechanism or structure.

The display panel 100 according to an embodiment of the present disclosure may include a bending portion that may be bent or curved to have a curved shape or a certain curvature radius.

The bending portion of the display panel 100 may be in at least one of one edge (or periphery) and the other edge (or periphery) of the display panel 100, which are parallel to each other. The one edge and/or the other edge, where the bending portion is implemented, of the display panel 100 may include only the non-display area IA, or may include an edge or a periphery of the display area AA and the non-display area IA. For example, the display panel 100 including the bending portion implemented by bending of the non-display area IA may have a one-side bezel bending structure or a both-side bezel bending structure. Also, the display panel 100 including the bending portion implemented by bending of the edge or the periphery of the display area AA and the non-display area IA may have a one-side active bending structure or a both-side active bending structure.

The display apparatus according to an embodiment of the present disclosure may further include a supporting member 300 disposed a rear surface of the display panel 100 and a panel connection member 400 disposed between the display panel 100 and the supporting member 300.

The supporting member 300 may be referred to, for example, as a cover bottom, a plate bottom, a back cover, a base frame, a metal frame, a metal chassis, a chassis base, or an m-chassis. Therefore, the supporting member 300 may be a supporter that supports the display panel 100, and may be implemented as a frame or a plate structure of an arbitrary type, on a rear surface of the display apparatus.

The supporting member 300 according to an embodiment of the present disclosure may cover a rear surface of the display panel 100. For example, the supporting member 300 may cover a whole rear surface of the display panel 100 with a gap space GS therebetween. For example, the supporting member 300 may include at least one of a glass material, a metal material, and a plastic material. For example, an edge or a sharp corner of the supporting member 300 may have an inclined shape or a curved shape, e.g., through a chamfer process or a corner rounding process. For example, the supporting member 300 of the glass material may be sapphire glass. As another example, the supporting member 300 of the metal material may include one or more of aluminum (Al), an Al alloy, a magnesium (Mg), a Mg alloy, and an iron (Fe)-nickel (Ni) alloy.

The supporting member 300 according to an embodiment of the present disclosure may additionally cover a side surface of the display panel 100. For example, the supporting member 300 may include a rear part 310 that covers the rear surface of the display panel 100 with the gap space GS therebetween, and a side part 330 connected to an end of the rear part 310 and covering the side surface of the display panel 100. However, the embodiments of the present disclosure are not limited thereto. For example, the rear part 310 and the side part 330 of the supporting member 300 may be integrated as one body.

The side part 330 may be implemented as a separated middle frame coupled or connected to the rear part 310. For example, the side part 330 implemented as the middle frame may cover the supporting member 300, and for example, may cover all of a side surface of the rear part 310 and the side surface of the display panel 100. For example, the side part 330 implemented as the middle frame may include a material that is the same as or different from that of the supporting member 300.

The supporting member 300 according to an embodiment of the present disclosure may be coupled or connected to a rear edge (or a rear periphery) of the display panel 100 using a panel connection member 400. For example, the panel connection member 400 may be disposed between the rear edge of the display panel 100 and an edge (or a periphery) of the supporting member 300, and may attach the display panel 100 to the supporting member 300. The panel connection member 400 according to an embodiment of the present disclosure may be implemented with a double-sided tape, a single-sided tape, or a double-sided adhesive foam pad, but embodiments of the present disclosure are not limited thereto.

The display apparatus according to an embodiment of the present disclosure may further include a front member 350 that covers the non-display area IA of the display panel 100. The front member 350 may have a frame shape that may include an opening overlapping the display area AA of the display panel 100. For example, the front member 350 may be coupled or connected to the rear part 310 of the supporting member 300 or the middle frame, and may cover the non-display area IA of the display panel 100, thereby supporting or fixing the display panel 100. The front member 350 may be in a front edge (or a front periphery) of the display panel 100, and may be directly exposed (visible) to a user (or a viewer). Thus, an aesthetic design appearance of the display apparatus may be reduced, and a bezel width of the display apparatus may increase. To solve such a problem, according to an embodiment of the present disclosure, the display panel 100 may be coupled or connected to the supporting member 300 by the panel connection member 400. Thus, the front member 350 may be omitted (or removed), thereby decreasing the bezel width of the display apparatus and enhancing the aesthetic design appearance of the display apparatus.

The vibration device 200 may be on the rear surface (or a back surface) of the display panel 100. The vibration device 200 may be attached to the rear surface of the display panel 100 by an adhesive member 150.

The adhesive member 150 according to an embodiment of the present disclosure may be between the rear surface of the display panel 100 and the vibration device 200. For example, the adhesive member 150 may attach the vibration device 200 to the rear surface of the display panel 100, and may be an adhesive or a double-sided adhesive tape, including an adhesive layer that has a good adhesive force or attaching force. For example, the adhesive layer of the adhesive member 150 may include one or more of epoxy, acryl, silicone, or urethane, but embodiments are not limited thereto. The adhesive layer of the adhesive member 150 may further include an additive, such as a tackifier or an adhesion enhancing agent, a wax component, or an anti-oxidation agent. The additive may prevent or reduce the adhesive member 150 from being detached (stripped) from the display panel 100 by a vibration of the vibration device 200. For example, the tackifier may be rosin derivative or the like, the wax component may be paraffin wax or the like, and the anti-oxidation agent may be a phenol-based anti-oxidation agent, such as thioester. However, embodiments of the present disclosure are not limited thereto.

According to another example of the present disclosure, the adhesive member 150 may further include a hollow portion between the display panel 100 and the vibration device 200. The hollow portion of the adhesive member 150 may provide an air gap between the display panel 100 and the vibration device 200. Due to the air gap, a sound wave (or a sound pressure) based on a vibration of the vibration device 200 may not be dispersed by the adhesive member 150, and may concentrate on the display panel 100. Thus, the loss of a vibration caused by the adhesive member 150 may be minimized or reduced, thereby increasing a sound pressure characteristic of a sound generated based on a vibration of the display panel 100.

The vibration device 200 according to an embodiment of the present disclosure may be implemented as a film type. The vibration device 200 may have a thickness that is thinner than that of the display panel 100. Thus, a thickness of the display panel 100 may not increase, despite the presence of the vibration device 200. The vibration device 200 may be referred to as, for example, a "sound generating module," a "sound generating device," a "film actuator," a "film-type piezoelectric composite actuator," a "film speaker," a "film-type piezoelectric speaker," or a "film-type piezoelectric composite speaker" that each uses the display panel 100 as a vibration plate, but the term is not limited thereto.

To secure a piezoelectric characteristic, the vibration device 200 may include a piezoelectric ceramic. To improve an impact resistance of piezoelectric ceramic and realize flexibility, the vibration device 200 may include a material, such as a polymer, in a piezoelectric ceramic.

The vibration device 200 according to an embodiment of the present disclosure may include a plurality of first portions 210 and a plurality of second portions 220.

The plurality of first portions 210 according to an embodiment of the present disclosure may each be configured as an inorganic material portion. The inorganic material portion may include an inflexible material. The inorganic material portion may include an electroactive material. The electroactive material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto.

Each of the plurality of second portions 220 may be disposed between the plurality of first portions 210. Each of the plurality of second portions 220 may alternate between pairs of the plurality of first portions 210. The plurality of first portions 210 and the plurality of second portions 220 may be disposed (or arranged) on the same plane (or the same layer) in parallel. Each of the plurality of second portions 220 may be configured to fill a gap or a space between two adjacent first portions of the plurality of first portions 210, and may be connected to or attached to a first portion 210 adjacent thereto. Therefore, in the vibration device 200, vibration energy based on a link in a unit lattice of each first portion 210 may increase by a corresponding second portion 220. Thus, a vibration may increase, and a piezoelectric characteristic and flexibility may be secured.

Also, a second portion 220 and a first portion 210 may be alternately arranged on the same plane in a lengthwise direction (first direction X) with respect to one side, and thus, the vibration device 200 may configure a large-area composite film (or an organic/inorganic composite film) having a single-layer structure. Accordingly, a thickness may be reduced compared to a piezoelectric speaker where a plurality of layers are stacked, and power consumption may decrease. Also, the large-area composite film may have flexibility by using a plurality of second portions 220.

Each of the plurality of second portions 220 according to an embodiment of the present disclosure may be configured as an organic material portion, and may fill a space between the inorganic material portions, which are the first portions 210. Each of the organic material portions may include a flexible material. Each of the organic material portions may be between the plurality of inorganic material portions, may absorb an impact or shock applied to the inorganic material portions (or the first portions), may release a stress concentrating on the inorganic material portion to enhance the total durability of the vibration device 200, and may provide flexibility to the vibration device 200. The vibration device 200 may have flexibility. Thus, the vibration device 200 may be bent in a shape matching that of the display panel 100.

The vibration device 200 may vibrate according to an electrical signal to vibrate the display panel 100. For example, the vibration device 200 may vibrate according to a voice signal synchronized with an image displayed by the display panel 100 to vibrate the display panel 100. As another example, the vibration device 200 may be on the display panel 100, and may vibrate according to a haptic feedback signal (or a tactile feedback signal) synchronized with a user touch applied to a touch panel (or a touch sensor layer) embedded into the display panel 100 to vibrate the display panel 100. Accordingly, the display panel 100 may vibrate based on a vibration of the vibration device 200 to provide a user (or a viewer) with at least one of sound and a haptic feedback. Embodiments are not limited to the above examples.

Therefore, in the vibration device 200 of the display apparatus according to an embodiment of the present disclosure, an inorganic material portion (or a first portion 210) and an organic material portion (or a second portion 220) may be on the same layer. Thus, an impact transferred to the inorganic material portion may be absorbed by the organic material portion, thereby reducing or preventing the inorganic material portion from being damaged by an external impact applied to the display apparatus, and reducing or minimizing the reduction in vibration performance (or the reduction in sound performance) caused by damage.

Moreover, the vibration device 200 of the display apparatus according to an embodiment of the present disclosure may include piezoelectric ceramic having a perovskite crystalline structure. Thus, the vibration device 200 may vibrate (or mechanical displacement) in response to an electrical signal applied from the outside. For example, when an alternating current (AC) voltage is applied to the inorganic material portion (or the first portion 210), the inorganic material portion may alternately contract and expand based on an inverse piezoelectric effect. Thus, the vibration device 200 may vibrate based on a bending phenomenon in which a bending direction is alternately changed, thereby vibrating the display panel 100 based on the vibration of the vibration device 200 to provide sound and/or a haptic feedback to a user.

Moreover, the vibration device 200 according to an embodiment of the present disclosure may have a size corresponding to the display area AA of the display panel 100. A size of the vibration device 200 may be 0.9 to 1.1 times a size of the display area AA, but embodiments of the present disclosure are not limited thereto. For example, a size of the vibration device 200 may be the same as or approximately equal to that of the display area AA of the display panel 100. Thus, the vibration device 200 may cover most of the display panel 100. Also, a vibration generated by the vibration device 200 may vibrate the entire display panel 100. Thus, localization of a sound may be high, and satisfaction of a user may be improved. Also, a contact area (or panel coverage) between the display panel 100 and the vibration device 200 may increase. Thus, a vibration region of the display panel 100 may increase, thereby improving a sound of a middle- and/or a low-pitched sound band generated based on a vibration of the display panel 100. Also, in a large-sized display apparatus, the entire display panel 100 having a large size (or a large area) may vibrate. Thus, localization of a sound based on a vibration of the display panel 100 may be further enhanced, thereby realizing a stereophonic sound effect.

Therefore, the vibration device 200 according to an embodiment of the present disclosure may be on the rear surface of the display panel 100 to sufficiently vibrate the display panel 100 in a vertical (or front-to-rear) direction, thereby outputting a desired sound to a forward region in front of the display apparatus. Also, a material in the vibration device 200 may be implemented in a patterned shape, including an organic material portion and an inorganic material portion. Thus, an area (or a size) of the vibration device 200 may infinitely increase, whereby panel coverage of the vibration device 200 may increase with respect to the display panel 100 to enhance a sound characteristic based on a vibration of the display panel 100. Also, the vibration device 200 may be slimmed as a thin-film type, thereby reducing or preventing the increase in a driving voltage. For example, the vibration device 200 may be configured to have a wide area corresponding to the same size as that of the display panel 100. Thus, a sound pressure characteristic of a low-pitched sound band, which is a drawback of a film-type piezoelectric, for example, a piezoelectric where a plurality of layers are stacked, may be improved, and the driving voltage may be reduced. Also, the vibration device 200 according to an embodiment of the present disclosure may include the inorganic material portion and the organic material portion, and may be implemented as a thin-film type. Thus, the vibration device 200 may be integrated into or equipped in the display apparatus without interference caused by a mechanical element and/or another element of the display apparatus.

Figure 3:
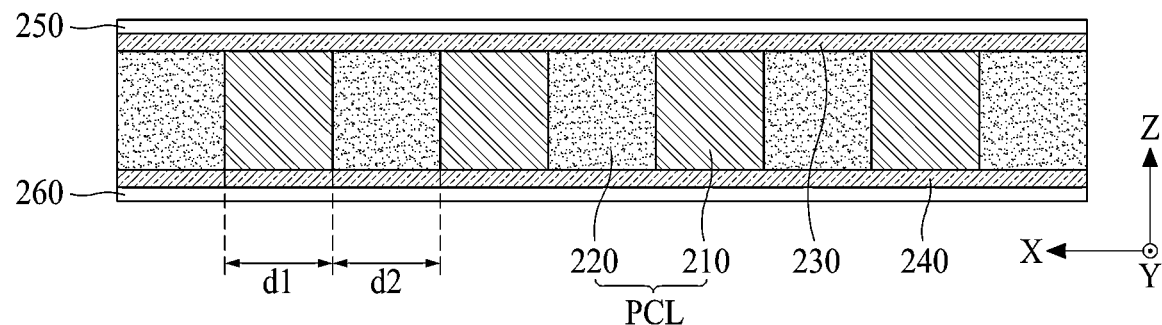
FIG. 3 is a cross-sectional view of a vibration device according to an embodiment of the present disclosure.

FIG. 3 is a cross-sectional view of a vibration device according to an embodiment of the present disclosure.

With reference to FIG. 3, in conjunction with FIG. 2, the vibration device 200 may include a piezoelectric composite layer PCL, a first electrode 230, and a second electrode 240.

The piezoelectric composite layer PCL may include a plurality of first portions 210 and a plurality of second portions 220, each disposed between the plurality of first portions 210.

Each of the plurality of first portions 210 may include a polygonal pattern. For example, each of the plurality of first portions 210 may a line pattern having a predetermined first width d1. For example, each of the plurality of first portions 210 may be spaced apart from one another by a predetermined second width d2 (or a certain interval) in a first direction X, and may be in parallel in a second direction Y intersecting the first direction X. Each of the plurality of first portions 210 may have the same size (for example, the same width, area, or volume) within a process error range (or an allowable error or a tolerance) occurring in a manufacturing process.

Each of the plurality of first portions 210 according to an embodiment of the present disclosure may include an inorganic material or a piezoelectric material, each of which vibrating based on a piezoelectric effect (or a piezoelectric characteristic) caused by an electric field. For example, each of the plurality of first portions 210 may be referred to, for example, as an electroactive portion, an inorganic material portion, a piezoelectric material portion, or a vibration portion, but embodiments of the present disclosure are not limited thereto.

Each of the plurality of first portions 210 according to an embodiment of the present disclosure may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "O" may be anions. For example, the chemical formula "$ABO_3$" may include one of lead(II) titanate ($PbTiO_3$), lead zirconate ($PbZrO_3$), barium titanate ($BaTiO_3$), and strontium titanate ($SrTiO_3$), but embodiments of the present disclosure are not limited thereto.

When the perovskite crystalline structure includes a center ion (for example, $PbTiO_3$, e.g., lead(II) titanate, lead titanium oxide, or lead titanate with a perovskite structure), a position of a titanium (Ti) ion may be changed by an external stress or a magnetic field. Thus, polarization may be changed, thereby generating a piezoelectric effect. For example, in the perovskite crystalline structure, a cubic shape corresponding to a symmetric structure may be changed to a tetragonal (or quadrilateral), orthorhombic, or rhombohedral structure corresponding to an unsymmetric structure. Thus, a piezoelectric effect may be generated. In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

For example, the inorganic material portion provided in each of the plurality of first portions 210 may include a material, including one or more of lead (Pb), zirconium (Zr), titanium (Ti), zinc (Zn), nickel (Ni), and niobium (Nb), but embodiments of the present disclosure are not limited thereto.

As another example, the inorganic material portion provided in each of the plurality of first portions 210 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments are not limited thereto. Also, the inorganic material portion may include at least one of calcium titanate ($CaTiO_3$), $BaTiO_3$, and $SrTiO_3$, each without Pb, but embodiments of the present disclosure are not limited thereto.

Each of the plurality of second portions 220 may be disposed between the plurality of first portions 210. Each of the plurality of second portions 220 may be disposed parallel to each other with the first portions 210 therebetween. The plurality of first portions 210 and the plurality of second portions 220 may be disposed (or arranged) on the same plane (or the same layer) in parallel. Each of the plurality of second portions 220 may fill a gap between two adjacent first portions of the plurality of first portions 210, and may be connected to or attached to a first portion 210 adjacent thereto. Each of the plurality of second portions 220 may include a polygonal pattern. For example, each of the plurality of second portions 220 may be a line pattern having a predetermined second width d2. Each of the plurality of second portions 220 may have the same size (for example, the same width, area, or volume) within a process error range (or an allowable error or a tolerance) occurring in a manufacturing process.

A size of each of the second portions 220 may be the same as or different from that of each first portion 210. For example, a size of each first portion 210 and a size of each second portion 220 may adjust based on a desired condition including the vibration characteristic and/or flexibility of the vibration device 200.

Each of the plurality of second portions 220 according to an embodiment of the present disclosure may have modulus and viscoelasticity that are lower than those of each first portion 210. Thus, the plurality of second portions 220 may enhance the reliability of each first portion 210 vulnerable to an impact due to a fragile characteristic. For example, when the vibration device 200 for vibrating the display panel 100 has an impact resistance and high stiffness, the vibration device 200 may have a high or maximum vibration characteristic. For the vibration device 200 to have an impact resistance and high stiffness, the plurality of second portions 220 may each include a material having a relatively high damping factor (tan δ) and relatively high stiffness. For example, the plurality of second portions 220 may each include a material having a damping factor (tan δ) of about 0.1 [GPa] to about 1 [GPa] and relatively high stiffness of about 0 [GPa] to about 10 [GPa]. Also, a damping factor (tan δ) and a stiff characteristic may be described based on a correlation between a loss coefficient and modulus. For example, the plurality of second portions 220 may each include a material having a loss coefficient (or loss factor) of about 0.01 to about 1.0 and modulus of about 1 [GPa] to about 10 [GPa]. Herein, the modulus may be understood as the dynamic modulus, which describes the ratio of stress to strain under vibratory conditions or calculates by dividing tensile stress by tensile strain. Herein, the damping factor (tan δ) of a material may be understood as the ratio of the (tensile) loss modulus or energy to the (tensile) storage modulus or energy. Herein, the loss coefficient of a material may be understood as the ratio of dissipated energy to strain energy.

The organic material portion in each of the plurality of second portions 220 may include an organic material or an organic polymer that each has a flexible characteristic in comparison with the inorganic material portion of each of the first portions 210. For example, each of the plurality of second portions 220 may include one or more of an organic material, an organic polymer, an organic piezoelectric material, and an organic non-piezoelectric material. For example, each of the plurality of second portions 220 may be referred to, for example, as an adhesive portion, an elastic portion, a bending portion, a damping portion, or a flexible portion, but embodiments of the present disclosure are not limited thereto.

An organic material portion according to an embodiment of the present disclosure may include at least one of an organic piezoelectric material and an organic non-piezoelectric material.

An organic material portion including an organic piezoelectric material may absorb an impact applied to an inorganic material portion (or a first portion 210). Thus, the organic material portion may enhance the total durability of the vibration device 200, and may provide a piezoelectric characteristic corresponding to a certain level or more. The organic piezoelectric material according to an embodiment of the present disclosure may be an organic material having an electro active characteristic. For example, the organic piezoelectric material may include at least one of polyvinylidene fluoride (PVDF), β-polyvinylidene fluoride (β-PVDF), and polyvinylidene-trifluoroethylene (PVDF-TrFE), but embodiments of the present disclosure are not limited thereto.

An organic material portion including an organic non-piezoelectric material may include a curable resin composition and an adhesive including the curable resin composition. Thus, the organic material portion may absorb an impact applied to an inorganic material portion (or a first portion), thereby enhancing the total durability of the vibration device 200. The organic non-piezoelectric material according to an embodiment of the present disclosure may include at least one of an epoxy-based polymer, an acryl-based polymer, and a silicone-based polymer, but embodiments are not limited thereto.

For example, an organic material portion including an organic non-piezoelectric material may include an adhesion promoter or an adhesion enhancing agent for adhesiveness between epoxy resin and an inorganic material portion, for a high stiffness characteristic for the vibration device 200. For example, the adhesion promoter may be phosphate or the like, but embodiments of the present disclosure are not limited thereto. The organic material portion may be cured by at least one curing process of a thermal curing process and a photo-curing process. In a process of curing the organic material portion, solvent free type epoxy resin may be used for avoiding or preventing the thickness uniformity of the vibration device 200 from being reduced by contraction of the organic material portion caused by volatilization of a solvent.

Moreover, the organic material portion including the organic non-piezoelectric material may further include a reinforcing agent, e.g., for a damping characteristic in addition to high stiffness of the vibration device 200. For example, the reinforcing agent may be methylmethacrylate-butadiene-styrene (MBS) having a core shell type, and a content thereof may be about 5 wt % to about 40 wt %. The reinforcing agent may be an elastic body having the core cell type, and may have a high coupling force to epoxy resin, such as an acryl-based polymer. Thus, the reinforcing agent may enhance an impact resistance or a damping characteristic of the vibration device 200.

Therefore, the piezoelectric composite layer PCL may be configured with the first portion 210 including an inorganic material and the second portion 220 including an organic material, and thus, may be implemented as the vibration device 200 having a film type. For example, in the piezoelectric composite layer PCL, the first portions 210 including an inorganic material and having a piezoelectric characteristic, and the second portions 220 including an organic material and having flexibility, may be alternately repeated and connected to one another. Thus, the piezoelectric composite layer PCL may have a thin-film type.

Therefore, the piezoelectric composite layer PCL may be bent based on a shape of the display panel 100, and may have a size corresponding to the display panel 100, or may have a size for realizing a vibration characteristic or a sound characteristic, which may each be set based on a vibration of the display panel 100. For example, a size of each first portion 210 and a size of each second portion 220 may be adjusted based on a piezoelectric characteristic and flexibility. For example, in a display apparatus desiring more of a piezoelectric characteristic than flexibility, a size of each first portion 210 may be greater than that of each second portion 220. As another example, in a display apparatus desiring more flexibility than a piezoelectric characteristic, a size of each second portion 220 may be greater than that of each first portion 210.

Therefore, the piezoelectric composite layer PCL may be configured by adjusting the first portion 210 and the second portion 220 based on a characteristic needed for a display apparatus, and thus, may be easily designed. Also, the piezoelectric composite layer PCL having a thin film type may be implemented, and thus, a thickness of the display apparatus may not increase despite the arrangement of the vibration device.

The first electrode 230 may be on a first surface (or a front surface) of the piezoelectric composite layer PCL, and may be electrically connected to a first surface of each of the plurality of first portions 210. The first electrode 230 according to an embodiment of the present disclosure may include a transparent conductive material, a semitransparent (or translucent) conductive material, or an opaque conductive material. For example, the transparent conductive material or the semitransparent conductive material may include indium tin oxide (ITO) or indium zinc oxide (IZO), but embodiments of the present disclosure are not limited thereto. For example, the opaque conductive material may include aluminum (Al), copper (Cu), gold (Au), silver (Ag), molybdenum (Mo), magnesium (Mg), and an alloy of any thereof, but embodiments of the present disclosure are not limited thereto.

The second electrode 240 may be on a second surface (or a rear surface) opposite to the first surface of the piezoelectric composite layer PCL, and may be electrically connected to a second surface of each of the plurality of first portions 210. The second electrode 240 according to an embodiment may include a transparent conductive material, a semitransparent conductive material, or an opaque conductive material. For example, the second electrode 240 may include the same material as that of the first electrode 230, but embodiments of the present disclosure are not limited thereto. As another example, the second electrode 240 may include a material different from that of the first electrode 230.

The piezoelectric composite layer PCL may be polarized by a certain voltage applied to the first electrode 230 and the second electrode 240 in a certain temperature atmosphere, or a temperature atmosphere that may be changed from a high temperature to a room temperature. Embodiments of the present disclosure are not limited to these examples.

The vibration device 200 according to an embodiment of the present disclosure may further include a first protection layer 250 and a second protection layer 260.

The first protection layer 250 may be on the first electrode 230, and may protect the first surface of the piezoelectric composite layer PCL or the first electrode 230. For example, the first protection layer 250 may be a polyimide (PI) film or a polyethyleneterephthalate (PET) film, but embodiments of the present disclosure are not limited thereto.

The second protection layer 260 may be on the second electrode 240, and may protect the second surface of the piezoelectric composite layer PCL or the second electrode 240. For example, the second protection layer 260 may be a polyimide (PI) film or a polyethyleneterephthalate (PET) film, but embodiments of the present disclosure are not limited thereto.

Figure 4:
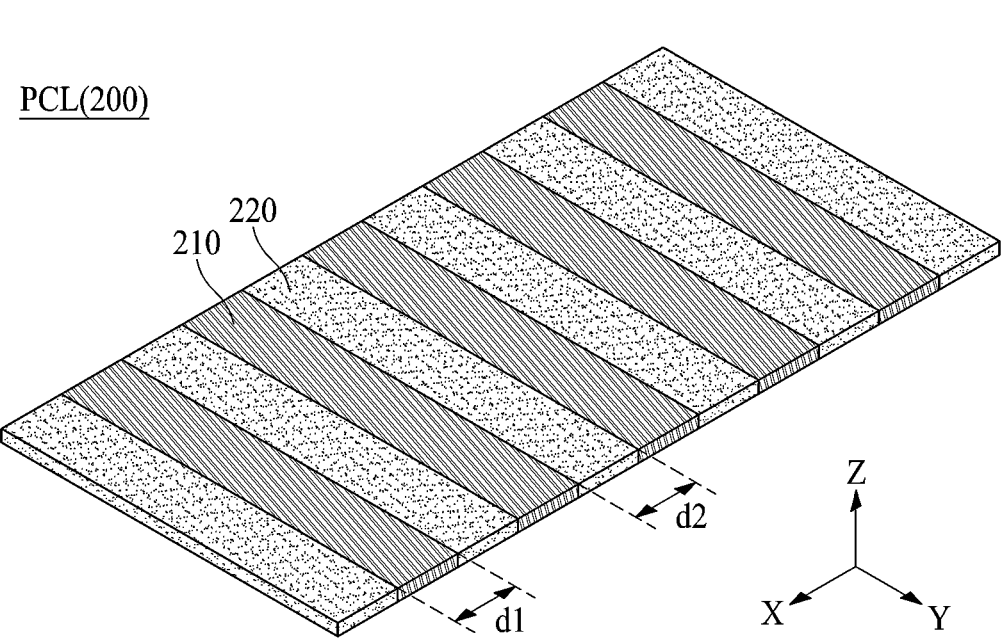
FIG. 4 illustrates a piezoelectric composite according to an embodiment of the present disclosure.

FIG. 4 illustrates a piezoelectric composite layer according to a first embodiment of the present disclosure.

With reference to FIG. 4, the piezoelectric composite layer PCL according to the first embodiment of the present disclosure may include a plurality of first portions 210 and a plurality of second portions 220. For example, the plurality of first portions 210 and the plurality of second portions 220 may be alternately and repeatedly disposed in a first direction X.

Each of the plurality of first portions 210 may have a first width d1 parallel to the first direction X, and may have a length parallel to a second direction Y. Each of the plurality of second portions 220 may have a second width d2, which may be the same as the first width d1, and may have a length parallel to the second direction Y. For example, the first portions 210 and the second portions 220 may each have a line type or a stripe type, each having the same size.

Therefore, in the piezoelectric composite layer PCL according to the first embodiment of the present disclosure, the first portions 210 and the second portions 220, each having the same size, may be alternately and repeatedly disposed (or connected) on the same plane. Thus, the piezoelectric composite layer PCL may have a single thin-film type. For example, the piezoelectric composite layer PCL may vibrate in a vertical direction by the first portions 210 having a vibration characteristic, and may be bent in a curved shape by the second portions 220 having a flexible characteristic. The piezoelectric composite layer PCL according to the first embodiment of the present disclosure may be enlarged to have a desired size or length, e.g., through side coupling (or connection) of the first portions 210 and the second portions 220.

Figure 5A:
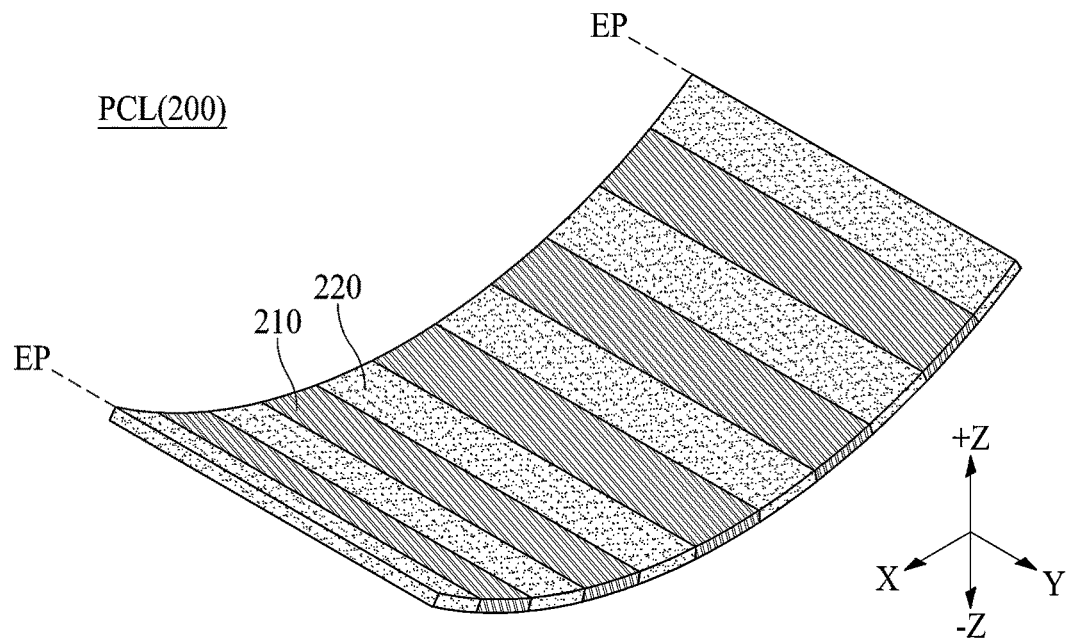
FIG. 5A illustrates a state where both ends of the piezoelectric composite of FIG. 4 is upward folded.
Figure 5B:
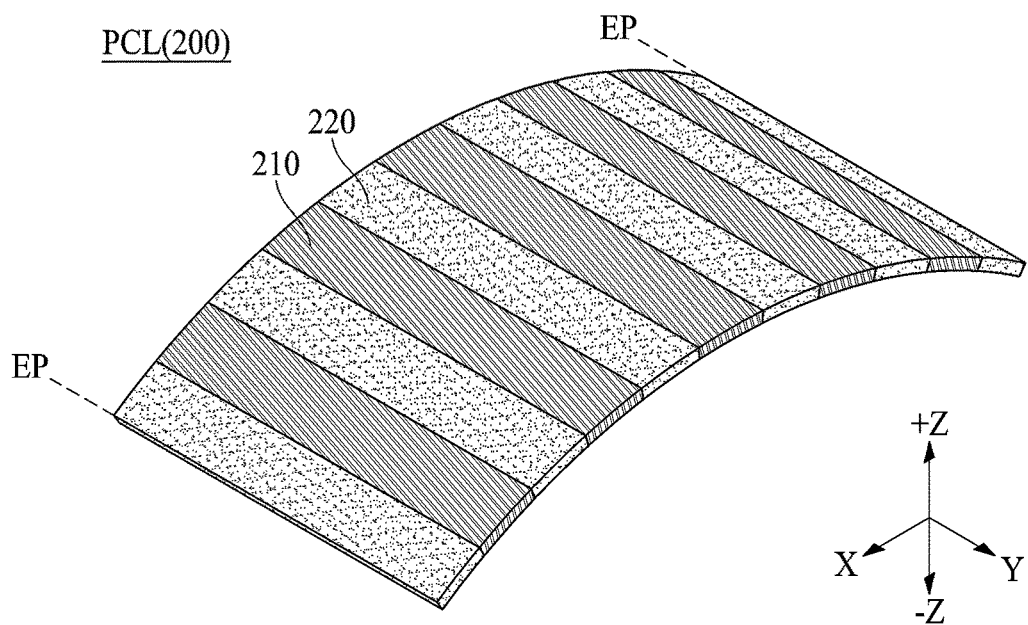
FIG. 5B illustrates a state where the both ends of the piezoelectric composite of FIG. 4 is downward folded.

FIG. 5A illustrates an example in which both ends of the piezoelectric composite layer of FIG. 4 are folded upward. FIG. 5B illustrates an example in which the both ends of the piezoelectric composite layer of FIG. 4 are folded downward.

With reference to FIGS. 5A and 5B, the piezoelectric composite layer PCL according to the first embodiment of the present disclosure may vibrate with an electric field based on a signal applied to each of the plurality of first portions 210 having a line pattern. Thus, both ends EP in a first direction X may be folded in an upward direction +Z, or may be folded in a downward direction −Z. For example, each of the plurality of second portions 220 filled or disposed between two adjacent first portions of the plurality of first portions 210 may have flexibility. Thus, even when the both ends EP of the piezoelectric composite layer PCL are bent in the upward direction +Z or the downward direction −Z, the inorganic material portion, which is each first portion 210, may not be damaged or may not be reduced in performance.

Therefore, the display apparatus including the vibration device 200 including the piezoelectric composite layer PCL according to an embodiment of the present disclosure may be applied to a flexible display apparatus, and for example, the vibration device 200 including the piezoelectric composite layer PCL according to an embodiment of the present disclosure may be applied to a curved display apparatus which is bent at a certain curvature radius. However, the present disclosure is not limited thereto. For example, the vibration device 200 including the piezoelectric composite layer PCL according to an embodiment of the present disclosure may be applied to a rollable display apparatus wound in a spiral form and unwound, a bendable display apparatus, or a wearable display apparatus wound around a wrist. The bendable display apparatus may be an edge bending display apparatus, a bezel bending display apparatus, or an active bending display apparatus, but is not limited thereto. As another example, the vibration device 200 including the piezoelectric composite layer PCL according to an embodiment of the present disclosure may vibrate based on a signal applied thereto, and thus, may vibrate in a first direction X and a second direction Y to vibrate in a vertical direction of the display panel 100. In this case, also, the vibration device 200 including the piezoelectric composite layer PCL according to an embodiment of the present disclosure may be applied to a curved display apparatus which is bent at a certain curvature radius, a rollable display apparatus wound in a spiral form and unwound, a bendable display apparatus, or a wearable display apparatus wound around a wrist. The bendable display apparatus may be an edge bending display apparatus, a bezel bending display apparatus, or an active bending display apparatus, but is not limited thereto.

Figure 6:
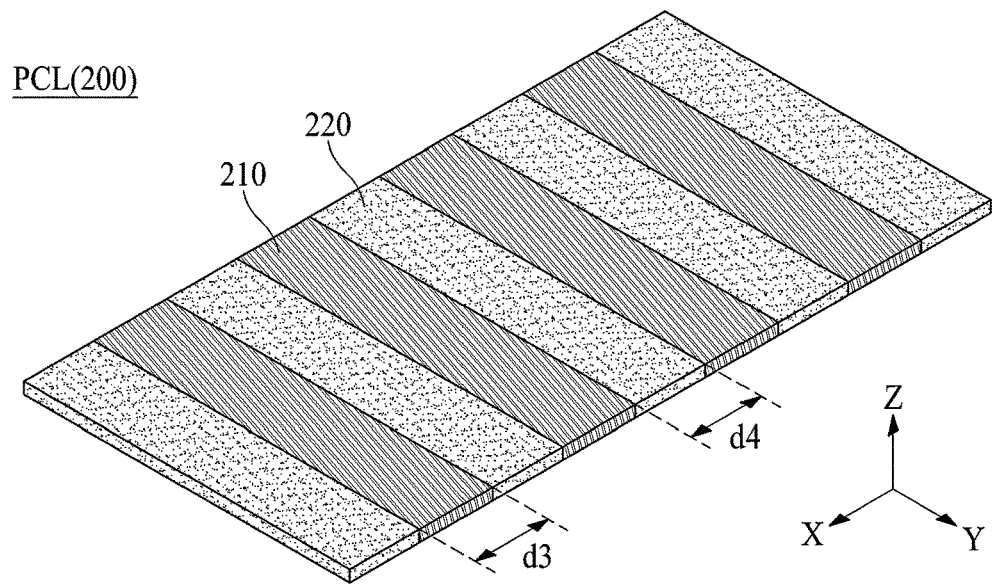
FIG. 6 illustrates a piezoelectric composite according to another embodiment of the present disclosure.

FIG. 6 illustrates a piezoelectric composite layer according to another embodiment (or a second embodiment) of the present disclosure. FIG. 6 illustrates an embodiment implemented by modifying the first portions 210 of the piezoelectric composite layer PCL illustrated in FIG. 4. Thus, a repetitive description is omitted or will be briefly given below.

With reference to FIG. 6, in a piezoelectric composite layer PCL according to another embodiment of the present disclosure, a plurality of first portions 210 and a plurality of second portions 220 may have different sizes.

Each of the plurality of first portions 210 may have a third width d3, and each of the plurality of second portions 220 may have a fourth width d4 differing from the third width d3. For example, the third width d3 of each first portion 210 may be greater than the fourth width d4 of each second portion 220. Also, the third width d3 of each first portion 210 may be greater than the first width d1 of each first portion 210 illustrated in FIG. 4.

When the third width d3, which is a width of an inorganic material portion of each first portion 210, is greater than the fourth width d4, which is a width of an organic material portion of each second portion 220, the piezoelectric composite layer PCL may be reduced in flexibility. However, when a size of the inorganic material portion, which is relatively good in vibration characteristic of a high-pitched sound band, increases, the piezoelectric composite layer PCL may have an improved high-pitched sound characteristic.

In the piezoelectric composite layer PCL according to another embodiment of the present disclosure, each of the first portions 210 may have a size that is greater than that of each of the second portions 220. Thus, the vibration characteristic of the high-pitched sound band may increase. For example, a content (or a ratio) of the first portions 210 in the piezoelectric composite layer PCL illustrated in FIG. 6 may be the same as a content (or a ratio) of the first portions 210 in the piezoelectric composite layer PCL illustrated in FIG. 4. However, when a size of each first portion 210 increases, the piezoelectric composite layer PCL illustrated in FIG. 6 may further improve the vibration characteristic of the high-pitched sound band as compared to the piezoelectric composite layer PCL illustrated in FIG. 4.

Therefore, when a size of each first portion 210 included in the piezoelectric composite layer PCL of the flexible vibration module 200 increases (or enlarges), a display apparatus including the piezoelectric composite layer PCL according to another embodiment of the present disclosure may have an improved sound characteristic of the high-pitched sound band generated by a vibration of the display panel 100 based on a vibration of the vibration device 200. Also, the display apparatus, including the piezoelectric composite layer PCL, according to another embodiment of the present disclosure may be used in a flexible display apparatus that may be substantially similar to the display apparatus including the vibration device 200 illustrated in FIG. 4.

Figure 7:
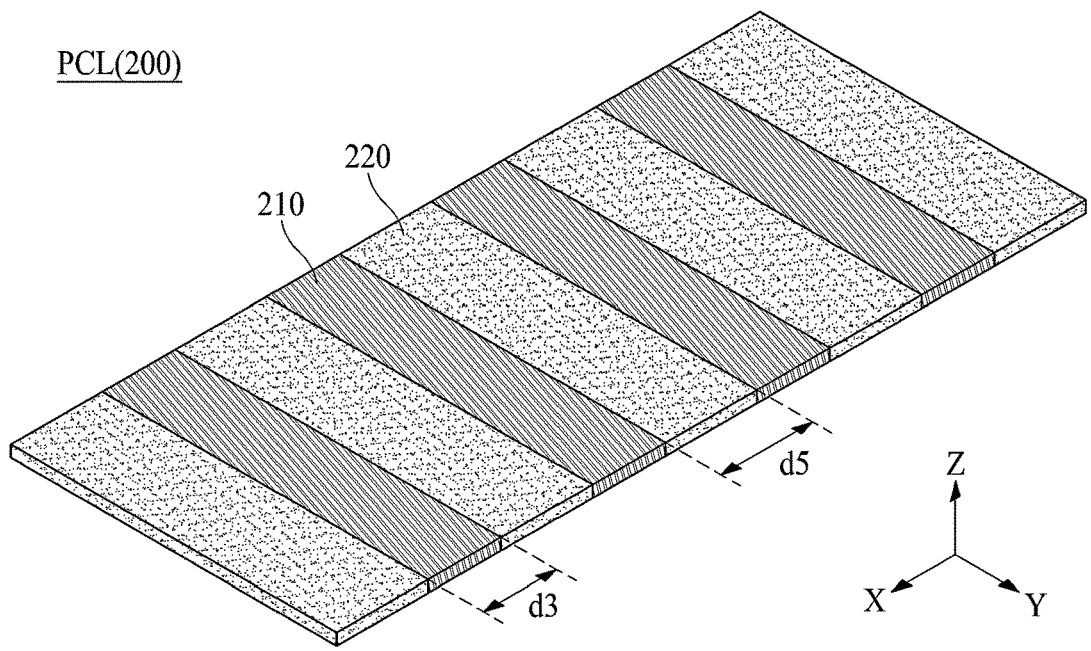
FIG. 7 illustrates a piezoelectric composite according to another embodiment of the present disclosure.

FIG. 7 illustrates a piezoelectric composite layer according to another embodiment (or a third embodiment) of the present disclosure. FIG. 7 illustrates an embodiment implemented by modifying all of the first portions 210 and the second portions 220 of the piezoelectric composite layer PCL illustrated in FIG. 4. Thus, a repetitive description is omitted or will be briefly given below.

With reference to FIG. 7, in a piezoelectric composite layer PCL according to another embodiment of the present disclosure, a plurality of first portions 210 and a plurality of second portions 220 may have different sizes or may have the same size.

Each of the plurality of first portions 210 may have a third width d3. Each of the plurality of second portions 220 may have a fifth width d5 differing from the third width d3. For example, the third width d3 of each first portion 210 may be greater than the first width d1 of each first portion 210 illustrated in FIG. 4, and the fifth width d5 of each second portion 220 may be greater than the fourth width d4 of each second portion 220 illustrated in FIG. 6.

In the piezoelectric composite layer PCL according to another embodiment of the present disclosure, a size of each first portion 210 and a size of each second portion 220 may increase. Thus, the piezoelectric composite layer PCL may further increase in a sound characteristic or a vibration characteristic of the middle- and/or low-pitched sound bands than the piezoelectric composite layer PCL illustrated in each of FIGS. 4 and 6. For example, a content (or a ratio) of the first portions 210 in the piezoelectric composite layer PCL illustrated in FIG. 7 may be higher than a content (or a ratio) of the first portions 210 in the piezoelectric composite layer PCL illustrated in FIG. 4. Also, a content (or a ratio) of the second portions 220 in the piezoelectric composite layer PCL illustrated in FIG. 7 may be higher than a content (or a ratio) of the second portions 220 in the piezoelectric composite layer PCL illustrated in each of FIGS. 4 and 6. For example, the piezoelectric composite layer PCL illustrated in FIG. 7 may have a size enlargement effect of each of the first and second portions 210 and 220. Thus, due to an effect in which panel coverage of vibration device 200 increases with respect to the display panel 100, rather than the vibration device 200, a vibration characteristic of the low-pitched sound band may further increase.

Therefore, due to an effect in which all of a size of each of the first and second portions 210 and 220 included in the piezoelectric composite layer PCL of the vibration device 200 increases, a display apparatus including the piezoelectric composite layer PCL according to another embodiment of the present disclosure may increase in a sound characteristic of the low-pitched sound band, as well as in a sound characteristic of the high-pitched sound band generated by a vibration of the display panel 100. Thus, flatness of a sound pressure generated by a vibration of the vibration device 200 may be improved due to the increase in sound characteristic of the low-pitched sound band. Also, the display apparatus including the piezoelectric composite layer PCL according to another embodiment of the present disclosure may be used in a flexible display apparatus that may be substantially similar to the display apparatus including the vibration device 200 illustrated in FIG. 4.

Figure 8:
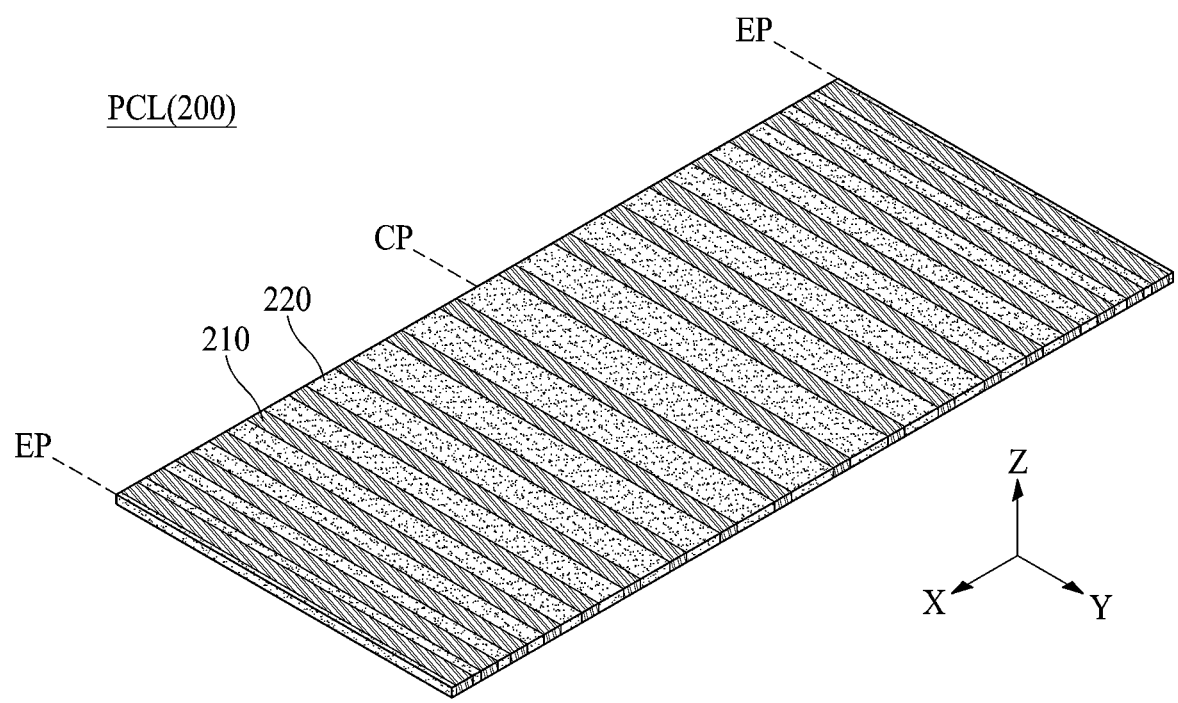
FIG. 8 illustrates a piezoelectric composite according to another embodiment of the present disclosure.
Figure 9:
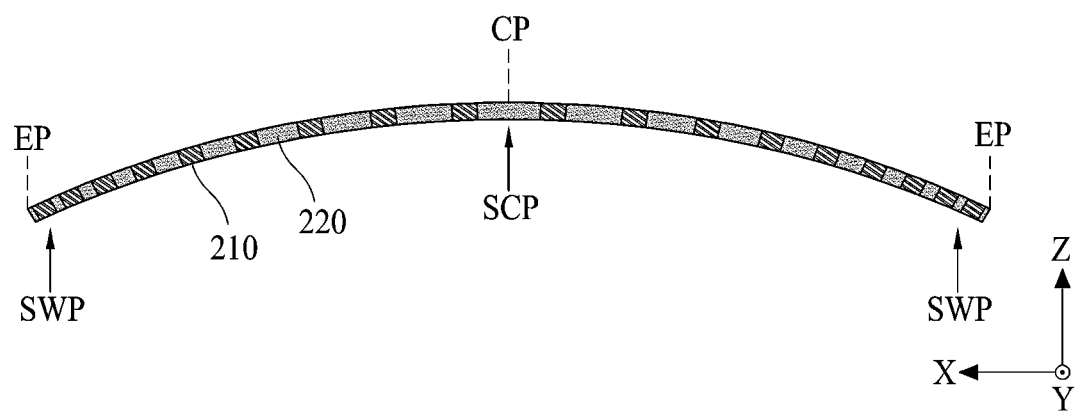
FIG. 9 illustrates a state where both ends of the piezoelectric composite of FIG. 8 is downward folded.

FIG. 8 illustrates a piezoelectric composite layer according to another embodiment of the present disclosure. FIG. 9 illustrates an example in which both ends of the piezoelectric composite layer of FIG. 8 are folded downward.

FIGS. 8 and 9 illustrate an embodiment implemented by modifying the second portions 220 of the piezoelectric composite layer PCL illustrated in FIG. 4. Thus, a repetitive description is omitted or will be briefly given below.

With reference to FIGS. 8 and 9, in the piezoelectric composite layer PCL according to another embodiment (or a fourth embodiment) of the present disclosure, a size (or a width) of each of a plurality of second portions 220, between a plurality of first portions 210, may progressively decrease in a direction from a center portion CP to both edges or both peripheries (or both ends EP) of the piezoelectric composite layer PCL or a vibration device 200.

A largest second portion 220, having a largest size among the plurality of second portions 220, may be located in a portion SCP on which a highest stress may concentrate when the vibration device 200 is vibrating in a vertical direction Z, and a smallest second portion 220, having a smallest size among the plurality of second portions 220, may be located in a portion SWP where a relatively low stress may occur when the vibration device 200 is vibrating in the vertical direction Z. For example, the largest second portion 220, having the largest size among the plurality of second portions 220, may be located in the center portion CP of the vibration device 200, and the smallest second portion 220, having the smallest size among the plurality of second portions 220 may be located in each of the both edges or peripheries EP of the vibration device 200. Therefore, when the vibration device 200 is vibrating in the vertical direction Z, interference of a sound wave or overlapping of a resonance frequency, each occurring in the portion SCP on which the highest stress concentrates, may be reduced or minimized. Thus, dipping phenomenon of a sound pressure occurring in the low-pitched sound band may be reduced, thereby improving flatness of a sound characteristic in the low-pitched sound band. Here, flatness of a sound characteristic may be a level of a deviation between a highest sound pressure and a lowest sound pressure.

The center portion CP of the vibration device 200 may correspond to a second portion 220. The center portion CP of the vibration device 200 may overlap a second portion 220. For example, the center portion CP of the vibration device 200 may overlap a center of the second portion 220. For example, when the vibration device 200 is vibrating in the vertical direction Z, flexibility of the center portion CP of the vibration device 200 may increase. For example, when the center portion CP of the vibration device 200 overlaps a first portion 210 or corresponds to the first portion 210, when the vibration device 200 is vibrating in the vertical direction Z, the first portion 210 may be damaged or reduced in performance due to stress concentrating on the center portion CP of the vibration device 200. Accordingly, when the center portion CP of the vibration device 200 overlaps a second portion 220 or corresponds to the second portion 220, when the vibration device 200 is vibrating in the vertical direction Z, the second portion 220 may not be damaged or reduced in performance in the portion SCP on which stress may concentrate.

For example, each of the plurality of first portions 210 may have the same size (or width).

As another example, each of the plurality of first portions 210 may have different sizes (or widths). For example, a size (or a width) of each of the plurality of first portions 210 may progressively decrease or increase in a direction from the center portion CP to the both edges (or both ends EP) of the piezoelectric composite layer PCL or the vibration device 200. For example, in the vibration device 200, a sound pressure characteristic of a sound may be enhanced and a sound reproduction band may increase, based on various natural vibration frequencies based on a vibration of each of the plurality of first portions 210 having different sizes.

Therefore, the display apparatus including the piezoelectric composite layer PCL according to another embodiment of the present disclosure may be used in a flexible display apparatus that may be substantially similar to a display apparatus including the vibration device 200 illustrated in FIG. 4.

Figure 10:
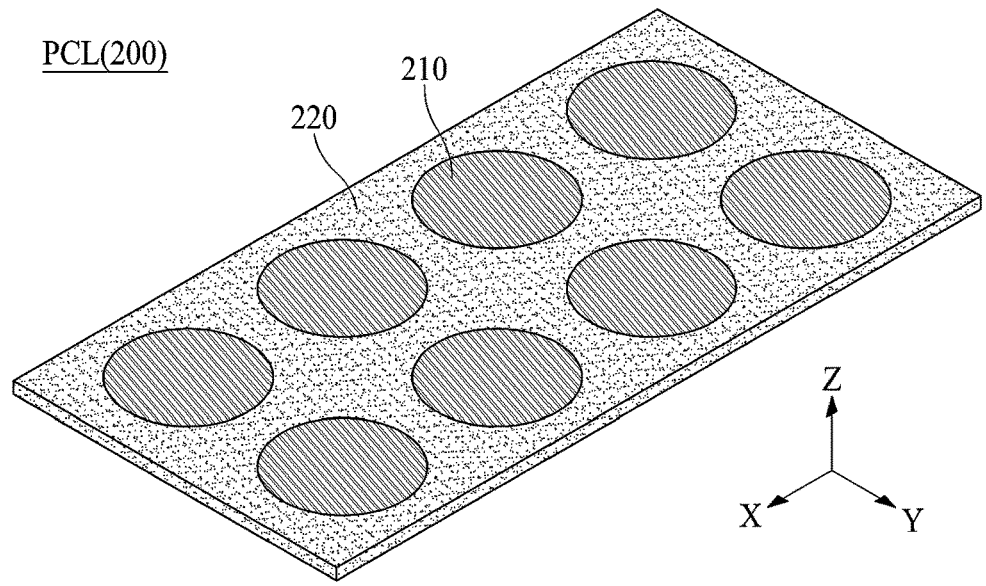
FIG. 10 illustrates a piezoelectric composite according to another embodiment of the present disclosure.

FIG. 10 illustrates a piezoelectric composite layer according to another embodiment (or a fifth embodiment) of the present disclosure.

With reference to FIG. 10, the piezoelectric composite layer PCL according to another embodiment of the present disclosure may include a plurality of first portions 210, which may each have a circular shape. For example, the piezoelectric composite layer PCL may include a plurality of first portions 210 spaced apart from one another, and a second portion 220 surrounding each of the plurality of first portions 210.

Each of the plurality of first portions 210 may have a circular shape. For example, each of the plurality of first portions 210 may have a circular plate shape. Each of the plurality of first portions 210 may include an inorganic material portion having a vibration characteristic as described above. Thus, a repetitive description of the material is omitted.

The second portion 220 may be disposed or filled between the plurality of first portions 210, and may surround a side surface of each of the plurality of first portions 210. The second portion 220 may include an organic material portion having flexibility as described above. Thus, its repetitive description is omitted. The second portion 220 may provide flexibility between two adjacent first portions of the plurality of first portions 210. Thus, a shape of the piezoelectric composite layer PCL or the vibration device 200 may have various shapes, such as a two-dimensional (2D) or three-dimensional (3D) shape, based on deformation occurring between two adjacent first portions of the plurality of first portions 210.

Each of the plurality of first portions 210 may have various shapes, in addition to a circular plate shape. For example, each of the plurality of first portions 210 may have an oval shape, a polygonal shape, or a donut shape, but embodiments of the present disclosure are not limited thereto. For example, an oval shape may include an elliptical shape, an egg-shape, a rectangular shape with rounded corners, or other non-circular curved shape having a width different from its height.

Each of the plurality of first portions 210 may have a dotted shape including, for example, a fine (or micro) circular shape, a fine oval shape, a fine polygonal shape, or a fine donut shape. A shape of a display apparatus including a vibration device 200 including the plurality of first portions 210 may have various shapes, based on flexibility of the second portion 220 between two adjacent first portions of the plurality of first portions 210. For example, a shape of a display panel of a display apparatus including the vibration device 200 illustrated in each of FIGS. 4 to 9 may be a 2D shape, which may be concave or convex, based on the first portions 210 (or an inorganic material portion) having a line shape. As another example, a shape of a display panel of a display apparatus including the vibration device 200 illustrated in FIG. 10 may have various shapes, such as a 3D shape, as well as a 2D shape, based on the first portions 210 (or an inorganic material portion) having a dotted shape. Accordingly, the vibration device 200 including the piezoelectric composite layer PCL according to another embodiment of the present disclosure may be enhanced in degree of freedom in design based on a shape of a display apparatus, and may be applied to a flexible display apparatus having a shape capable of being changed to various shapes, such as a 2D shape or a 3D shape.

Figure 11:
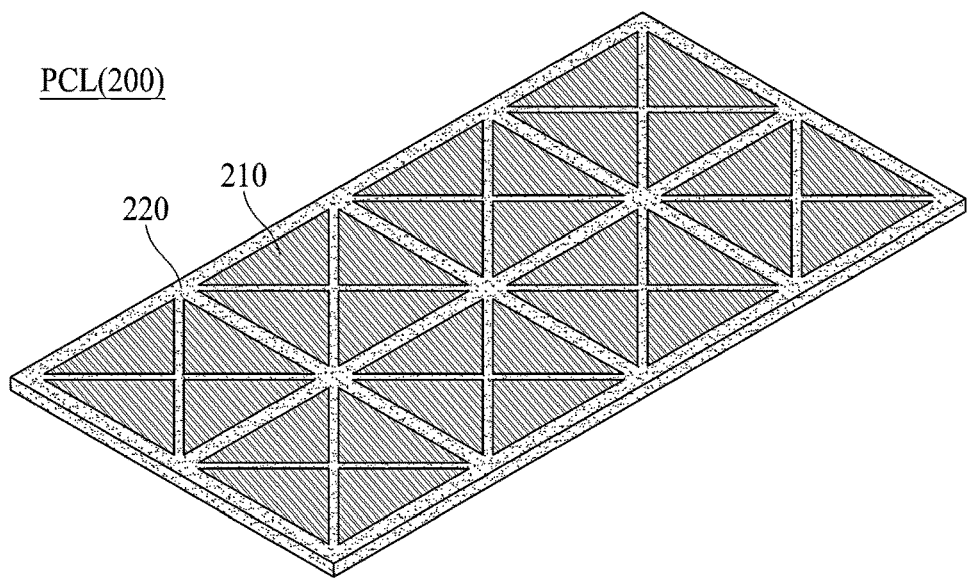
FIG. 11 illustrates a piezoelectric composite according to another embodiment of the present disclosure.
Figure 12:
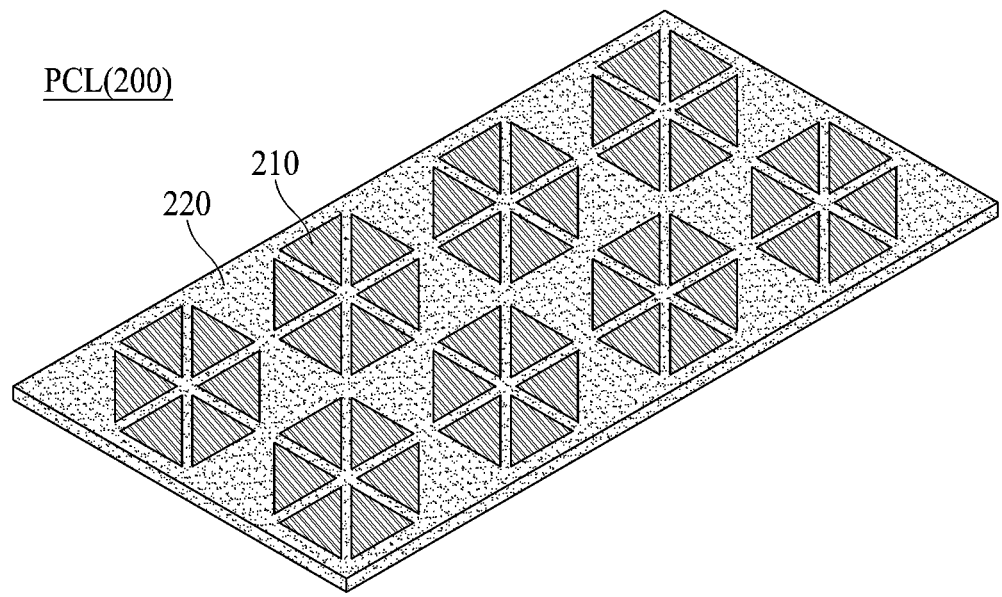
FIG. 12 illustrates another embodiment of the piezoelectric composite illustrated in FIG. 11.

FIG. 11 illustrates a piezoelectric composite layer according to another embodiment (or a sixth embodiment) of the present disclosure. FIG. 12 illustrates an embodiment of the piezoelectric composite layer illustrated in FIG. 11.

With reference to FIG. 11, the piezoelectric composite layer PCL according to another embodiment (or a sixth embodiment) of the present disclosure may include a plurality of first portions 210, which may each have a triangular shape. For example, the piezoelectric composite layer PCL may include a plurality of first portions 210, and a second portion 220 surrounding each of the plurality of first portions 210. For example, the piezoelectric composite layer PCL may include a plurality of first portions 210 spaced apart from one another, and a second portion 220 surrounding each of the plurality of first portions 210.

Each of the plurality of first portions 210 may have a triangular shape. For example, each of the plurality of first portions 210 may have a triangular plate shape. Each of the plurality of first portions 210 may include an inorganic material portion having a vibration characteristic as described above. Thus, its repetitive description is omitted.

For example, four adjacent first portions 210 of the plurality of first portions 210 may be adjacent to one another to form a tetragonal or quadrilateral shape (or a square shape). Vertices of the four adjacent first portions 210 forming a tetragonal shape may be adjacent to one another in a center portion (or a central portion) of the tetragonal shape.

As another example, as illustrated in FIG. 12, six adjacent first portions 210 of the plurality of first portions 210 may be adjacent to one another to form a hexagonal shape (or a regularly hexagonal shape). Vertices of the six adjacent first portions 210 forming a hexagonal shape may be adjacent to one another in a center portion (or a central portion) of the hexagonal shape. Therefore, 2N (where N is a natural number greater than or equal to 2) adjacent first portions 210 of the plurality of first portions 210 may be disposed adjacent to one another to form a 2N-angular shape.

The second portion 220 may be disposed or filled between the plurality of first portions 210. For example, the second portion 220 may surround a side surface of each of the plurality of first portions 210. The second portion 220 may include an organic material portion having flexibility, as described above. Thus, its repetitive description is omitted. The second portion 220 may provide flexibility between two adjacent first portions of the plurality of first portions 210. Thus, a shape of the piezoelectric composite layer PCL or the vibration device 200 may have various shapes, such as a 3D shape, as well as a 2D shape, based on deformation occurring between two adjacent first portions of the plurality of first portions 210.

Therefore, in a display apparatus including a vibration device 200 having the piezoelectric composite layer PCL according to another embodiment of the present disclosure, a display panel may change based on various 3D shape changes of the vibration device 200. Also, the plurality of first portions 210 having a triangular shape may have a fine pattern (or micro pattern) corresponding to various shapes, and a display panel of a display apparatus including the vibration device 200 including the first portions 210 may have various shapes based on flexibility of the second portion 220 between two adjacent first portions of the plurality of first portions 210. Also, a display apparatus including the piezoelectric composite layer PCL according to another embodiment of the present disclosure may be used in a flexible display apparatus that may be substantially similar to a display apparatus including the vibration device 200 illustrated in FIG. 4.

Figure 13:
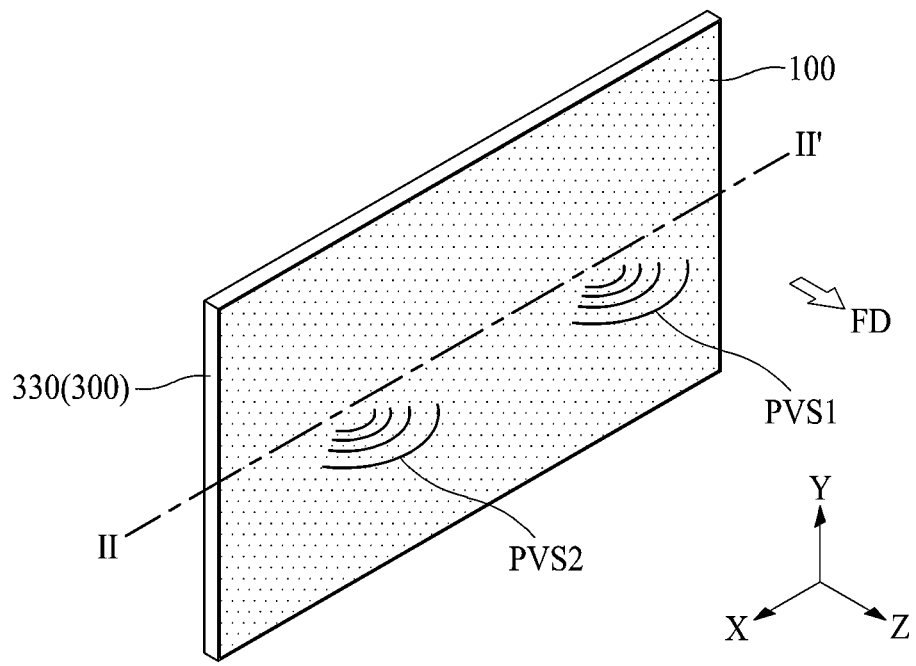
FIG. 13 illustrates a display apparatus according to another embodiment of the present disclosure.
Figure 14:
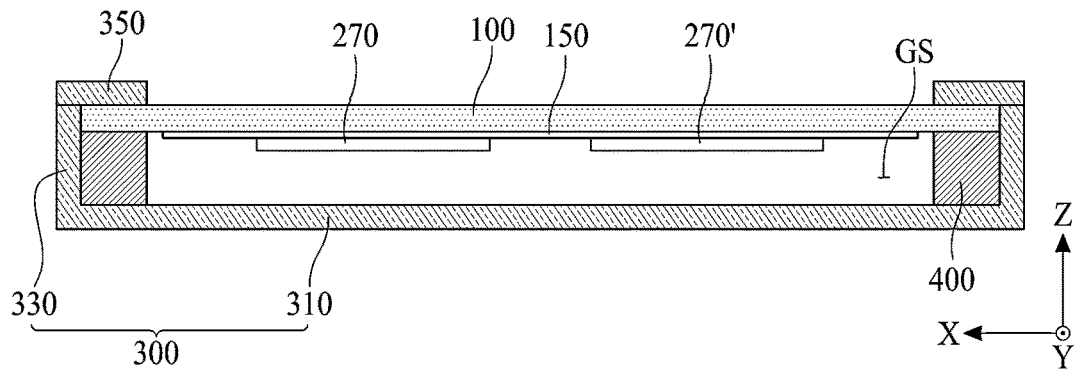
FIG. 14 is a cross-sectional view taken along line II-II' illustrated in FIG. 13.

FIG. 13 illustrates a display apparatus according to another embodiment of the present disclosure, and FIG. 14 is a cross-sectional view taken along line II-IP illustrated in FIG. 13.

With reference to FIGS. 13 and 14, the display apparatus according to another embodiment of the present disclosure may include a vibration device disposed on a rear surface of a display panel 100.

The rear surface (or a back surface) of the display panel 100 may include two regions. A first vibration array 270 may be disposed in a first region of the two regions, and a second vibration array 270' may be disposed in a second region of the two regions. For example, the first vibration array 270 may vibrate the first region of the display panel 100, and thus, may generate a second haptic feedback or a second vibration sound PVS2 in the first region of the display panel 100. For example, the second vibration sound PVS2 may be a left sound. For example, the second vibration array 270' may vibrate the second region of the display panel 100, and thus, may generate a first haptic feedback or a first vibration sound PVS1 in the second region of the display panel 100. For example, the first vibration sound PVS1 may be a right sound.

With reference to FIG. 14, the vibration device according to an embodiment of the present disclosure may include the first vibration array 270 and the second vibration array 270'. The first vibration array 270 and the second vibration array 270' may each include a piezoelectric composite, a first electrode disposed on the piezoelectric composite, and a second electrode disposed under the piezoelectric composite. In each of the first vibration array 270 and the second vibration array 270', the piezoelectric composite, the first electrode, and the second electrode may be the same as the piezoelectric composite layer PCL, the first electrode 230, and the second electrode 240 described above with reference to FIGS. 1 to 12, and thus, their detailed descriptions are omitted.

The first vibration array 270 and the second vibration array 270' may be disposed on the rear surface of the display panel 100 by an adhesive member 150. The adhesive member 150 may be a double-sided tape or an adhesive. For example, an adhesive layer of the adhesive member 150 may include epoxy, acryl, silicone, or urethane, but embodiments are not limited thereto. The adhesive layer of the adhesive member 150 may further include an additive such as a tackifier, a wax component, or an antioxidant, and the additive may prevent the adhesive member 150 from being detached (or stripped) from the display panel 100 by a vibration of the vibration device. For example, the tackfier may be rosin derivatives, the wax component may be paraffin wax, and the antioxidant may be a phenolic antioxidant such as thioester, but embodiments of the present disclosure are not limited thereto.

Figure 15:
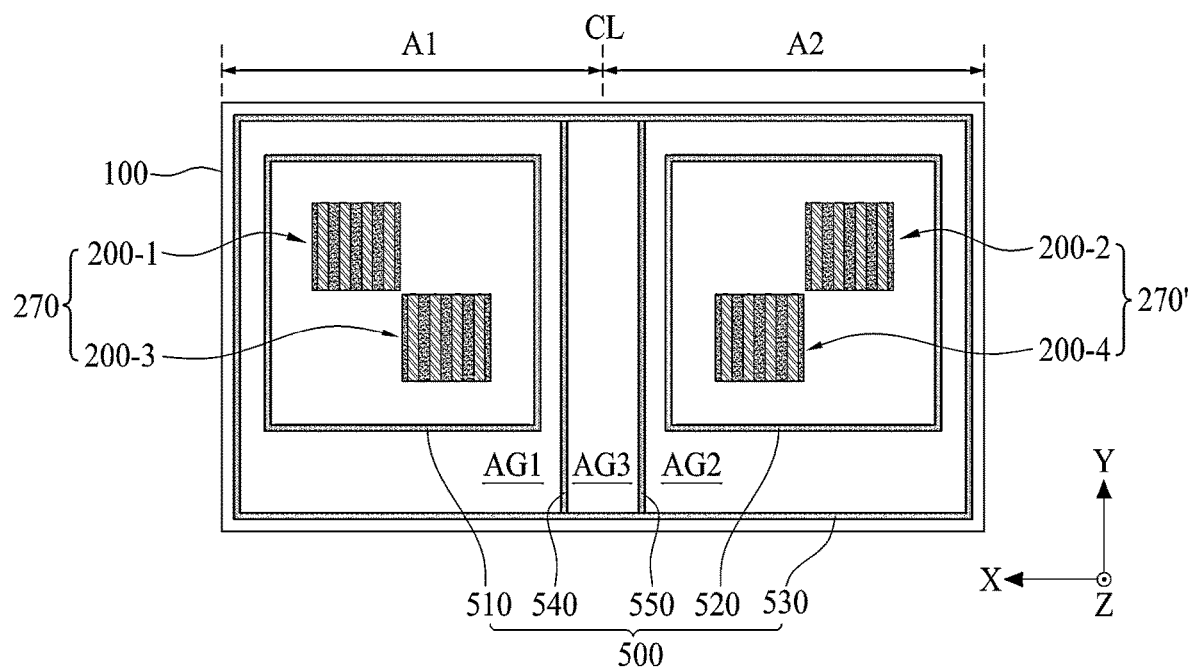
FIG. 15 illustrates a display apparatus including a vibration device according to another embodiment of the present disclosure.

FIG. 15 illustrates a display apparatus including a vibration device according to another embodiment of the present disclosure.

With reference to FIG. 15, a rear surface (or a back surface) of a display panel 100 may include a first region A1 and a second region A2. For example, the rear surface (or the back surface) of the display panel 100 may be divided into the first region A1 and the second region A2. For example, the first region A1 may be a left region of the rear surface of the display panel 100, and the second region A2 may be a right region of the rear surface of the display panel 100. The first region A1 and the second region A2 may be bilaterally symmetric with respect to a center line CL of the display panel 100 in a first direction X.

The vibration device according to an embodiment of the present disclosure may include a vibration array including two or more vibration modules. When the vibration device is configured with one vibration module, the inventors have recognized that a vibration sound for vibrating the display panel 100 is weak or insufficient. For example, when a vibration module is enlarged based on a size of the display panel 100, a weak vibration sound may be solved, but there may be a problem where it is difficult to manufacture a large-sized vibration module due to a yield rate. Therefore, the inventors have recognized that a vibration device should be configured with a vibration array including two or more vibration modules, for realizing a desired vibration sound.

A first vibration array 270 may be disposed in the first region A1 of the display panel 100. The first vibration array 270 may vibrate the first region A1 of the display panel 100, and thus, may generate a second haptic feedback or a second vibration sound PVS2 in the first region A1 of the display panel 100. For example, the second vibration sound PVS2 may be a left sound.

The first vibration array 270 may include a first vibration module 200-1. With respect to the first direction X, the first vibration module 200-1 may be disposed close to a center or an edge (or periphery) of the first region A1 of the display panel 100. For example, the first vibration module 200-1 may be disposed close to a first partition member 510 or a third partition member 530. A size of the first vibration module 200-1 may have a size corresponding to half or more of the first region A1, but is not limited thereto. For example, a size of the first vibration module 200-1 may be adjusted based on a sound characteristic needed for a display apparatus.

A second vibration array 270' may be disposed in the second region A2 of the display panel 100. The second vibration array 270' may vibrate the second region A2 of the display panel 100, and thus, may generate a first haptic feedback or a first vibration sound PVS1 in the second region of the display panel 100. For example, the first vibration sound PVS1 may be a right sound.

The second vibration array 270' may include a second vibration module 200-2. With respect to the first direction X, the second vibration module 200-2 may be disposed close to a center or an edge (or periphery) of the second region A2 of the display panel 100. For example, the second vibration module 200-2 may be disposed close to a second partition member 520 or the third partition member 530. A size of the second vibration module 200-2 may have a size corresponding to half or more of the second region A2, but embodiments are not limited thereto. For example, a size of the second vibration module 200-2 may be set based on a sound characteristic needed for a display apparatus.

Each of the first vibration module 200-1 and the second vibration module 200-2 according to an embodiment of the present disclosure may have a line shape. For example, each of the first vibration module 200-1 and the second vibration module 200-2 may include a piezoelectric composite layer PCL which includes a plurality of first portions 210 spaced apart from one another and a plurality of second portions 220 each disposed between two adjacent first portions 210 of the plurality of first portions 210. This may be substantially the same as the vibration devices 200 illustrated in FIGS. 1 to 9, and thus, their repetitive descriptions are omitted. For example, each of the first vibration module 200-1 and the second vibration module 200-2 may be configured with one or more of the vibration devices 200 according to an embodiment of the present disclosure illustrated in FIGS. 1 to 9.

The vibration device according to an embodiment of the present disclosure may further include a third vibration module 200-3 in the first region A1 of the display panel 100. For example, because the first vibration module 200-1 and the third vibration module 200-3 are provided, a vibration area in the first region A1 of the display panel 100 may increase. Therefore, because the third vibration module 200-3 is further disposed in addition to the first vibration module 200-1, the second vibration sound PVS2 may be more enhanced. Each of the first vibration module 200-1 and the third vibration module 200-3 may vibrate the first region A1 of the display panel 100, and thus, may generate the first haptic feedback or the second vibration sound PVS2 in the first region A1 of the display panel 100. For example, the second vibration sound PVS2 may be a left sound. For example, each of the first vibration module 200-1 and the third vibration module 200-3 may be alternately (or alternatively) disposed or in a diagonal direction, but embodiments are not limited thereto. For example, a vibration area of the first region A1 of the display panel 100 may increase based on a diagonal arrangement structure of the first vibration module 200-1 and the third vibration module 200-3, and thus, a low-pitched sound band characteristic of a left sound may be enhanced.

As another example, the first vibration module 200-1 and the third vibration module 200-3 may be disposed in parallel in the first direction X or a second direction Y in the first region A1 of the display panel 100. Even in this case, a vibration area of the first region A1 of the display panel 100 may increase based on a parallel arrangement structure of the first vibration module 200-1 and the third vibration module 200-3, and thus, a low-pitched sound band characteristic of a left sound may be enhanced. Comparing with the parallel arrangement structure of the first vibration module 200-1 and the third vibration module 200-3, the diagonal arrangement structure of the first vibration module 200-1 and the third vibration module 200-3 may more increase a vibration area of the first region A1 of the display panel 100, and thus, a low-pitched sound band characteristic of a left sound may be more enhanced. The diagonal arrangement structure of the first vibration module 200-1 and the third vibration module 200-3 may have an effect where vibration modules disposed in the first region A1 of the display panel 100 are arranged in a 2×2 structure, and thus, the number of vibration modules vibrating the first region A1 of the display panel 100 may decrease by half.

The vibration device according to an embodiment of the present disclosure may further include a fourth vibration module 200-4 in the second region A2 of the display panel 100. For example, because the second vibration module 200-2 and the fourth vibration module 200-4 are provided, a vibration area in the second region A2 of the display panel 100 may increase. Therefore, because the fourth vibration module 200-4 is further disposed in addition to the second vibration module 200-2, the first vibration sound PVS1 may be more enhanced. Each of the second vibration module 200-2 and the fourth vibration module 200-4 may vibrate the second region A2 of the display panel 100, and thus, may generate the first haptic feedback or the first vibration sound PVS1 in the second region A2 of the display panel 100. For example, the first vibration sound PVS1 may be a right sound. For example, each of the second vibration module 200-2 and the fourth vibration module 200-4 may be alternately (or alternatively) disposed or in a diagonal direction, but is not limited thereto. For example, a vibration area of the second region A2 of the display panel 100 may increase based on a diagonal arrangement structure of the second vibration module 200-2 and the fourth vibration module 200-4, and thus, a low-pitched sound band characteristic of a right sound may be enhanced.

As another example, the second vibration module 200-2 and the fourth vibration module 200-4 may be disposed in parallel in the first direction X or the second direction Y in the second region A2 of the display panel 100. Even in this case, a vibration area of the second region A2 of the display panel 100 may increase based on a parallel arrangement structure of the second vibration module 200-2 and the fourth vibration module 200-4, and thus, a low-pitched sound band characteristic of a right sound may be enhanced. Comparing with the parallel arrangement structure of the second vibration module 200-2 and the fourth vibration module 200-4, the diagonal arrangement structure of the second vibration module 200-2 and the fourth vibration module 200-4 may more increase a vibration area of the second region A2 of the display panel 100, and thus, a low-pitched sound band characteristic of a right sound may be more enhanced. The diagonal arrangement structure of the second vibration module 200-2 and the fourth vibration module 200-4 may have an effect where vibration modules disposed in the second region A2 of the display panel 100 are arranged in a 2×2 structure, and thus, the number of vibration modules vibrating the second region A2 of the display panel 100 may decrease by half.

Each of the second vibration module 200-2 and the fourth vibration module 200-4 according to an embodiment of the present disclosure may be a piezoelectric composite having a line shape. For example, each of the second vibration module 200-2 and the fourth vibration module 200-4 may include a piezoelectric composite layer PCL which includes a plurality of first portions 210 apart from one another and a plurality of second portions 220 each disposed between two adjacent first portions 210 of the plurality of first portions 210. This may be substantially the same as the vibration devices 200 illustrated in FIGS. 1 to 9, and thus, their repetitive descriptions are omitted. For example, each of the second vibration module 200-2 and the fourth vibration module 200-4 may be configured with one or more of the vibration devices 200 according to an embodiment of the present disclosure illustrated in FIGS. 1 to 9.

The first vibration module 200-1 may be disposed close to an edge (or a periphery) of the first region A1 of the display panel 100 with respect to the first direction X. For example, the first vibration module 200-1 may be disposed between a center and the edge of the first region A1 of the display panel 100. For example, the first vibration module 200-1 may be disposed in a left upper region adjacent to an edge of the display panel 100 in the first region A1 of the display panel 100 with respect to the first direction X. Therefore, the first vibration module 200-1 may output a sound having an increased high-pitched sound band. As another example, the first vibration module 200-1 may be implemented so that the first vibration module 200-1 is disposed in a desired region of the display panel 100 to output a sound having one or more of a high-pitched sound band, a middle-pitched sound band, and a low-pitched sound band. For example, the first vibration module 200-1 may be disposed in an upper region of the display panel 100 so that a sound of the high-pitched sound band is output at an upper portion of the display panel 100.

The third vibration module 200-3 may be disposed close to the center line CL of the display panel 100 in the first region A1 of the display panel 100 with respect to the first direction X. For example, the third vibration module 200-3 may be disposed between the center line CL of the display panel 100 and the center of the first region A1. For example, the third vibration module 200-3 may be disposed in a right lower region adjacent to the center line CL of the display panel 100 in the first region A1 of the display panel 100 with respect to the first direction X. The third vibration module 200-3 may be alternately (or alternatively) disposed with respect to the first vibration module 200-1 in the first region A1 of the display panel 100, and thus, may not overlap the first vibration module 200-1 in the first direction X and the second direction Y. Therefore, the third vibration module 200-3 may output a sound having an increased middle-low-pitched sound band. As another example, the third vibration module 200-3 may be implemented so that the third vibration module 200-3 is disposed in a desired region of the display panel 100 to output a sound having one or more of the high-pitched sound band, the middle-pitched sound band, and the low-pitched sound band. For example, the third vibration module 200-3 may be disposed in a lower region of the display panel 100 so that a sound of a middle-low-pitched sound band is output at a lower portion of the display panel 100.

The second vibration module 200-2 may be disposed close to an edge (or a periphery) of the second region A2 of the display panel 100 with respect to the first direction X. For example, the second vibration module 200-2 may be disposed between a center and the edge (or periphery) of the second region A2 of the display panel 100. For example, the second vibration module 200-2 may be disposed in a right upper region adjacent to an edge (or periphery) of the display panel 100 in the second region A2 of the display panel 100 with respect to the first direction X. Therefore, the second vibration module 200-2 may output a sound having an increased high-pitched sound band. Also, the first vibration module 200-1 and the second vibration module 200-2 may be bilaterally symmetric with respect to the center line CL of the display panel 100.

The fourth vibration module 200-4 may be disposed close to the center line CL of the display panel 100 in the second region A2 of the display panel 100 with respect to the first direction X. For example, the fourth vibration module 200-4 may be disposed between the center line CL of the display panel 100 and a center of the second region A2. For example, the fourth vibration module 200-4 may be disposed in a left lower region adjacent to the center line CL of the display panel 100 in the second region A2 of the display panel 100 with respect to the first direction X. The fourth vibration module 200-4 may be alternatively disposed with respect to the second vibration module 200-2 in the second region A2 of the display panel 100 with respect to the first direction X, and thus, may not overlap the second vibration module 200-2 in the first direction X and the second direction Y. Therefore, the fourth vibration module 200-4 may output a sound having an increased middle-low-pitched sound band. Also, the third vibration module 200-3 and the fourth vibration module 200-4 may be bilaterally symmetric with respect to the center line CL of the display panel 100 in a first direction X.

Each of the first to fourth vibration modules 200-1 to 200-4 may further include a first electrode, which is disposed on a first surface of the piezoelectric composite layer PCL and is electrically connected to a first surface of each of the plurality of first portions 210, and a second electrode which is disposed on a second surface, which is opposite to the first surface, of the piezoelectric composite layer PCL and is electrically connected to a second surface of each of the plurality of first portions 210. Also, each of the first to fourth vibration modules 200-1 to 200-4 may further include a first protection layer on the first electrode and a second protection layer under the second electrode. Each of the first electrode, the second electrode, the first protection layer, and the second protection layer is as described above, and thus, their repetitive descriptions are omitted.

The display apparatus according to another embodiment of the present disclosure may further include a first plate disposed between the third vibration module 200-3 and the display panel 100 and a second plate disposed between the fourth vibration module 200-4 and the display panel 100.

The first plate may be coupled or connected to each of the third vibration module 200-3 and the display panel 100 by using an adhesive member. The first plate may transfer a vibration of the third vibration module 200-3 to the display panel 100. Also, the first plate may reinforce a mass of the third vibration module 200-3 to decrease a resonance frequency of the third vibration module 200-3 based on an increased mass, and thus, may increase a sound pressure characteristic of a low-pitched sound band of the third vibration module 200-3, thereby enhancing flatness of a sound characteristic based on a vibration of the display panel 100.

The second plate may be coupled or connected to each of the fourth vibration module 200-4 and the display panel 100 by using an adhesive member. The second plate may transfer a vibration of the fourth vibration module 200-4 to the display panel 100. Also, the second plate may reinforce a mass of the fourth vibration module 200-4 to decrease a resonance frequency of the fourth vibration module 200-4 based on an increased mass, and thus, may increase a sound pressure characteristic of a low-pitched sound band of the fourth vibration module 200-4, thereby enhancing flatness of a sound characteristic based on a vibration of the display panel 100.

The first plate and the second plate according to an embodiment of the present disclosure may include one or more materials of stainless steel, aluminum (Al), a magnesium (Mg), a Mg alloy, a Mg-lithium (Li) alloy, and an Al alloy, but are not limited thereto.

The display apparatus according to an embodiment of the present disclosure may further include a partition 500. The partition 500 may be an air gap or a space, where a sound is generated when the display panel 100 is vibrated by the first to fourth vibration modules 200-1 to 200-4. An air gap or a space for generating or transferring a sound may be referred to as a partition. A partition may separate a sound or a channel and may prevent or decrease the occurrence of a nontransparent sound caused by interference of a sound. A partition may be an enclosure or a baffle, but the terms are not limited thereto.

The partition 500 according to an embodiment of the present disclosure may include a fourth partition member 540 and a fifth partition member 550, which are disposed between the first and second vibration arrays 270 and 270'.

The fourth partition member 540 and the fifth partition member 550 may be disposed between the display panel 100 and a supporting member 300. For example, the fourth partition member 540 and the fifth partition member 550 may be disposed in a center region of the display panel 100. For example, the fourth partition member 540 and the fifth partition member 550 may be disposed in parallel in the center region of the display panel 100. The fourth partition member 540 and the fifth partition member 550 may be disposed on a rear center line CL of the display panel 100 and may divide the first region A1 and the second region A2 of the display panel 100. For example, the fourth partition member 540 and the fifth partition member 550 may separate the first vibration sound PVS1 and the second vibration sound PVS2 respectively generated by the first and second vibration arrays 270 and 270'. For example, the fourth partition member 540 may prevent a vibration, generated by the first vibration array 270 in the first region A1 of the display panel 100, from being transferred to the second region A2 of the display panel 100, or may prevent a vibration, generated by the second vibration array 270' in the second region A2 of the display panel 100, from being transferred to the first region A1 of the display panel 100. Therefore, the fourth partition member 540 and the fifth partition member 550 may attenuate or absorb a vibration of the display panel 100 at a center of the display panel 100, and thus, may prevent a sound of the first region A1 from being transferred to the second region A2 and may prevent a sound of the second region A2 from being transferred to the first region A1. Therefore, the fourth partition member 540 and the fifth partition member 550 may separate a left sound and a right sound, thereby more enhancing a sound output characteristic of the display apparatus. Accordingly, the display apparatus according to an embodiment of the present disclosure may output a two-channel stereo sound to a forward region with respect to the display panel 100 on the basis of separation of the left and right sounds by the fourth partition member 540 and the fifth partition member 550.

For example, the fourth partition member 540 and the fifth partition member 550 may be configured to include a material having an elastic force that enables compression to be made to some degree. For example, the fourth partition member 540 and the fifth partition member 550 may include polyurethane, polyolefin, and/or the like, but embodiments are not limited thereto. As another example, the fourth partition member 540 and the fifth partition member 550 may include a single-sided tape, a single-sided foam pad, a double-sided tape, a double-sided foam tape, or a double-sided foam pad, and/or the like, but embodiments are not limited thereto.

As another example, one of the fourth partition member 540 and the fifth partition member 550 may be omitted. For example, when the fifth partition member 550 of the fourth and fifth partition members 540 and 550 is omitted, the fourth partition member 540 may be between the display panel 100 and the supporting member 300 to correspond to a rear center line CL of the display panel 100. For example, even when one of the fourth partition member 540 and the fifth partition member 550 is between the first vibration array 270 and the second vibration arrays 270', a left sound and a right sound may be separated from each other.

Therefore, the fourth and fifth partition members 540 and 550 may separate a left sound and a right sound to further enhance a sound output characteristic of the display apparatus. A display apparatus including the fourth partition member 540 and/or the fifth partition member 550 may separate the left and right sounds by using the fourth partition member 540 and/or the fifth partition member 550 to output a two-channel stereo sound to the forward region in front of the display panel 100.

The partition 500 according to an embodiment of the present disclosure may further include a third partition member 530 between the display panel 100 and the supporting member 300. For example, the third partition member 530 may be disposed along a space between a rear edge (or a rear periphery) of the display panel 100 and a front edge (or a front periphery) of the supporting member 300 to surround all of the first and second vibration modules 200-1 and 200-2. The third partition member 530 may be referred to as an "edge partition," a "sound blocking member," an "edge enclosure," or a "baffle," but the term is not limited thereto. For example, the third partition member 530 may be adjacent to or in contact with the panel connection member 400 illustrated in FIG. 2, and may be surrounded by the panel connection member 400. As another example, the third partition member 530 may be integrated as one body with the panel connection member 400.

The third partition member 530 may provide first to third air gaps AG1 to AG3 between the display panel 100 and the supporting member 300, along with the fourth and fifth partition members 540 and 550. For example, each of the first to third air gaps AG1 to AG3 may be referred to as a "vibration space," a "sound pressure space," a "sound box," a "sound part," a "resonance box," or a "resonance part," but the term is not limited thereto.

The first air gap AG1 may be provided in the first region A1 of the display panel 100 surrounded by using the fourth partition member 540 and the third partition member 530 disposed in the first region A1 of the display panel 100.

The second air gap AG2 may be provided in the second region A2 of the display panel 100 surrounded by using the fifth partition member 550 and the third partition member 530 disposed in the second region A2 of the display panel 100.

The third air gap AG3 may be provided in a third region (e.g., a center region) of the display panel 100 surrounded by using the fourth and fifth partition members 540 and 550 and the third partition member 530. For example, the third air gap AG3 may be provided between the second air gap AG2 and the first air gap AG1. For example, the third air gap AG3 may be provided between the second air gap AG2 and the first air gap AG1 to include the rear center line CL of the display panel 100. The third air gap AG3 may be referred to as a "sound separation space," a "sound blocking space," or a "sound interference prevention space," but the term is not limited thereto. The third air gap AG3 may spatially separate the first air gap AG1 from the second air gap AG2. Thus, the third air gap AG3 may reduce or prevent a resonance phenomenon or an interference phenomenon that may occur in each of the first air gap AG1 and the second air gap AG2, and may correspond to a certain frequency band.

The first vibration array 270 may be surrounded by the fourth partition member 540 and the third partition member 530 providing the first air gap AG1. The second vibration array 270' may be surrounded by the fifth partition member 550 and the third partition member 530 providing the second air gap AG2.

When one of the fourth and fifth partition members 540 and 550 is omitted, the third air gap AG3 may be omitted.

Therefore, the third partition member 530 may surround an area between the display panel 100 and the supporting member 300, and may individually surround each of the first and second vibration arrays 270 and 270', along with the fourth and fifth partition members 540 and 550, to secure a vibration space of each of the first and second vibration arrays 270 and 270'. Thus, the third partition member 530 may enhance a sound pressure characteristic of left and right sounds, and may reduce or prevent sound or a sound pressure from being leaked to the outside through the side surface between the display panel 100 and the supporting member 300, thereby further enhancing a sound output characteristic of the display apparatus.

The partition 500 according to an embodiment of the present disclosure may further include a first partition member 510 and a second partition member 520. For example, the first partition member 510 may surround the first vibration array 270. The second partition member 520 may surround the second vibration array 270'. For example, the first partition member 510 may surround the first vibration module 200-1 and the third vibration module 200-3. The second partition member 520 may surround the second vibration module 200-2 and the fourth vibration module 200-4.

The first partition member 510 may be disposed between the display panel 100 and the supporting member 300 to correspond to the first air gap AG1, and may surround the first vibration array 270. For example, the first partition member 510 may be disposed between the display panel 100 and the supporting member 300 so as to overlap the first air gap AG1, and may surround the first vibration array 270. The first partition member 510 according to an embodiment of the present disclosure may have a rectangular shape surrounding the first vibration array 270, but embodiments are not limited thereto. For example, the first partition member 510 may have a shape that is the same as or different from a whole shape of the first vibration array 270. For example, the first partition member 510 may have a shape that is the same as or different from a whole shape of the first vibration module 200-1 and the third vibration module 200-3. For example, when the first partition member 510 has a rectangular shape, the first partition member 510 may have a rectangular shape having a size that is relatively greater than that of the first vibration array 270. For example, the first partition member 510 may have a rectangular shape having a size that is relatively greater than that of the first vibration module 200-1 and the third vibration module 200-3. As another example, the first partition member 510 may have a circular shape surrounding the first vibration array 270.

The first partition member 510 may limit (or define) a vibration region (e.g., a vibration area) of the display panel 100 based on the first vibration array 270. For example, the first partition member 510 may limit (or define) a vibration region (e.g., a vibration area) of the display panel 100 based on the first vibration module 200-1 and the third vibration module 200-3. For example, in the first region A1 of the display panel 100, as a size of the first partition member 510 increases, a vibration region of the first region A1 may increase. Thus, a low-pitched sound band characteristic of a left sound may be enhanced. As another example, in the first region A1 of the display panel 100, as a size of the first partition member 510 decreases, the vibration region of the first region A1 may decrease. Thus, a high-pitched sound band characteristic of the left sound may be enhanced. Accordingly, a size of the first partition member 510 may be set based on a desired characteristic of a sound band, based on a vibration of the display panel 100.

The second partition member 520 may be between the display panel 100 and the supporting member 300 to correspond to the second air gap AG2, and may surround the second vibration array 270'. For example, the second partition member 520 may be disposed between the display panel 100 and the supporting member 300 so as to overlap the second air gap AG2, and may surround the second vibration array 270'.

The second partition member 520 according to an embodiment of the present disclosure may have the same shape as that of the first partition member 510 for symmetry of a left sound and a right sound. For example, the first partition member 510 may have a symmetrical structure with the second partition member 520 with respect to the rear center line CL of the display panel 100, but embodiments are not limited thereto. The shape of the second partition member 520 is the same as that described for the first partition member 510, thus, description relevant thereto is omitted.

The second partition member 520 may limit (or define) a vibration region (e.g., a vibration area) of the display panel 100 based on the second vibration array 270'. For example, the second partition member 520 may limit (or define) a vibration region (e.g., a vibration area) of the display panel 100 based on the second vibration module 200-2 and the fourth vibration module 200-4. For example, in the second region A2 of the display panel 100, as a size of the second partition member 520 increases, a vibration region of the second region A2 may increase. Thus, the low-pitched sound band characteristic of the right sound may be enhanced. As another example, in the second region A2 of the display panel 100, as a size of the second partition member 520 decreases, the vibration region of the second region A2 may decrease. Thus, the high-pitched sound band characteristic of the right sound may be enhanced. Accordingly, a size of the second partition member 520 may be set based on a desired characteristic of a sound band, based on a vibration of the display panel 100.

The first and second partition members 510 and 520 may limit a vibration region (e.g., a vibration area) of each of the first and second vibration arrays 270 and 270'. Thus, first and second partition members 510 and 520 may enhance lateral symmetricity of a left sound and a right sound each generated based on a vibration of the display panel 100, and may optimize a sound pressure characteristic and a sound reproduction band of each of the left and right sounds. As another example, when first and second partition members 510 and 520 are provided, the third partition member 530 may be omitted. As another example, when first and second partition members 510 and 520 are provided, one of the third to fifth partition members 530, 540, and 550 may be omitted.

For example, the first to third partition members 510, 520, and 530 may be configured to include a material having an elastic force that enables compression to be made to some degree. For example, the first to third partition members 510, 520, and 530 may include polyurethane, polyolefin, and/or the like, but embodiments are not limited thereto. As another example, the first to third partition members 510, 520, and 530 may include a single-sided tape, a single-sided foam pad, a double-sided tape, a double-sided foam tape, or a double-sided foam pad, and/or the like, but embodiments are not limited thereto.

Therefore, when the display apparatus according to an embodiment of the present disclosure includes the partition 500, the sound pressure characteristic and the sound reproduction band of each of the left and right sounds may be improved or optimized. For example, the display apparatus according to an embodiment of the present disclosure may include at least one of the fourth and fifth partition members 540 and 550. As another example, the display apparatus according to the present embodiment may include the third partition member 530 and at least one of the fourth and fifth partition members 540 and 550. As another example, the display apparatus according to an embodiment of the present disclosure may include the first to third partition members 510, 520, and 530. As another example, the display apparatus according to an embodiment of the present disclosure may include the first and second partition members 510 and 520. As another example, the display apparatus according to an embodiment of the present disclosure may include the first to fifth partition members 510 to 550.

Accordingly, the display apparatus according to another embodiment of the present disclosure may output, by the first and second vibration arrays 270 and 270', a left sound and a right sound to a forward region FD in front of the display panel 100 to provide a stereo sound to a user. Also, the display apparatus according to another embodiment of the present disclosure may separate the left and right sounds by the partition 500 to output a two-channel stereo sound to the forward region FD in front of the display panel 100.

Figure 16A:
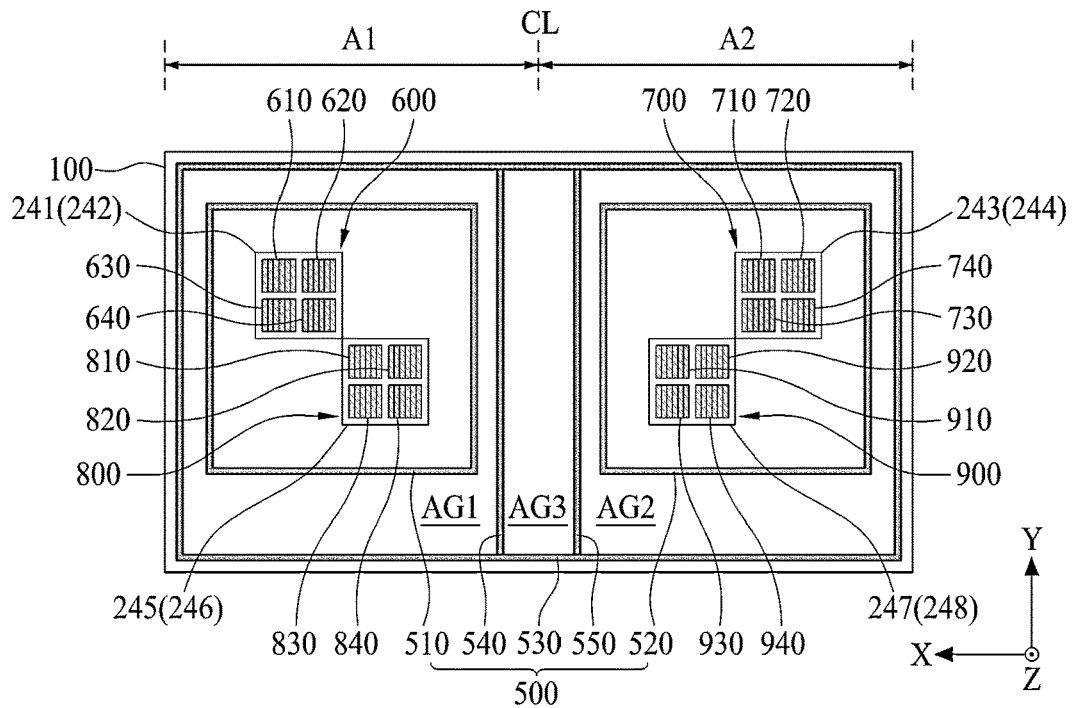
FIGS. 16A and 16B illustrate a display apparatus including a vibration device according to another embodiment of the present disclosure.
Figure 16B:
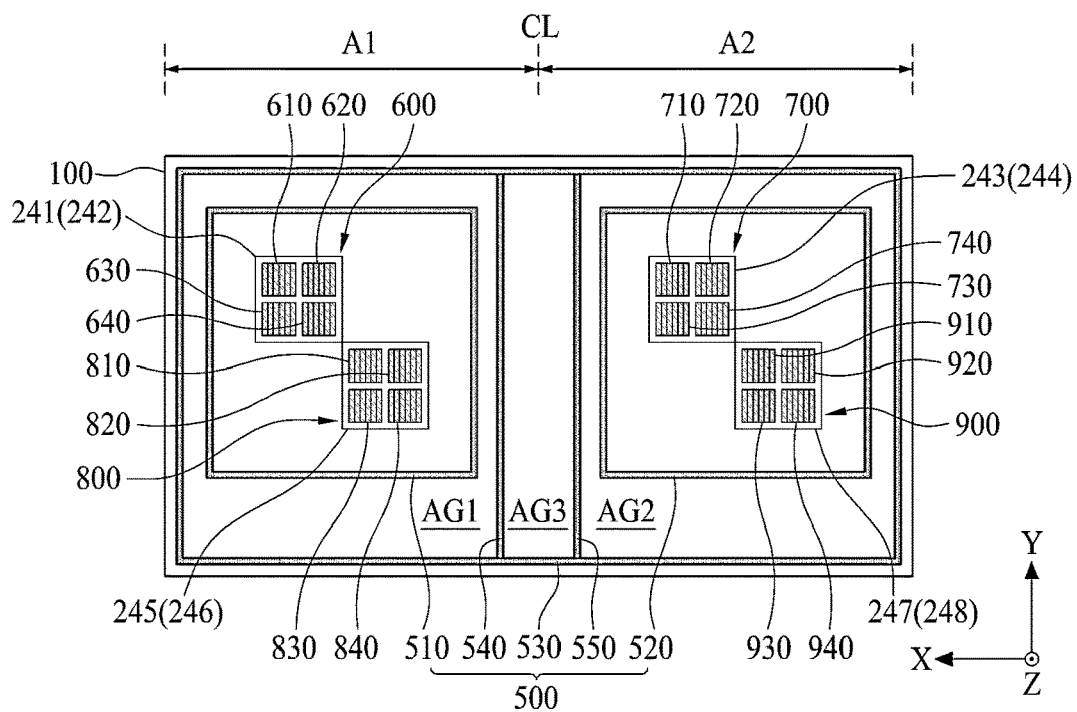

FIGS. 16A and 16B illustrate a display apparatus including a vibration device according to another embodiment of the present disclosure.

With reference to FIGS. 16A and 16B, the vibration device according to another embodiment of the present disclosure may include a $1\text{-}1^{th}$ vibration array 600 and a $2\text{-}1^{th}$ vibration array 700.

The $1\text{-}1^{th}$ vibration array 600 according to an embodiment of the present disclosure may be disposed in a first region A1 of the display panel 100. For example, the $1\text{-}1^{th}$ vibration array 600 may be disposed in the first region A1 of the display panel 100 and may include a plurality of first vibration modules. The plurality of first vibration modules may include N (where N is a natural number of 2 or more) or more first vibration modules. For example, the $1\text{-}1^{th}$ vibration array 600 may include a $1\text{-}1^{th}$ vibration module 610, a $1\text{-}2^{th}$ vibration module 620, a $1\text{-}3^{th}$ vibration module 630, and a $1\text{-}4^{th}$ vibration module 640. However, embodiments of the present disclosure are not limited thereto, and the $1\text{-}1^{th}$ vibration array 600 may include the $1\text{-}1^{th}$ vibration module 610 and the $1\text{-}2^{th}$ vibration module 620.

For example, the 1-1th vibration array 600 may vibrate the first region A1 of the display panel 100, and thus, may generate a first haptic feedback or a first vibration sound in the first region A1 of the display panel 100. When the $1\text{-}1^{th}$ vibration array 600 includes N or more vibration modules, a display apparatus may be provided where the $1\text{-}1^{th}$ vibration array 600 vibrates the display panel 100 to output an enhanced first vibration sound or an enhanced first haptic feedback. Also, the $1\text{-}1^{th}$ vibration array 600 may include a plurality of vibration modules and may be implemented as one film, and thus, a thickness thereof may not increase despite a vibration array which further includes a plurality of vibration modules, thereby providing a display apparatus having an enhanced sound output characteristic or an enhanced haptic feedback characteristic. For example, when the $1\text{-}1^{th}$ vibration array 600 includes a plurality of vibration modules and is implemented as one film, a manufacturing process may be easier than an example where one large vibration module is manufactured. For example, in a case where a vibration module is manufactured based on a certain size, a manufacturing process apparatus for manufacturing a vibration module based on the certain size may be needed, and due to this, there may be a problem where a manufacturing process apparatus based on a size of a vibration module is needed. Accordingly, a plurality of vibration modules may be manufactured as a plurality of vibration arrays on the basis of a desired size, and thus, a vibration module may be manufactured without changing a manufacturing process of apparatus and a degree of freedom in a manufacturing process of a vibration module may be enhanced.

The $2\text{-}1^{th}$ vibration array 700 according to an embodiment of the present disclosure may be disposed in a second region A2 of the display panel 100. For example, the $2\text{-}1^{th}$ vibration array 700 may be disposed in the second region A2 of the display panel 100 and may include a plurality of second vibration modules. The plurality of second vibration modules may include N (where N is a natural number of 2 or more) or more second vibration modules. For example, the $2\text{-}1^{th}$ vibration array 700 may include a $2\text{-}1^{th}$ vibration module 710, a $2\text{-}2^{th}$ vibration module 720, a $2\text{-}3^{th}$ vibration module 730, and a $2\text{-}4^{th}$ vibration module 740. However, the present embodiment is not limited thereto, and the $2\text{-}1^{th}$ vibration array 700 may include the $2\text{-}1^{th}$ vibration module 710 and the $2\text{-}2^{th}$ vibration module 720.

For example, the $2\text{-}1^{th}$ vibration array 700 may vibrate the second region A2 of the display panel 100, and thus, may generate a second haptic feedback or a second vibration sound in the second region A2 of the display panel 100. When the $2\text{-}1^{th}$ vibration array 700 includes N or more vibration modules, a display apparatus may be provided where the $2\text{-}1^{th}$ vibration array 700 vibrates the display panel 100 to output an enhanced second vibration sound or an enhanced second haptic feedback. Also, the $2\text{-}1^{th}$ vibration array 700 may include a plurality of vibration modules and may be implemented as one film, and thus, a thickness thereof may not increase despite a vibration array which further includes a plurality of vibration modules, thereby providing a display apparatus having an enhanced sound output characteristic or an enhanced haptic feedback characteristic.

The $1\text{-}1^{th}$ vibration array 600 and the $2\text{-}1^{th}$ vibration array 700 may be disposed adjacent to an edge (or periphery) of the display panel 100. For example, the $1\text{-}1^{th}$ vibration array 600 and the $2\text{-}1^{th}$ vibration array 700 may be disposed close to the edge of the display panel 100 with respect to a first direction (or an X direction) of the display panel 100. For example, the $1\text{-}1^{th}$ vibration array 600 and the $2\text{-}1^{th}$ vibration array 700 may be disposed adjacent to both edges of the display panel 100. For example, the $1\text{-}1^{th}$ vibration array 600 and the $2\text{-}1^{th}$ vibration array 700 may be disposed close to the both edges (or peripheries) of the display panel 100 with respect to the first direction (or the X direction) of the display panel 100. For example, the $1\text{-}1^{th}$ vibration array 600 may be disposed adjacent to a left portion of the first region A1. For example, the $1\text{-}1^{th}$ vibration array 600 may be disposed close to a left portion of the display panel 100 in the first region A1. For example, the $2\text{-}1^{th}$ vibration array 700 may be disposed adjacent to a right portion of the second region A2. For example, the $2\text{-}1^{th}$ vibration array 700 may be disposed close to a right portion of the display panel 100 in the second region A2. In this case, each of the $1\text{-}1^{th}$ vibration array 600 and the $2\text{-}1^{th}$ vibration array 700 may output a sound having an enhanced high-pitched sound band. For example, the $1\text{-}1^{th}$ vibration array 600 and the $2\text{-}1^{th}$ vibration array 700 may be bilaterally (or left and right) symmetric, and thus, a sound of the first region A1 and a sound of the second region A2 may be output to be symmetric.

The vibration device according to another embodiment of the present disclosure may further include a $1\text{-}2^{th}$ vibration array 800 and a $2\text{-}2^{th}$ vibration array 900.

The $1\text{-}2^{th}$ vibration array 800 according to an embodiment of the present disclosure may be disposed in the first region A1 of the display panel 100. For example, the $1\text{-}2^{th}$ vibration array 800 may be disposed in the first region A1 of the display panel 100 and may include a plurality of third vibration modules. The plurality of third vibration modules may include N (where N is a natural number of 2 or more) or more third vibration modules. For example, the $1\text{-}2^{th}$ vibration array 800 may include a $3\text{-}1^{th}$ vibration module 810, a $3\text{-}2^{th}$ vibration module 820, a $3\text{-}3^{th}$ vibration module 830, and a $3\text{-}4^{th}$ vibration module 840. However, the present embodiment is not limited thereto, and the $1\text{-}2^{th}$ vibration array 800 may include the 3-1$^{th}$ vibration module 810 and the 3-2$^{th}$ vibration module 820.

For example, the 1-2$^{th}$ vibration array 800 may vibrate the first region A1 of the display panel 100, and thus, may generate a first haptic feedback or a first vibration sound in the first region A1 of the display panel 100. When the 1-2$^{th}$ vibration array 800 includes N or more vibration modules, a display apparatus may be provided where the 1-2$^{th}$ vibration array 800 vibrates the display panel 100 to output a more enhanced first vibration sound or a more enhanced first haptic feedback. Also, the 1-2$^{th}$ vibration array 800 may include a plurality of vibration modules and may be implemented as one film (or one-piece film), and thus, a thickness thereof may not increase despite a vibration array which further includes a plurality of vibration modules, thereby providing a display apparatus having an enhanced sound output characteristic or an enhanced haptic feedback characteristic.

For example, the 1-1$^{th}$ vibration array 600 and the 1-2$^{th}$ vibration array 800 may be alternately (or alternatively) disposed or in a diagonal direction. For example, the 1-1$^{th}$ vibration array 600 may be disposed at a left upper portion with respect to the first direction (or the X direction) of the display panel 100. The 1-2$^{th}$ vibration array 800 may be disposed at a left lower portion with respect to the first direction (or the X direction) of the display panel 100. For example, the 1-1$^{th}$ vibration array 600 may be disposed adjacent to a left portion of the first region A1, and the 1-2$^{th}$ vibration array 800 may be disposed adjacent to a right portion of the first region A1. For example, the 1-1$^{th}$ vibration array 600 may be disposed adjacent to an edge (or periphery) of the display panel 100, and the 1-2$^{th}$ vibration array 800 may be disposed adjacent to a center of the display panel 100. For example, the 1-1$^{th}$ vibration array 600 may be disposed close to the edge of the display panel 100, and the 1-2$^{th}$ vibration array 800 may be disposed close to the center of the display panel 100. Because the 1-1$^{th}$ vibration array 600 and the 1-2$^{th}$ vibration array 800 are alternately (or alternatively) disposed or in the diagonal direction, a vibration area of the first region A1 of the display panel 100 may increase, thereby more enhancing a sound output characteristic.

The 2-2$^{th}$ vibration array 900 according to an embodiment of the present disclosure may be disposed in the second region A2 of the display panel 100. For example, the 2-2$^{th}$ vibration array 900 may be disposed in the second region A2 of the display panel 100 and may include a plurality of fourth vibration modules. The plurality of fourth vibration modules may include N (where N is a natural number of 2 or more) or more fourth vibration modules. For example, the 2-2$^{th}$ vibration array 900 may include a 4-1$^{th}$ vibration module 910, a 4-2$^{th}$ vibration module 920, a 4-3$^{th}$ vibration module 930, and a 4-4$^{th}$ vibration module 940. However, embodiments of the present disclosure are not limited thereto, and the 2-2$^{th}$ vibration array 900 may include the 4-1$^{th}$ vibration module 910 and the 4-2$^{th}$ vibration module 920.

For example, the 2-2$^{th}$ vibration array 900 may vibrate the second region A2 of the display panel 100, and thus, may generate a second haptic feedback or a second vibration sound in the second region A2 of the display panel 100. When the 2-2$^{th}$ vibration array 900 includes N or more vibration modules, a display apparatus may be provided where the 2-1$^{th}$ vibration array 700 vibrates the display panel 100 to output a more enhanced second vibration sound or a more enhanced second haptic feedback. Also, the 2-2$^{th}$ vibration array 900 may include a plurality of vibration modules and may be implemented as one film (or one-piece film), and thus, a thickness thereof may not increase despite a vibration array which further includes a plurality of vibration modules, thereby providing a display apparatus having an enhanced sound output characteristic or an enhanced haptic feedback characteristic.

The 2-1$^{th}$ vibration array 700 and the 2-2$^{th}$ vibration array 900 may be alternatively (or alternately) disposed or in a diagonal direction. For example, the 2-1$^{th}$ vibration array 700 may be disposed at a right upper portion with respect to the first direction (or the X direction) of the display panel 100. The 2-2$^{th}$ vibration array 900 may be disposed at a right lower portion with respect to the first direction (or the X direction) of the display panel 100. For example, the 2-1$^{th}$ vibration array 700 may be disposed adjacent to a right portion of the second region A2, and the 2-2$^{th}$ vibration array 900 may be disposed adjacent to a left portion of the second region A2. For example, the 2-1$^{th}$ vibration array 700 may be disposed adjacent to the edge (or periphery) of the display panel 100, and the 2-2$^{th}$ vibration array 900 may be disposed adjacent to the center of the display panel 100. For example, the 2-1$^{th}$ vibration array 700 may be disposed close to the edge of the display panel 100, and the 2-2$^{th}$ vibration array 900 may be disposed close to the center of the display panel 100. Because the 2-1$^{th}$ vibration array 700 and the 2-2$^{th}$ vibration array 900 are alternatively (or alternately) disposed or in the diagonal direction, a vibration area of the second region A2 of the display panel 100 may increase, thereby more enhancing a sound output characteristic.

Each of a plurality of vibration modules in each of the 1-1$^{th}$ vibration array 600, the 1-2$^{th}$ vibration array 800, the 2-1$^{th}$ vibration array 700, and the 2-2$^{th}$ vibration array 900 may be a piezoelectric composite including a first portion and a second portion. For example, each of the plurality of vibration modules included in each of the 1-1$^{th}$ vibration array 600, the 1-2$^{th}$ vibration array 800, the 2-1$^{th}$ vibration array 700, and the 2-2$^{th}$ vibration array 900 may be the piezoelectric composite which includes a plurality of first portions and a second portion disposed between the plurality of first portions. For example, each of the plurality of vibration modules included in each of the 1-1$^{th}$ vibration array 600, the 1-2$^{th}$ vibration array 800, the 2-1$^{th}$ vibration array 700, and the 2-2$^{th}$ vibration array 900 may be one piezoelectric composite which includes a plurality of first portions and a second portion disposed between the plurality of first portions.

With reference to FIGS. 16A and 16B, in each of the plurality of vibration modules included in each of the 1-1$^{th}$ vibration array 600, the 1-2$^{th}$ vibration array 800, the 2-1$^{th}$ vibration array 700, and the 2-2$^{th}$ vibration array 900, an arrangement direction of a first portion and an arrangement direction of a second portion may be the same, but the present embodiment is not limited thereto. For example, an arrangement direction of a first portion and an arrangement direction of a second portion in a plurality of vibration modules may be the same as a lengthwise direction of the display panel 100. For example, an arrangement direction of a first portion and an arrangement direction of a second portion in a plurality of vibration modules may be the same as a second direction (or a Y direction) vertical to the first direction (or the X direction) of the display panel 100.

An arrangement direction of a first portion and an arrangement direction of a second portion in of the 1-1$^{th}$ vibration array 600 may be the same as an arrangement direction of a first portion and an arrangement direction of a second portion in the 1-2$^{th}$ vibration array 800. For example, an arrangement direction of a first portion and an arrangement direction of a second portion in a plurality of first vibration modules and a plurality of third vibration modules may be the same as the lengthwise direction of the display panel 100. An arrangement direction of a first portion and an arrangement direction of a second portion included in the 2-1$^{th}$ vibration array 700 may be the same as an arrangement direction of a first portion and an arrangement direction of a second portion in the 2-2$^{th}$ vibration array 900. For example, an arrangement direction of a first portion and an arrangement direction of a second portion in a plurality of second vibration modules and a plurality of fourth vibration modules may be the same as the lengthwise direction of the display panel 100.

For example, in a piezoelectric composite of each of the 1-1$^{th}$ vibration module 610, the 1-2$^{th}$ vibration module 620, the 1-3$^{th}$ vibration module 630, and the 1-4$^{th}$ vibration module 640 included in the 1-1$^{th}$ vibration array 600, an arrangement direction of a first portion of the piezoelectric composite and an arrangement direction of a second portion of the piezoelectric composite may be the same as the lengthwise direction of the display panel 100. For example, in a piezoelectric composite of each of the 2-1$^{th}$ vibration module 710, the 2-2$^{th}$ vibration module 720, the 2-3$^{th}$ vibration module 730, and the 2-4$^{th}$ vibration module 740 included in the 2-1$^{th}$ vibration array 700, an arrangement direction of a first portion of the piezoelectric composite and an arrangement direction of a second portion of the piezoelectric composite may be the same as the lengthwise direction of the display panel 100. For example, in a piezoelectric composite of each of the 3-1$^{th}$ vibration module 810, the 3-2$^{th}$ vibration module 820, the 3-3$^{th}$ vibration module 830, and the 3-4$^{th}$ vibration module 840 included in the 1-2$^{th}$ vibration array 800, an arrangement direction of a first portion of the piezoelectric composite and an arrangement direction of a second portion of the piezoelectric composite may be the same as the lengthwise direction of the display panel 100. For example, in a piezoelectric composite of each of the 4-1$^{th}$ vibration module 910, the 4-2$^{th}$ vibration module 920, the 4-3$^{th}$ vibration module 930, and the 4-4$^{th}$ vibration module 940 included in the 2-2$^{th}$ vibration array 900, an arrangement direction of a first portion of the piezoelectric composite and an arrangement direction of a second portion of the piezoelectric composite may be the same as the lengthwise direction of the display panel 100.

With reference to FIG. 16B, the 2-1$^{th}$ vibration array 700 and the 2-2$^{th}$ vibration array 900 may be disposed to be asymmetric with the 1-1$^{th}$ vibration array 600 and the 1-2$^{th}$ vibration array 800. The 1-1$^{th}$ vibration array 600 may be disposed at a left portion of the display panel 100 with respect to a first direction (or an X direction) of the display panel 100, and the 2-1$^{th}$ vibration array 700 may be disposed at a center of the display panel 100 with respect to the first direction (or the X direction) of the display panel 100. For example, the 1-2$^{th}$ vibration array 800 and the 2-2$^{th}$ vibration array 900 may be disposed adjacent the 1-1$^{th}$ vibration array 600 and the 2-1$^{th}$ vibration array 700. For example, the 1-1$^{th}$ vibration array 600 may be disposed adjacent to an edge (or periphery) of the display panel 100 with respect to the first direction (or the X direction) of the display panel 100, and the 2-1$^{th}$ vibration array 700 may be disposed adjacent to the center of the display panel 100 with respect to the first direction (or the X direction) of the display panel 100. For example, the 1-1$^{th}$ vibration array 600 may be disposed close to the left portion of the display panel 100 with respect to the first direction (or the X direction) of the display panel 100, and the 2-1$^{th}$ vibration array 700 may be disposed close to the center of the display panel 100 with respect to the first direction (or the X direction) of the display panel 100. The 1-2$^{th}$ vibration array 800 may be disposed at the center of the display panel 100 with respect to the first direction (or the X direction) of the display panel 100, and the 2-2$^{th}$ vibration array 900 may be disposed at a right portion of the display panel 100 with respect to the first direction (or the X direction) of the display panel 100. For example, the 1-2$^{th}$ vibration array 800 may be disposed adjacent to the center of the display panel 100 with respect to the first direction (or the X direction) of the display panel 100, and the 2-2$^{th}$ vibration array 900 may be disposed adjacent to the edge of the display panel 100 with respect to the first direction (or the X direction) of the display panel 100. For example, the 1-2$^{th}$ vibration array 800 may be disposed close to the center of the display panel 100 with respect to the first direction (or the X direction) of the display panel 100, and the 2-2$^{th}$ vibration array 900 may be disposed close to the right portion of the display panel 100 with respect to the first direction (or the X direction) of the display panel 100. In this case, the 1-1$^{th}$ vibration array 600 and the 2-2$^{th}$ vibration array 900 may output a sound of a middle-high-pitched sound band, and the 1-2$^{th}$ vibration array 800 and the 2-1$^{th}$ vibration array 700 may output a sound of a middle-low-pitched sound band.

The display apparatus according to an embodiment of the present disclosure may further include a partition 500. For example, the partition 500 may include a fourth partition member 540 and a fifth partition member 550, which are disposed between the 1-1$^{th}$ vibration array 600 and the 1-2$^{th}$ vibration array 800 and the 2-1$^{th}$ vibration array 700 and the 2-2$^{th}$ vibration array 900. For example, the fourth partition member 540 and the fifth partition member 550 may prevent a vibration, generated by each of the 1-1$^{th}$ vibration array 600 and the 1-2$^{th}$ vibration array 800 in the first region A1 of the display panel 100, from being transferred to the second region A2 of the display panel 100, or may prevent a vibration, generated by each of the 2-1$^{th}$ vibration array 700 and the 2-2$^{th}$ vibration array 900 in the second region A2 of the display panel 100, from being transferred to the first region A1 of the display panel 100.

The partition 500 according to an embodiment of the present disclosure may further include a third partition member 530 disposed between the display panel 100 and a supporting member 300. The third partition member 530 may provide first to third air gaps AG1 to AG3 between the display panel 100 and the supporting member 300 along with the fourth partition member 540 and the fifth partition member 550.

The partition 500 according to an embodiment of the present disclosure may further include a first partition member 510 and a second partition member 520. For example, the first partition member 510 may surround the 1-1$^{th}$ vibration array 600 and the 1-2$^{th}$ vibration array 800. For example, the second partition member 520 may surround the 2-1$^{th}$ vibration array 700 and the 2-2$^{th}$ vibration array 900. The first to fifth partition members are as described with reference to FIG. 15, and thus, their detailed descriptions are omitted. The descriptions of FIGS. 16A and 16B may be identically applied to FIGS. 17A to 23.

Therefore, a vibration device may be implemented with a vibration array including a plurality of vibration modules, and thus, a sound output characteristic of a vibration device may be enhanced. However, when a vibration device is configured with a vibration array including a plurality of vibration modules, the inventors have recognized that a sound pressure level is reduced in a specific frequency. For example, the inventors have recognized that a sound pressure level is reduced in the middle-pitched sound band. The inventors have performed various experiments for analyzing a cause where a sound pressure level is reduced in the middle-pitched sound band. Through the various experiments, the inventors have recognized that resonance or reverse resonance occurs in a boundary between a plurality of vibration modules. The inventors have recognized that a sound pressure level is reduced in a specific frequency due to resonance or reverse resonance. For example, the inventors have recognized that resonance or reverse resonance occurs in a center portion between a plurality of vibration modules, and due to this, a sound pressure level is reduced. For example, the inventors have recognized that resonance or reverse resonance occurs in a center portion of a vibration array where a plurality of vibration modules is disposed. The inventors have performed an experiment for decreasing an interval between a plurality of vibration modules, so as to reduce a reduction in a sound pressure level caused by resonance or reverse resonance. However, the inventors have recognized that it is difficult to perform a process of placing a plurality of vibration modules, and due to this, it is difficult to decrease an interval between a plurality of vibration modules. The inventors have placed an adhesive, such as polyurethane or polyolefin, at a boundary between a plurality of vibration modules. Because the adhesive does not control resonance or reverse resonance at the boundary between the plurality of vibration modules, the inventors have performed various experiments for implementing a material for controlling resonance or reverse resonance. This will be described below.

Figure 17A:
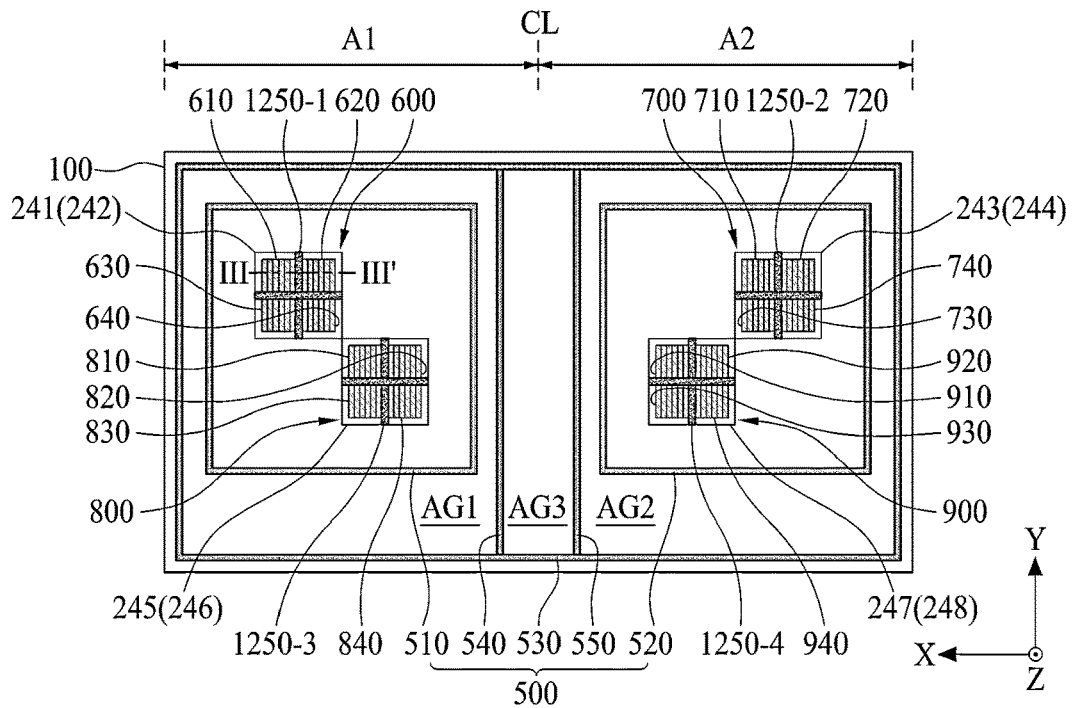
FIGS. 17A and 17B illustrate a display apparatus including a vibration device according to another embodiment of the present disclosure.
Figure 17B:
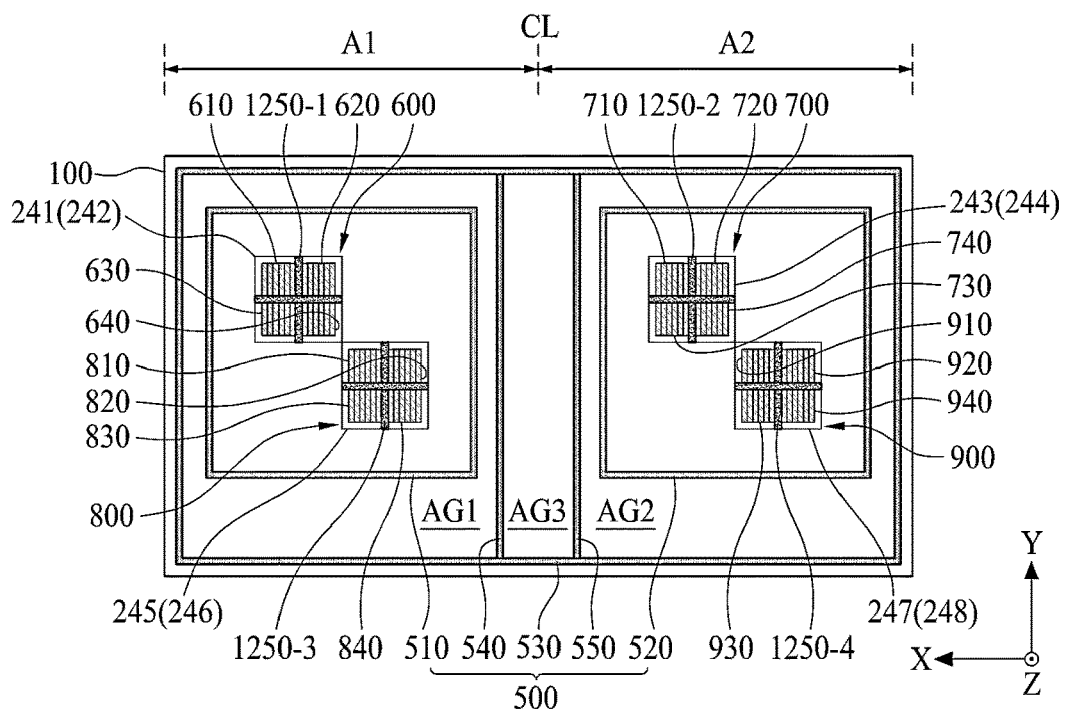
Figure 17C:
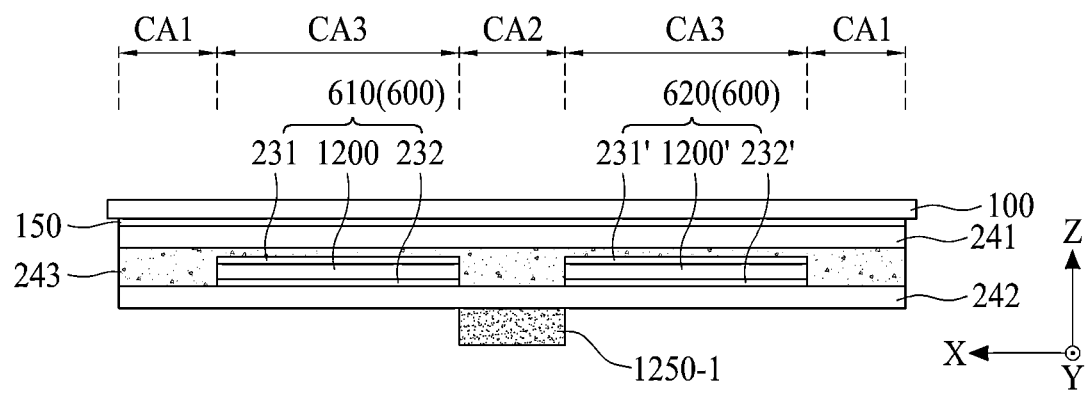
FIG. 17C is a cross-sectional view taken along line illustrated in FIG. 17A.

FIGS. 17A and 17B illustrate a vibration device according to another embodiment of the present disclosure. FIG. 17C is a cross-sectional view taken along line illustrated in FIG. 17A.

With reference to FIGS. 17A and 17B, the vibration device according to another embodiment of the present disclosure may include a 1-1$^{th}$ vibration array 600 and a 2-1$^{th}$ vibration array 700, which are disposed on a rear surface of the display panel 100. For example, the 1-1$^{th}$ vibration array 600 may include a 1-1$^{th}$ vibration module 610, a 1-2$^{th}$ vibration module 620, a 1-3$^{th}$ vibration module 630, and a 1-4$^{th}$ vibration module 640. However, the present embodiment is not limited thereto, and the 1-1$^{th}$ vibration array 600 may include the 1-1$^{th}$ vibration module 610 and the 1-2$^{th}$ vibration module 620. For example, the 2-1$^{th}$ vibration array 700 may include a 2-1$^{th}$ vibration module 710, a 2-2$^{th}$ vibration module 720, a 2-3$^{th}$ vibration module 730, and a 2-4$^{th}$ vibration module 740. However, embodiments of the present disclosure are not limited thereto, and the 2-1$^{th}$ vibration array 700 may include the 2-1$^{th}$ vibration module 710 and the 2-2$^{th}$ vibration module 720. The vibration device according to another embodiment of the present disclosure may include a 1-2$^{th}$ vibration array 800 and a 2-2$^{th}$ vibration array 900, which are disposed on the rear surface of the display panel 100. For example, the 1-2$^{th}$ vibration array 800 may include a 3-1$^{th}$ vibration module 810, a 3-2$^{th}$ vibration module 820, a 3-3$^{th}$ vibration module 830, and a 3-4$^{th}$ vibration module 840. However, embodiments of the present disclosure are not limited thereto, and the 1-2$^{th}$ vibration array 800 may include the 3-1$^{th}$ vibration module 810 and the 3-2$^{th}$ vibration module 820. For example, the 2-2$^{th}$ vibration array 900 may include a 4-1$^{th}$ vibration module 910, a 4-2$^{th}$ vibration module 920, a 4-3$^{th}$ vibration module 930, and a 4-4$^{th}$ vibration module 940. However, embodiments of the present disclosure are not limited thereto, and the 2-2$^{th}$ vibration array 900 may include the 4-1$^{th}$ vibration module 910 and the 4-2$^{th}$ vibration module 920.

A plurality of vibration modules included in each of the 1-1$^{th}$ vibration array 600, the 1-2$^{th}$ vibration array 800, the 2-1$^{th}$ vibration array 700, and the 2-2$^{th}$ vibration array 900 according to an embodiment of the present disclosure may be one composite (or one-piece composite) which includes a plurality of first portions and a second portion disposed between the plurality of first portions. For example, a plurality of second portions instead of the plurality of first portions may be disposed at edges (or peripheries) of the plurality of vibration modules. In a case where the plurality of second portions instead of the plurality of first portions are disposed at the edges of the plurality of vibration modules, a fragile characteristic caused by the plurality of first portions may be complemented, and the reliability of a vibration module caused by a fragile characteristic may be enhanced.

In the vibration device according to another embodiment of the present disclosure, a member may be disposed at a boundary between the 1-1$^{th}$ vibration module 610 and the 1-2$^{th}$ vibration module 620, for decreasing a dip phenomenon or a degradation of sound quality occurring in a boundary region between the 1-1$^{th}$ vibration module 610 and the 1-2$^{th}$ vibration module 620. For example, the member may block or decrease a resonance frequency at a boundary portion between the 1-1$^{th}$ vibration module 610 and the 1-2$^{th}$ vibration module 620.

The vibration device according to another embodiment of the present disclosure may further include a first pad member 1250-1 disposed between the 1-1$^{th}$ vibration module 610 and the 1-2$^{th}$ vibration module 620. The first pad member 1250-1 may be configured to decrease a reduction of a sound pressure level occurring in a boundary between the 1-1$^{th}$ vibration module 610 and the 1-2$^{th}$ vibration module 620. For example, the vibration device may further include the first pad member 1250-1 disposed at the boundary between the 1-1$^{th}$ vibration module 610 and the 1-2$^{th}$ vibration module 620. The vibration device may further include the first pad member 1250-1 disposed between the 1-1$^{th}$ vibration module 610, the 1-2$^{th}$ vibration module 620, the 1-3$^{th}$ vibration module 630, and the 1-4$^{th}$ vibration module 640. For example, the vibration device may further include the first pad member 1250-1 disposed at a boundary between the 1-1$^{th}$ vibration module 610, the 1-2$^{th}$ vibration module 620, the 1-3th vibration module 630, and the 1-4$^{th}$ vibration module 640.

The vibration device according to another embodiment of the present disclosure may further include a second pad member 1250-2 disposed between the 2-1$^{th}$ vibration module 710 and the 2-2$^{th}$ vibration module 720. For example, the vibration device may further include the second pad member 1250-2 disposed at a boundary between the 2-1$^{th}$ vibration module 710 and the 2-2$^{th}$ vibration module 720. The vibration device may further include the second pad member 1250-2 disposed between the 2-1$^{th}$ vibration module 710, the 2-2$^{th}$ vibration module 720, the 2-3$^{th}$ vibration module 730, and the 2-4$^{th}$ vibration module 740. For example, the vibration device may further include the second pad member 1250-2 disposed at a boundary between the 2-1$^{th}$ vibration module 710, the 2-2$^{th}$ vibration module 720, the 2-3$^{th}$ vibration module 730, and the 2-4$^{th}$ vibration module 740.

The vibration device according to another embodiment of the present disclosure may further include a third pad member 1250-3 disposed between the 3-1$^{th}$ vibration module 810 and the 3-2$^{th}$ vibration module 820. For example, the vibration device may further include the third pad member 1250-3 disposed at a boundary between the 3-1$^{th}$ vibration module 810 and the 3-2$^{th}$ vibration module 820. The vibration device may further include the third pad member 1250-3 disposed between the 3-1$^{th}$ vibration module 810, the 3-2$^{th}$ vibration module 820, the 3-3$^{th}$ vibration module 830, and the 3-4$^{th}$ vibration module 840. For example, the vibration device may further include the third pad member 1250-3 disposed at a boundary between the 3-1$^{th}$ vibration module 810, the 3-2$^{th}$ vibration module 820, the 3-3$^{th}$ vibration module 830, and the 3-4$^{th}$ vibration module 840.

The vibration device according to another embodiment of the present disclosure may further include a fourth pad member 1250-4 disposed between the 4-1$^{th}$ vibration module 910 and the 4-2$^{th}$ vibration module 920. For example, the vibration device may further include the fourth pad member 1250-4 disposed at a boundary between the 4-1$^{th}$ vibration module 910 and the 4-2$^{th}$ vibration module 920. The vibration device may further include the fourth pad member 1250-4 disposed between the 4-1$^{th}$ vibration module 910, the 4-2$^{th}$ vibration module 920, the 4-3$^{th}$ vibration module 930, and the 4-4$^{th}$ vibration module 940. For example, the vibration device may further include the fourth pad member 1250-4 disposed at a boundary between the 4-1$^{th}$ vibration module 910, the 4-2$^{th}$ vibration module 920, the 4-3$^{th}$ vibration module 930, and the 9-4$^{th}$ vibration module 940.

A pad member may include a material for absorbing or controlling a vibration. For example, when the pad member includes the same material as that of a partition, the inventors have recognized that the pad member does not absorb or control a vibration. For example, the first pad member 1250-1, the second pad member 1250-2, the third pad member 1250-3, and the fourth pad member 1250-4 may include a material which differs from that of the partition. For example, the first pad member 1250-1, the second pad member 1250-2, the third pad member 1250-3, and the fourth pad member 1250-4 may include one material of a silicone-based polymer, paraffin wax, and an acrylic polymer, but embodiments are not limited thereto. Each of the first pad member 1250-1, the second pad member 1250-2, the third pad member 1250-3, and the fourth pad member 1250-4 may be a resonance control pad, a gap pad, or a resonance controller, but the terms are not limited thereto. Also, the first pad member 1250-1 may decrease heat caused by a vibration of the 1-1$^{th}$ vibration array 600. The second pad member 1250-2 may decrease heat caused by a vibration of the 2-1$^{th}$ vibration array 700. The third pad member 1250-3 may decrease heat caused by a vibration of the 1-2$^{th}$ vibration array 800. The fourth pad member 1250-4 may decrease heat caused by a vibration of the 2-2$^{th}$ vibration array 900. Therefore, because the pad member is provided between a plurality of vibration modules, a reduction in a sound pressure level in a specific frequency may decrease, and a heat dissipation effect of decreasing heat caused by vibrations of the plurality of vibration modules may increase. As another example, a heat dissipation member may be further disposed between the display panel 100 and the vibration device. For example, the heat dissipation member may be disposed on the rear surface of the display panel 100. For example, a size of each of the first to fourth pad members 1250-1 to 1250-4 may be the same as or different from that of a boundary region between the plurality of vibration modules.

With reference to FIG. 17C, the 1-1$^{th}$ vibration array 600 according to an embodiment of the present disclosure may include the 1-1$^{th}$ vibration module 610 and the 1-2$^{th}$ vibration module 620. Hereinafter, the 1-1$^{th}$ vibration array 600 will be described for example, and the following descriptions may be identically applied to the 1-2$^{th}$ vibration array 800, the 2-1$^{th}$ vibration array 700, and the 2-2$^{th}$ vibration array 900.

For example, the 1-1$^{th}$ vibration module 610 may include a piezoelectric composite 1200, a first electrode 231, and a second electrode 232. The first electrode 231 may be disposed on the piezoelectric composite 1200. The second electrode 232 may be disposed under the piezoelectric composite 1200. However, the present embodiment is not limited thereto, and the first electrode 231 may be disposed under the piezoelectric composite 1200 and the second electrode 232 may be disposed on the piezoelectric composite 1200. For example, the 1-2$^{th}$ vibration module 620 may include a piezoelectric composite 1200', a first electrode 231', and a second electrode 232'. The first electrode 231' may be disposed on the piezoelectric composite 1200'. The second electrode 232' may be disposed under the piezoelectric composite 1200'. However, the present embodiment is not limited thereto, and the first electrode 231' may be disposed under the piezoelectric composite 1200' and the second electrode 232' may be disposed on the piezoelectric composite 1200'. For example, the first electrodes 231 and 231' and the second electrodes 232 and 232' may be electrodes for applying a sound signal to the 1-1$^{th}$ vibration module 610 and the 1-2$^{th}$ vibration module 620. The piezoelectric composite 1200', the first electrode 231', and the second electrode 232' may be the same as the piezoelectric composite layer PCL, the first electrode 230, and the second electrode 240 described above with reference to FIGS. 1 to 12, and thus, their detailed descriptions are omitted.

The 1-1$^{th}$ vibration array 600 according to an embodiment of the present disclosure may further include a first protection layer 241 and a second protection layer 242. For example, the first protection layer 241 and the second protection layer 242 may be referred to as a "passivation layer," a "covering layer," "buffering layer," a "protection member," a "passivation member," a "covering member," or a "buffering member," but the term is not limited thereto.

The first protection layer 241 may a first protection layer, and the second protection layer 242 may a second protection layer.

The first protection layer 241 may be disposed on the 1-1$^{th}$ vibration module 610 and the 1-2$^{th}$ vibration module 620. For example, the first protection layer 241 may be disposed on the first electrodes 231 and 231'. The first protection layer 241 may be disposed on the first electrode 231 disposed on the 1-1$^{th}$ vibration module 610 and the first electrode 231' disposed on the 1-2$^{th}$ vibration module 620. The first protection layer 241 may protect the first electrode 231 disposed on the 1-1$^{th}$ vibration module 610 and the first electrode 231' disposed on the 1-2$^{th}$ vibration module 620. For example, the first protection layer 241 may include polyimide (PI) or polyethyleneterephthalate (PET), but is not limited thereto.

The second protection layer 242 may be disposed under the 1-1$^{th}$ vibration module 610 and the 1-2$^{th}$ vibration module 620. For example, the second protection layer 242 may be disposed under the second electrodes 232 and 232'. The second protection layer 242 may be disposed under the second electrode 232 disposed under the 1-1$^{th}$ vibration module 610 and the second electrode 232' disposed under the 1-2$^{th}$ vibration module 620. The second protection layer 242 may protect the second electrode 232 disposed under the 1-1$^{th}$ vibration module 610 and the second electrode 232' disposed under the 1-2$^{th}$ vibration module 620. For example, the second protection layer 242 may include PI or PET, but is not limited thereto. The first protection layer 241 and the second protection layer 242 may be disposed to surround the 1-1$^{th}$ vibration module 610 and the 1-2$^{th}$ vibration module 620. For example, a size of each of the first protection layer 241 and the second protection layer 242 may be greater than or equal to that of each of the 1-1$^{th}$ vibration module 610 and the 1-2$^{th}$ vibration module 620. The first protection layer 241 and the second protection layer 242 may be disposed to surround the 1-1$^{th}$ vibration array 600. For example, a size of each of the first protection layer 241 and the second protection layer 242 may be greater than or equal to that of the 1-1$^{th}$ vibration array 600. For example, the first protection layer 241 and the second protection layer 242 may be vibration plates of the 1-1$^{th}$ vibration module 610 and the 1-2$^{th}$ vibration module 620. The 1-2$^{th}$ vibration array 800 may further include a first protection layer 245 and a second protection layer 245. The first protection layer 245 and the second protection layer 246 may be the same as the first protection layer 241 and the second protection layer 242 of the 1-1$^{th}$ vibration array 600. The 2-1$^{th}$ vibration array 700 may further include a first protection layer 243 and a second protection layer 244. The first protection layer 243 and the second protection layer 244 may be the same as the first protection layer 241 and the second protection layer 242 of the 1-1$^{th}$ vibration array 600. The 2-2$^{th}$ vibration array 900 may further include a first protection layer 247 and a second protection layer 248. The first protection layer 247 and the second protection layer 248 may be the same as the first protection layer 241 and the second protection layer 242 of the 1-1$^{th}$ vibration array 600.

The second protection layer 242 according to an embodiment of the present disclosure may include a connection region. The connection region may include a first connection region CA1, a second connection region CA2, and a third connection region CA3. The connection region may be a region on which the first protection layer 241 and the second protection layer 242 are attached to each other. The connection region may be an attachment region, an adhesive region, and a coupling region, but the terms are not limited thereto.

The first connection region CA1 may be disposed at an edge (or a periphery) of the second protection layer 242. For example, the first connection region CA1 may be disposed on a top surface of the second protection layer 242. For example, the first connection region CA1 may be disposed on the second protection layer 242. For example, the first connection region CA1 may be an edge region between the first protection layer 241 and the second protection layer 242.

The second connection region CA2 may be disposed between the first protection layer 241 and the second protection layer 242. For example, the second connection region CA2 may be disposed between the first protection layer 241 and the second protection layer 242 corresponding to a region between the 1-1$^{th}$ vibration module 610 and the 1-2$^{th}$ vibration module 620.

The third connection region CA3 may be disposed on a top surface of the first protection layer 241. For example, the third connection region CA3 may be disposed on the first protection layer 241. For example, the third connection region CA3 may be disposed on the first protection layer 241 overlapping each of the 1-1$^{th}$ vibration module 610 and the 1-2$^{th}$ vibration module 620. For example, the third connection region CA3 may be disposed on a top surface of the first protection layer 241 overlapping each of the 1-1$^{th}$ vibration module 610 and the 1-2$^{th}$ vibration module 620. The third connection region CA3 may be surrounded by the first connection region CA1 and the second connection region CA2.

The 1-1$^{th}$ vibration array 600 according to an embodiment of the present disclosure may further include a connection member 249 disposed between the first protection layer 241 and the second protection layer 242.

The connection member 249 may be disposed between the first protection layer 241 and the second protection layer 242. For example, the connection member 249 may be disposed between the first protection layer 241 and the second protection layer 242 corresponding to each of the first connection region CA1 and the second connection region CA2. For example, the connection member 249 may connect or couple the first protection layer 241 to the second protection layer 242 in each of the first connection region CA1 and the second connection region CA2.

The connection member 249 may be disposed between the first protection layer 241 and each of the 1-1$^{th}$ vibration module 610 and the 1-2$^{th}$ vibration module 620. For example, the connection member 249 may be disposed between the first protection layer 241 and each of the 1-1$^{th}$ vibration module 610 and the 1-2$^{th}$ vibration module 620 in the third connection region CA3. For example, the connection member 249 may connect or couple the first protection layer 241 to each of the 1-1$^{th}$ vibration module 610 and the 1-2$^{th}$ vibration module 620 in the third connection region CA3.

The 1-1$^{th}$ vibration array 600 according to an embodiment of the present disclosure may further include a power supply line. The power supply line may be implemented on a top surface of the second protection layer 242 so as to be electrically connected to the first electrode 231 and 231' and the second electrode 232 and 232' of each of the 1-1$^{th}$ vibration module 610 and the 1-2$^{th}$ vibration module 620. For example, the power supply line may be implemented on the second protection layer 242 so as to be electrically connected to the first electrode 231 and 231' and the second electrode 232 and 232' of each of the 1-1$^{th}$ vibration module 610 and the 1-2$^{th}$ vibration module 620. For example, the power supply line may include a first power line and a second power line. The first power line may be connected to the first electrode 231 and 231' of each of the 1-1$^{th}$ vibration module 610 and the 1-2$^{th}$ vibration module 620. The second power line may be electrically disconnected from the first power line and may be connected to the second electrode 232 and 232' of each of the 1-1$^{th}$ vibration module 610 and the 1-2$^{th}$ vibration module 620.

For example, the power supply line may be disposed on the second protection layer 242 corresponding to each of the first connection region CA1 and the second connection region CA2. For example, the power supply line may be disposed on a top surface of the second protection layer 242 corresponding to each of the first connection region CA1 and the second connection region CA2.

The connection member 249 may not be disposed on the power supply line. Therefore, the second protection layer 242 may physically contact the power supply line in each of the first connection region CA1 and the second connection region CA2.

Therefore, the first protection layer 241 may be connected to (or attached on) the second protection layer 242 by using the connection member 249, and the 1-1$^{th}$ vibration module 610 and the 1-2$^{th}$ vibration module 620 may be solidly disposed. For example, the first protection layer 241 may be connected to (or attached on) the second protection layer 242 by using the connection member 249 in each of the first connection region CA1 and the second connection region CA2, and the 1-1$^{th}$ vibration module 610 and the 1-2$^{th}$ vibration module 620 may be solidly disposed. For example, the 1-1$^{th}$ vibration module 610 and the 1-2$^{th}$ vibration module 620 may be solidly disposed by each of the first to third connection regions CA1 to CA3. For example, the 1-1$^{th}$ vibration array 600 may be solidly disposed by each of the first to third connection regions CA1 to CA3.

The 1-1$^{th}$ vibration module 610 and the 1-2$^{th}$ vibration module 620 may be disposed on the rear surface of the display panel 100 by an adhesive member 150. The adhesive member 150 may be a double-sided tape or an adhesive. For example, an adhesive layer of the adhesive member 150 may include epoxy, acryl, silicone, or urethane, but is not limited thereto. The adhesive layer of the adhesive member 150 may further include an additive such as a tackifier, a wax component, or an antioxidant, and the additive may prevent the adhesive member 150 from being detached (or stripped) from the display panel 100 by a vibration of the vibration device. For example, the tackifier may be rosin derivatives, the wax component may be paraffin wax, and the antioxidant may be a phenolic antioxidant such as thioester, but embodiments of the present disclosure are not limited thereto. The descriptions of FIG. 17A to 17C may be identically applied to FIGS. 18A to 23.

With reference to FIGS. 17A and 17B, the display apparatus according to an embodiment of the present disclosure may further include a partition 500. The partition 500 may include a first partition member 510 surrounding the 1-1$^{th}$ vibration array 600 and the 1-2$^{th}$ vibration array 800. The partition 500 may include a second partition member 520 surrounding the 2-1$^{th}$ vibration array 700 and the 2-2$^{th}$ vibration array 900. For example, the partition 500 may include a third partition member 530 disposed at an edge (or periphery) of the display panel 100. For example, the third partition member 530 may be disposed to surround the edge of the display panel 100. The third partition member 530 may be disposed between the display panel 100 and a supporting member 300. For example, the partition 500 may further include one or more partition members disposed between a first region A1 and a second region A2. A fourth partition member 540 and a fifth partition member 550 may be disposed between the first region A1 and the second region A2. The partition 500 is as described above with reference to FIGS. 15, 16A, and 16B, and thus, its detailed description is omitted.

Each of a plurality of vibration modules included in each of the 1-1$^{th}$ vibration array 600, the 1-2$^{th}$ vibration array 800, the 2-1$^{th}$ vibration array 700, and the 2-2$^{th}$ vibration array 900 may be a piezoelectric composite including a first portion and a second portion. With reference to FIGS. 17A and 17B, an arrangement direction of a first portion and an arrangement direction of a second portion in each of the plurality of vibration modules may be the same, but the present embodiment is not limited thereto. For example, an arrangement direction of a first portion and an arrangement direction of a second portion in a plurality of vibration modules may be the same as a lengthwise direction of the display panel 100. For example, an arrangement direction of a first portion and an arrangement direction of a second portion in a plurality of vibration modules may be the same as a second direction (or the Y direction) vertical to the first direction (or the X direction) of the display panel 100.

An arrangement direction of a first portion and an arrangement direction of a second portion in of the 1-1$^{th}$ vibration array 600 and may be the same as an arrangement direction of a first portion and an arrangement direction of a second portion in the 1-2$^{th}$ vibration array 800. For example, an arrangement direction of a first portion and an arrangement direction of a second portion in a plurality of first vibration modules and a plurality of third vibration modules may be the same as the lengthwise direction of the display panel 100. An arrangement direction of a first portion and an arrangement direction of a second portion in each of the 2-1$^{th}$ vibration array 700 and the 2-2$^{th}$ vibration array 900 may be the same. For example, an arrangement direction of a first portion and an arrangement direction of a second portion in a plurality of second vibration modules and a plurality of fourth vibration modules may be the same as the lengthwise direction of the display panel 100.

For example, in a piezoelectric composite of each of the 1-1$^{th}$ vibration module 610, the 1-2$^{th}$ vibration module 620, the 1-3$^{th}$ vibration module 630, and the 1-4$^{th}$ vibration module 640 included in the 1-1$^{th}$ vibration array 600, an arrangement direction of a first portion of the piezoelectric composite and an arrangement direction of a second portion of the piezoelectric composite may be the same as the lengthwise direction of the display panel 100. For example, in a piezoelectric composite of each of the 2-1$^{th}$ vibration module 710, the 2-2$^{th}$ vibration module 720, the 2-3$^{th}$ vibration module 730, and the 2-4$^{th}$ vibration module 740 included in the 2-1$^{th}$ vibration array 700, an arrangement direction of a first portion of the piezoelectric composite and an arrangement direction of a second portion of the piezoelectric composite may be the same as the lengthwise direction of the display panel 100. For example, in a piezoelectric composite of each of the 3-1$^{th}$ vibration module 810, the 3-2$^{th}$ vibration module 820, the 3-3$^{th}$ vibration module 830, and the 3-4$^{th}$ vibration module 840 included in the 1-2$^{th}$ vibration array 800, an arrangement direction of a first portion of the piezoelectric composite and an arrangement direction of a second portion of the piezoelectric composite may be the same as the lengthwise direction of the display panel 100. For example, in a piezoelectric composite of each of the 4-1$^{th}$ vibration module 910, the 4-2$^{th}$ vibration module 920, the 4-3$^{th}$ vibration module 930, and the 4-4$^{th}$ vibration module 940 included in the 2-2$^{th}$ vibration array 900, an arrangement direction of a first portion of the piezoelectric composite and an arrangement direction of a second portion of the piezoelectric composite may be the same as the lengthwise direction of the display panel 100. However, embodiments of the present disclosure are not limited thereto, and an arrangement direction of a first portion and an arrangement direction of a second portion may be the same as a widthwise direction of the display panel 100. This will be described with reference to FIGS. 18A and 18B.

Figure 18A:
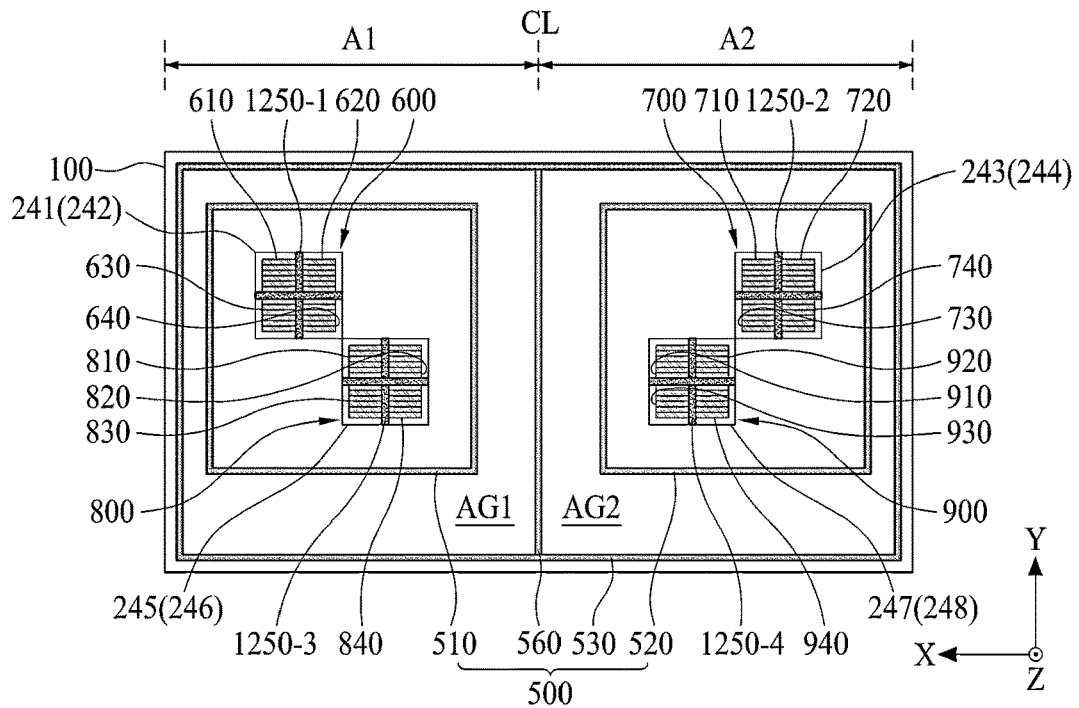
FIGS. 18A and 18B illustrate a display apparatus including a vibration device according to another embodiment of the present disclosure.
Figure 18B:
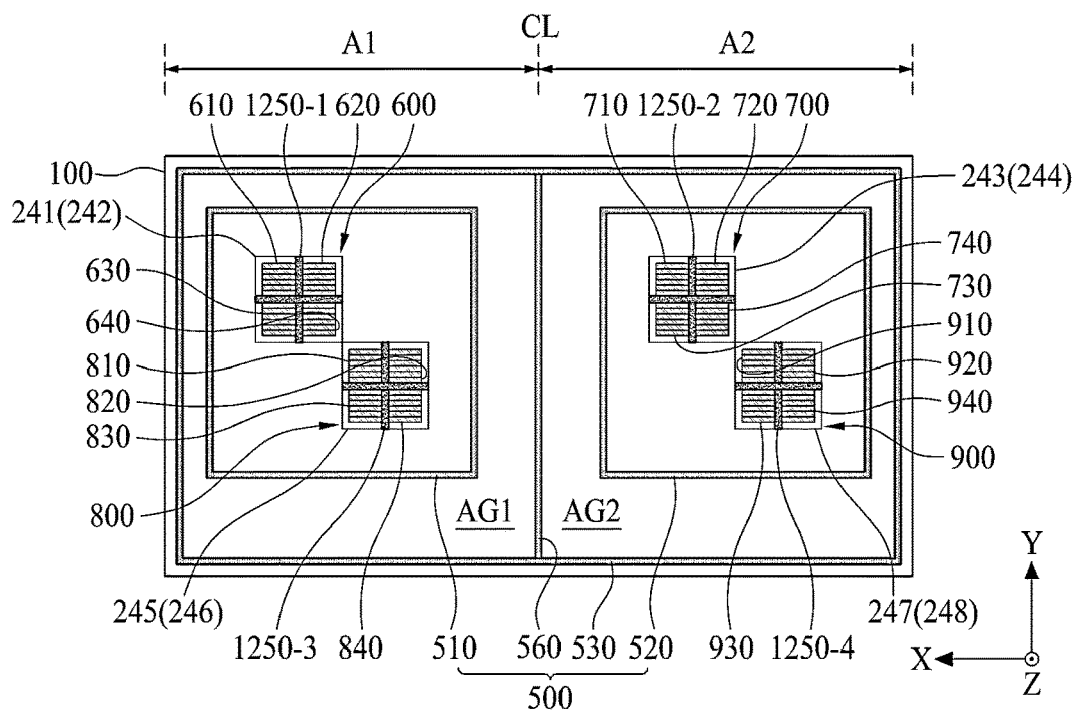
Figure 19A:
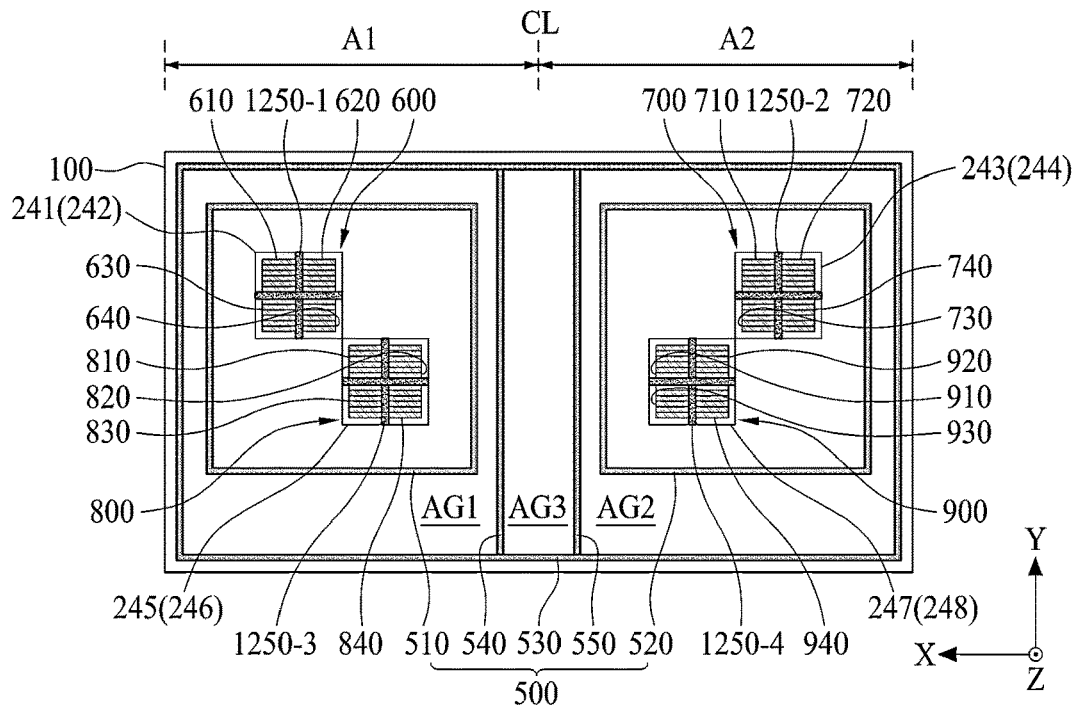
FIGS. 19A and 19B illustrate a display apparatus including a vibration device according to another embodiment of the present disclosure.
Figure 19B:
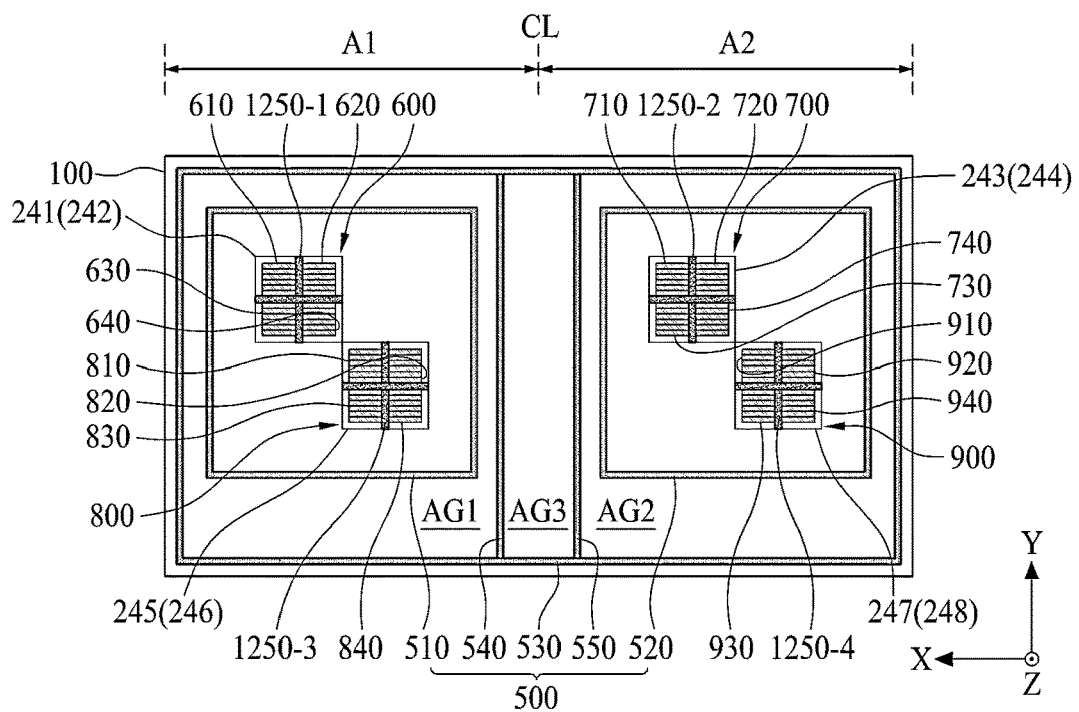

FIGS. 18A and 18B illustrate a vibration device according to another embodiment of the present disclosure. FIGS. 19A and 19B illustrate a vibration device according to another embodiment of the present disclosure.

FIGS. 18A to 19B illustrate an embodiment where an arrangement direction of a first portion and an arrangement direction of a second portion of a piezoelectric composite included in a vibration module are the same as a widthwise direction of a display panel, and descriptions which are the same as descriptions given above with reference to FIGS. 17A to 17C will be briefly given below or are omitted.

For example, each of a plurality of vibration modules included in each of a 1-1$^{th}$ vibration array 600, a 1-2$^{th}$ vibration array 800, a 2-1$^{th}$ vibration array 700, and a 2-2$^{th}$ vibration array 900 may be a piezoelectric composite including a first portion and a second portion. With reference to FIGS. 18A and 18B, an arrangement direction of a first portion and an arrangement direction of a second portion in each of the plurality of vibration modules may be the same, but the present embodiment is not limited thereto. For example, an arrangement direction of a first portion and an arrangement direction of a second portion in a plurality of vibration modules may be the same as a widthwise direction of a display panel 100. For example, an arrangement direction of a first portion and an arrangement direction of a second portion in a plurality of vibration modules may be the same as a first direction (or the X direction) vertical to the second direction (or the Y direction) of the display panel 100.

An arrangement direction of a first portion and an arrangement direction of a second portion in each of the 1-1$^{th}$ vibration array 600 and the 1-2$^{th}$ vibration array 800 may be the sames. For example, an arrangement direction of a first portion and an arrangement direction of a second portion in a plurality of first vibration modules and a plurality of third vibration modules may be the same as the widthwise direction of the display panel 100. An arrangement direction of a first portion and an arrangement direction of a second portion in the 2-1$^{th}$ vibration array 700 may be the same as an arrangement direction of a first portion and an arrangement direction of a second portion in the 2-2$^{th}$ vibration array 900. For example, an arrangement direction of a first portion and an arrangement direction of a second portion in a plurality of second vibration modules and a plurality of fourth vibration modules may be the same as the widthwise direction of the display panel 100.

For example, in a piezoelectric composite of each of the 1-1$^{th}$ vibration module 610, the 1-2$^{th}$ vibration module 620, the 1-3$^{th}$ vibration module 630, and the 1-4$^{th}$ vibration module 640 included in the 1-1$^{th}$ vibration array 600, an arrangement direction of a first portion of the piezoelectric composite and an arrangement direction of a second portion of the piezoelectric composite may be the same as the widthwise direction of the display panel 100. For example, in a piezoelectric composite of each of the 2-1$^{th}$ vibration module 710, the 2-2$^{th}$ vibration module 720, the 2-3$^{th}$ vibration module 730, and the 2-4$^{th}$ vibration module 740 included in the 2-1$^{th}$ vibration array 700, an arrangement direction of a first portion of the piezoelectric composite and an arrangement direction of a second portion of the piezoelectric composite may be the same as the widthwise direction of the display panel 100. For example, in a piezoelectric composite of each of the 3-1$^{th}$ vibration module 810, the 3-2$^{th}$ vibration module 820, the 3-3$^{th}$ vibration module 830, and the 3-4$^{th}$ vibration module 840 included in the 1-2$^{th}$ vibration array 800, an arrangement direction of a first portion of the piezoelectric composite and an arrangement direction of a second portion of the piezoelectric composite may be the same as the widthwise direction of the display panel 100. For example, in a piezoelectric composite of each of the 4-1$^{th}$ vibration module 910, the 4-2$^{th}$ vibration module 920, the 4-3$^{th}$ vibration module 930, and the 4-4$^{th}$ vibration module 940 included in the 2-2$^{th}$ vibration array 900, an arrangement direction of a first portion of the piezoelectric composite and an arrangement direction of a second portion of the piezoelectric composite may be the same as the widthwise direction of the display panel 100.

With reference to FIGS. 18A and 18B, a display apparatus according to an embodiment of the present disclosure may further include a partition 500. The partition 500 may include a first partition member 510 surrounding the 1-1$^{th}$ vibration array 600 and the 1-2$^{th}$ vibration array 800 and a second partition member 520 surrounding the 2-1$^{th}$ vibration array 700 and the 2-2$^{th}$ vibration array 900. For example, the partition 500 may further include a third partition member 530 disposed between the display panel 100 and a supporting member 300. For example, the partition 500 may further include a sixth partition member 560 disposed between a first region A1 and a second region A2. The sixth partition member 560 may prevent a vibration, generated by each of the 1-1$^{th}$ vibration array 600 and the 1-2$^{th}$ vibration array 800 in the first region A1 of the display panel 100, from being transferred to the second region A2 of the display panel 100, or may prevent a vibration, generated by each of the 2-1$^{th}$ vibration array 700 and the 2-2$^{th}$ vibration array 900 in the second region A2 of the display panel 100, from being transferred to the first region A1 of the display panel 100.

As another example, as illustrated in FIGS. 19A and 19B, the display apparatus according to an embodiment of the present disclosure may further include one or more partitions between the first region A1 and the second region A2. For example, the fourth partition member 540 and the fifth partition member 550 may be disposed between the first region A1 and the second region A2. The partition 500 is as described above with reference to FIGS. 15, 16A, and 16B, and thus, its detailed description is omitted.

With reference to FIGS. 18A to 19B, the display apparatus according to an embodiment of the present disclosure may further include a first pad member 1250-1 disposed between the 1-1$^{th}$ vibration module 610 and the 1-2$^{th}$ vibration module 620. The display apparatus may further include the first pad member 1250-1 disposed between the 1-1$^{th}$ vibration module 610, the 1-2$^{th}$ vibration module 620, the 1-3$^{th}$ vibration module 630, and the 1-4$^{th}$ vibration module 640.

The display apparatus according to an embodiment of the present disclosure may further include a second pad member 1250-2 disposed between the 2-1$^{th}$ vibration module 710 and the 2-2$^{th}$ vibration module 720. The display apparatus may further include the second pad member 1250-2 disposed between the 2-1$^{th}$ vibration module 710, the 2-2$^{th}$ vibration module 720, the 2-3$^{th}$ vibration module 730, and the 2-4$^{th}$ vibration module 740.

The display apparatus according to an embodiment of the present disclosure may further include a third pad member 1250-3 disposed between the 3-1$^{th}$ vibration module 810 and the 3-2$^{th}$ vibration module 820. The display apparatus may further include the third pad member 1250-3 disposed between the 3-1$^{th}$ vibration module 810, the 3-2$^{th}$ vibration module 820, the 3-3$^{th}$ vibration module 830, and the 3-4$^{th}$ vibration module 840.

The display apparatus according to an embodiment of the present disclosure may further include a fourth pad member 1250-4 disposed between the 4-1$^{th}$ vibration module 910 and the 4-2$^{th}$ vibration module 920. The display apparatus may further include the fourth pad member 1250-4 disposed between the 4-1$^{th}$ vibration module 910, the 4-2$^{th}$ vibration module 920, the 4-3$^{th}$ vibration module 930, and the 4-4$^{th}$ vibration module 940.

Figure 20A:
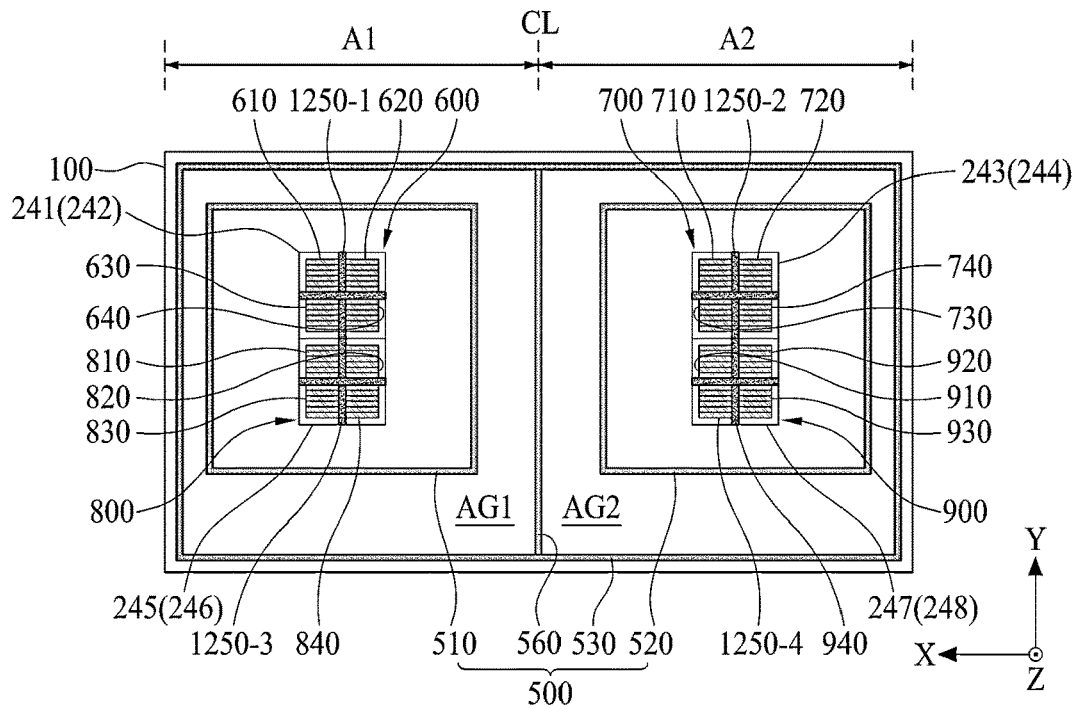
FIGS. 20A and 20B illustrate a display apparatus including a vibration device according to another embodiment of the present disclosure.
Figure 20B:
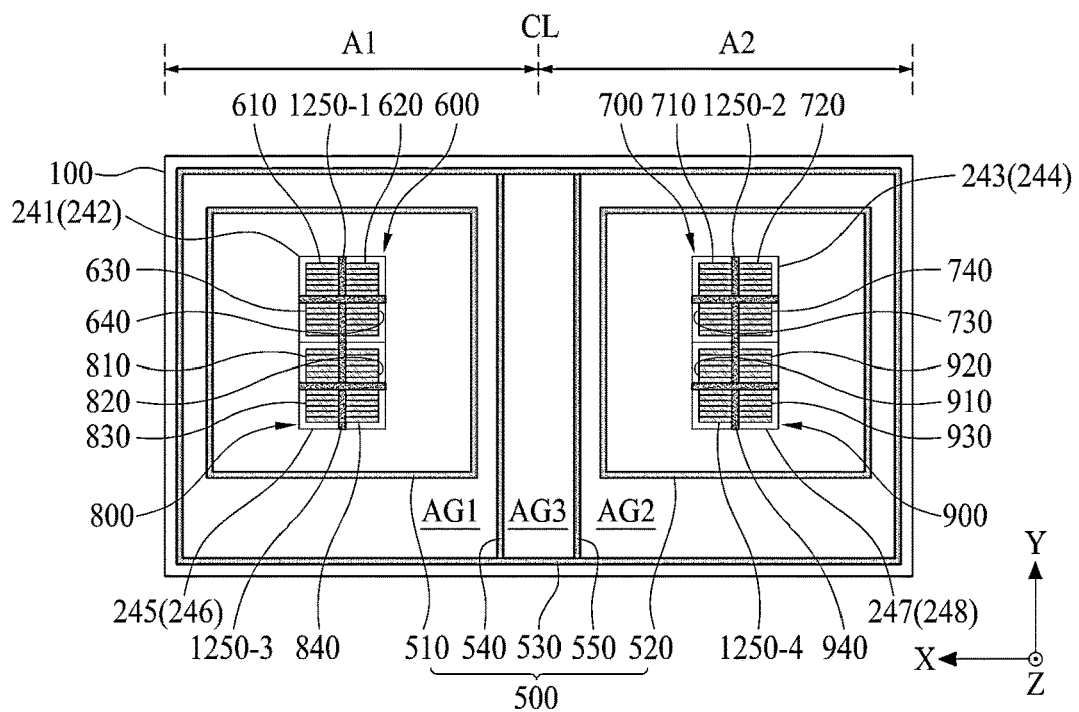

FIGS. 20A and 20B illustrate a vibration device according to another embodiment of the present disclosure.

With reference to FIGS. 20A and 20B, the vibration device according to another embodiment of the present disclosure may include a 1-1$^{th}$ vibration array 600 and a 1-2$^{th}$ vibration array 800, which are disposed on a rear surface of a display panel 100. The 1-1$^{th}$ vibration array 600 and the 1-2$^{th}$ vibration array 800 may be disposed in a first region A1 of the display panel 100. For example, the 1-1$^{th}$ vibration array 600 may include a 1-1$^{th}$ vibration module 610, a 1-2$^{th}$ vibration module 620, a 1-3$^{th}$ vibration module 630, and a 1-4$^{th}$ vibration module 640. However, embodiments of the present disclosure are not limited thereto, and the 1-1$^{th}$ vibration array 600 may include the 1-1$^{th}$ vibration module 610 and the 1-2$^{th}$ vibration module 620. For example, the 1-2$^{th}$ vibration array 800 may include a 3-1$^{th}$ vibration module 810, a 3-2$^{th}$ vibration module 820, a 3-3$^{th}$ vibration module 830, and a 3-4$^{th}$ vibration module 840. However, embodiments of the present disclosure are not limited thereto, and the 1-2$^{th}$ vibration array 800 may include the 3-1$^{th}$ vibration module 810 and the 3-2$^{th}$ vibration module 820. The 1-1$^{th}$ vibration array 600 may be disposed in parallel with the 1-2$^{th}$ vibration array 800. For example, the 1-1$^{th}$ vibration array 600 and the 1-2$^{th}$ vibration array 800 may be disposed in parallel with a lengthwise direction of the display panel 100. For example, the 1-1$^{th}$ vibration array 600 and the 1-2$^{th}$ vibration array 800 may be disposed in the lengthwise direction of the display panel 100. For example, the 1-1$^{th}$ vibration array 600 and the 1-2$^{th}$ vibration array 800 may be disposed in one row in the lengthwise direction of the display panel 100. For example, the 1-1$^{th}$ vibration array 600 and the 1-2$^{th}$ vibration array 800 may be disposed in parallel with a second direction (or the Y direction) of the display panel 100.

The vibration device according to another embodiment of the present disclosure may further include a 2-1$^{th}$ vibration array 700 and a 2-2$^{th}$ vibration array 900, which are disposed on the rear surface of the display panel 100. For example, the 2-1$^{th}$ vibration array 700 and the 2-2$^{th}$ vibration array 900 may be disposed in a second region A2 of the display panel 100. For example, the 2-1$^{th}$ vibration array 700 may include a 2-1$^{th}$ vibration module 710, a 2-2$^{th}$ vibration module 720, a 2-3$^{th}$ vibration module 730, and a 2-4$^{th}$ vibration module 740. However, the present embodiment is not limited thereto, and the 2-1$^{th}$ vibration array 700 may include the 2-1$^{th}$ vibration module 710 and the 2-2$^{th}$ vibration module 720. For example, the 2-2$^{th}$ vibration array 900 may include a 4-1$^{th}$ vibration module 910, a 4-2$^{th}$ vibration module 920, a 4-3$^{th}$ vibration module 930, and a 4-4$^{th}$ vibration module 940. However, the present embodiment is not limited thereto, and the 2-2$^{th}$ vibration array 900 may include the 4-1$^{th}$ vibration module 910 and the 4-2$^{th}$ vibration module 920. The 2-1$^{th}$ vibration array 700 may be disposed in parallel with the 2-2$^{th}$ vibration array 900. For example, the 2-1$^{th}$ vibration array 700 and the 2-2$^{th}$ vibration array 900 may be disposed in parallel with the lengthwise direction of the display panel 100. For example, the 2-1$^{th}$ vibration array 700 and the 2-2$^{th}$ vibration array 900 may be disposed in the lengthwise direction of the display panel 100. For example, the 2-1$^{th}$ vibration array 700 and the 2-2$^{th}$ vibration array 900 may be disposed in one row in the lengthwise direction of the display panel 100. For example, the 2-1$^{th}$ vibration array 700 and the 2-2$^{th}$ vibration array 900 may be disposed in parallel with the second direction (or the Y direction) of the display panel 100. The 1-1$^{th}$ vibration array 600, the 2-1$^{th}$ vibration array 700, the 1-2$^{th}$ vibration array 800, and the 2-2$^{th}$ vibration array 900 are as described with reference to FIGS. 16A to 17C, and thus, their detailed descriptions are omitted. Also, the first pad member 1250-1, the second pad member 1250-2, the third pad member 1250-3, and the fourth pad member 1250-4 are as described with reference to FIGS. 17A to 19B, and thus, their detailed descriptions are omitted.

Each of a plurality of vibration modules included in each of the 1-1$^{th}$ vibration array 600, the 1-2$^{th}$ vibration array 800, the 2-1$^{th}$ vibration array 700, and the 2-2$^{th}$ vibration array 900 may include a first portion and a second portion of a piezoelectric composite 1200. With reference to FIGS. 20A and 20B, an arrangement direction of a first portion and an arrangement direction of a second portion of the piezoelectric composite 1200 may be the same, but the present embodiment is not limited thereto. For example, the arrangement direction of the first portion and the arrangement direction of the second portion in the piezoelectric composite 1200 may be the same as a widthwise direction of the display panel 100. For example, the arrangement direction of the first portion and the arrangement direction of the second portion in the piezoelectric composite 1200 may be the same as a first direction (or the X direction) of the display panel 100.

With reference to FIGS. 20A and 20B, a display apparatus according to an embodiment of the present disclosure may further include a partition 500. With reference to FIG. 20A, the partition 500 may include a first partition member 510, a second partition member 520, a third partition member 530, and a sixth partition member 560. With reference to FIG. 20B, the partition 500 may include a first partition member 510, a second partition member 520, a third partition member 530, a fourth partition member 540, and a fifth partition member 550. This is as described with reference to FIGS. 15 to 19B, and thus, their detailed descriptions are omitted.

Figure 21A:
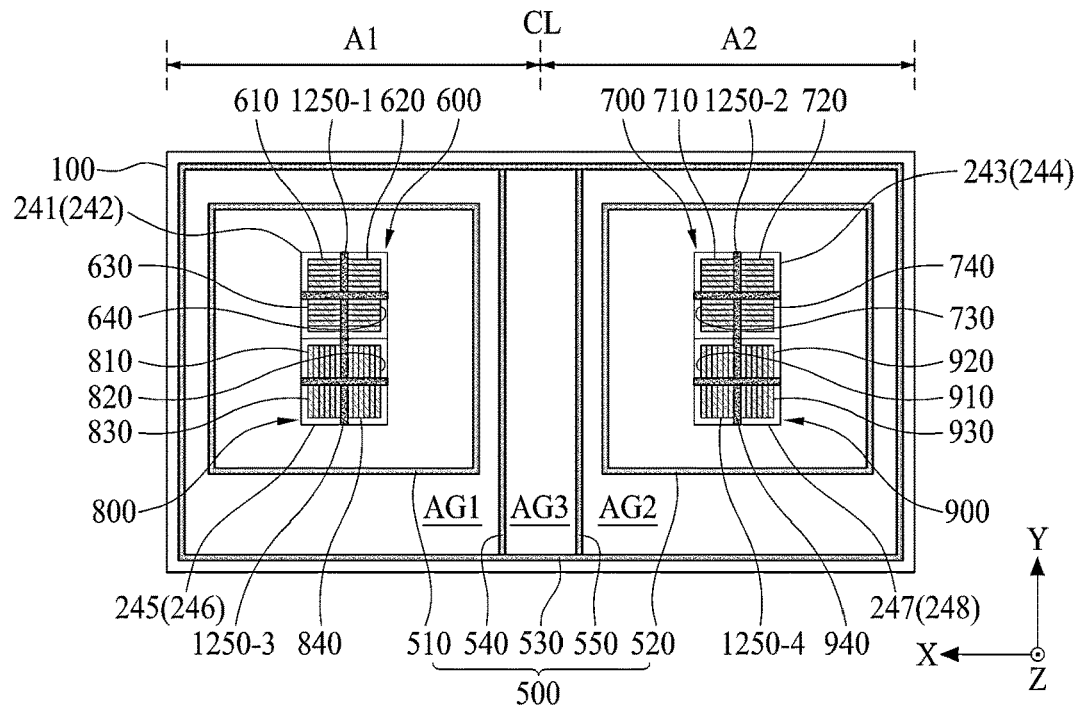
FIGS. 21A and 21B illustrate a display apparatus including a vibration device according to another embodiment of the present disclosure.
Figure 21B:
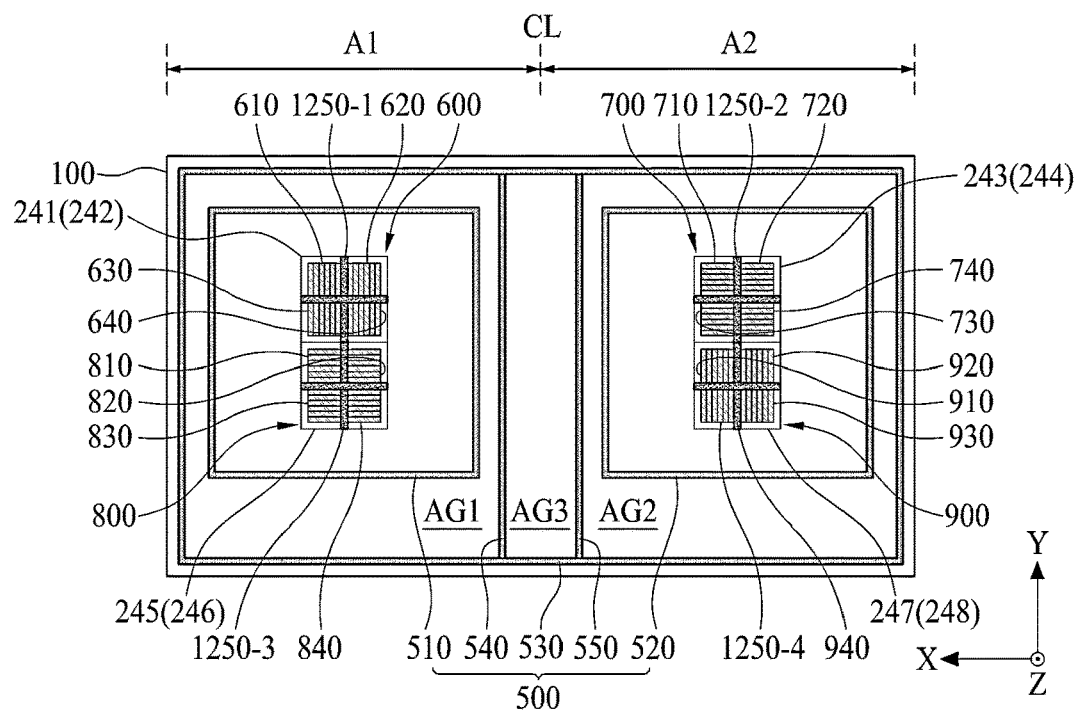

FIGS. 21A and 21B illustrate a display apparatus including a vibration device according to another embodiment of the present disclosure.

FIGS. 21A and 21B illustrate an embodiment where an arrangement direction of a first portion and an arrangement direction of a second portion of a piezoelectric composite in a vibration module differ from an arrangement direction of a first portion and an arrangement direction of a second portion of the piezoelectric composite, and descriptions which are the same as descriptions given above with reference to FIGS. 20A and 20B will be briefly given below or are omitted.

With reference to FIG. 21A, a vibration device according to another embodiment of the present disclosure may include a 1-1$^{th}$ vibration array 600 and a 1-2$^{th}$ vibration array 800, which are disposed on a rear surface of a display panel 100. The 1-1$^{th}$ vibration array 600 and the 1-2$^{th}$ vibration array 800 may be disposed in a first region A1 of the display panel 100. An arrangement direction of a first portion an arrangement direction of a first portion and of a piezoelectric composite 1200 included in the 1-1$^{th}$ vibration array 600 may differ from an arrangement direction of a first portion and an arrangement direction of a second portion of a piezoelectric composite 1200 included in the 1-2$^{th}$ vibration array 800, but embodiments of the present disclosure are not limited thereto. For example, the arrangement direction of the first portion and the arrangement direction of the second portion in the piezoelectric composite 1200 included in the 1-1$^{th}$ vibration array 600 may be the same as a widthwise direction of the display panel 100. For example, the arrangement direction of the first portion and the arrangement direction of the second portion in the piezoelectric composite 1200 included in the 1-1$^{th}$ vibration array 600 may be the same as a first direction (or the X direction) of the display panel 100. For example, the arrangement direction of the first portion and the arrangement direction of the second portion in the piezoelectric composite 1200 included in the 1-2$^{th}$ vibration array 800 may be the same as a lengthwise direction of the display panel 100. For example, the arrangement direction of the first portion and the arrangement direction of the second portion in the piezoelectric composite 1200 included in the 1-2$^{th}$ vibration array 800 may be the same as a second direction (or the Y direction) of the display panel 100.

With reference to FIG. 21A, the vibration device according to another embodiment of the present disclosure may include a 2-1$^{th}$ vibration array 700 and a 2-2$^{th}$ vibration array 900, which are disposed on the rear surface of a display panel 100. The 2-1$^{th}$ vibration array 700 and the 2-2$^{th}$ vibration array 900 may be disposed in a second region A2 of the display panel 100. An arrangement direction of a first portion and an arrangement direction of a second portion of a piezoelectric composite 1200 included in the 2-1$^{th}$ vibration array 700 may differ from an arrangement direction of a first portion and an arrangement direction of a second portion of a piezoelectric composite 1200 included in the 2-2$^{th}$ vibration array 900, but the present embodiment is not limited thereto. For example, the arrangement direction of the first portion and the arrangement direction of the second portion in the piezoelectric composite 1200 included in the 2-1$^{th}$ vibration array 700 may be the same as a widthwise direction of the display panel 100. For example, the arrangement direction of the first portion and the arrangement direction of the second portion in the piezoelectric composite 1200 included in the 2-1$^{th}$ vibration array 700 may be the same as the first direction (or the X direction) of the display panel 100. For example, the arrangement direction of the first portion and the arrangement direction of the second portion in the piezoelectric composite 1200 included in the 2-2$^{th}$ vibration array 900 may be the same as a lengthwise direction of the display panel 100. For example, the arrangement direction of the first portion and the arrangement direction of the second portion in the piezoelectric composite 1200 included in the 2-2$^{th}$ vibration array 900 may be the same as the second direction (or the Y direction) of the display panel 100.

With reference to FIG. 21B, a vibration device according to another embodiment of the present disclosure may include a 1-1$^{th}$ vibration array 600 and a 1-2$^{th}$ vibration array 800, which are disposed on a rear surface of a display panel 100. The 1-1$^{th}$ vibration array 600 and the 1-2$^{th}$ vibration array 800 may be disposed in a first region A1 of the display panel 100. An arrangement direction of a first portion and an arrangement direction of a second portion of a piezoelectric composite 1200 included in the 1-1$^{th}$ vibration array 600 may differ from an arrangement direction of a first portion and an arrangement direction of a second portion of a piezoelectric composite 1200 included in the 1-2$^{th}$ vibration array 800, but the present embodiment is not limited thereto. For example, the arrangement direction of the first portion and the arrangement direction of the second portion in the piezoelectric composite 1200 included in the 1-1$^{th}$ vibration array 600 may be the same as a lengthwise direction of the display panel 100. For example, the arrangement direction of the first portion and the arrangement direction of the second portion in the piezoelectric composite 1200 included in the 1-1$^{th}$ vibration array 600 may be the same as a second direction (or the Y direction) of the display panel 100. For example, the arrangement direction of the first portion and the arrangement direction of the second portion in the piezoelectric composite 1200 included in the 1-2$^{th}$ vibration array 800 may be the same as a widthwise direction of the display panel 100. For example, the arrangement direction of the first portion and the arrangement direction of the second portion in the piezoelectric composite 1200 included in the 1-2$^{th}$ vibration array 800 may be the same as a first direction (or the X direction) of the display panel 100.

With reference to FIG. 21B, the vibration device according to another embodiment of the present disclosure may include a 2-1$^{th}$ vibration array 700 and a 2-2$^{th}$ vibration array 900, which are disposed on the rear surface of a display panel 100. The 2-1$^{th}$ vibration array 700 and the 2-2$^{th}$ vibration array 900 may be disposed in a second region A2 of the display panel 100. An arrangement direction of a first portion and an arrangement direction of a second portion of a piezoelectric composite 1200 included in the 2-1$^{th}$ vibration array 700 may differ from an arrangement direction of a first portion an arrangement direction of a second portion of a piezoelectric composite 1200 included in the 2-2$^{th}$ vibration array 900, but the present embodiment is not limited thereto. For example, the arrangement direction of the first portion and the arrangement direction of the second portion in the piezoelectric composite 1200 included in the 2-1$^{th}$ vibration array 700 may be the same as a widthwise direction of the display panel 100. For example, the arrangement direction of the first portion and the arrangement direction of the second portion in the piezoelectric composite 1200 included in the 2-1$^{th}$ vibration array 700 may be the same as the first direction (or the X direction) of the display panel 100. For example, the arrangement direction of the first portion and the arrangement direction of the second portion in the piezoelectric composite 1200 included in the 2-2$^{th}$ vibration array 900 may be the same as a lengthwise direction of the display panel 100. For example, the arrangement direction of the first portion and the arrangement direction of the second portion in the piezoelectric composite 1200 included in the 2-2$^{th}$ vibration array 900 may be the same as the second direction (or the Y direction) of the display panel 100. However, the present embodiment is not limited thereto, and the arrangement direction of the first portion and the arrangement direction of the second portion in the piezoelectric composite 1200 included in each of the 2-1$^{th}$ vibration array 700 and the 2-2$^{th}$ vibration array 900 may be the same as the arrangement direction of the first portion and the arrangement direction of the second portion in the piezoelectric composite 1200 included in each of the 1-1$^{th}$ vibration array 600 and the 1-2$^{th}$ vibration array 800. For example, the arrangement direction of the first portion and the arrangement direction of the second portion in the piezoelectric composite 1200 included in each of the 1-1$^{th}$ vibration array 600 and the 1-2$^{th}$ vibration array 800 may be symmetric with the arrangement direction of the first portion and the arrangement direction of the second portion in the piezoelectric composite 1200 included in each of the 2-1$^{th}$ vibration array 700 and the 2-2$^{th}$ vibration array 900. As another example, the arrangement direction of the first portion and the arrangement direction of the second portion in the piezoelectric composite 1200 included in each of the 1-1$^{th}$ vibration array 600 and the 1-2$^{th}$ vibration array 800 may be asymmetric with the arrangement direction of the first portion and the arrangement direction of the second portion in the piezoelectric composite 1200 included in each of the 2-1$^{th}$ vibration array 700 and the 2-2$^{th}$ vibration array 900. For example, the arrangement direction of the first portion and the arrangement direction of the second portion in the piezoelectric composite 1200 included in the 1-1$^{th}$ vibration array 600 may differ from the arrangement direction of the first portion and the arrangement direction of the second portion in the piezoelectric composite 1200 included in the 2-1$^{th}$ vibration array 700. For example, the arrangement direction of the first portion and the arrangement direction of the second portion in the piezoelectric composite 1200 included in the 1-2$^{th}$ vibration array 800 may differ from the arrangement direction of the first portion and the arrangement direction of the second portion in the piezoelectric composite 1200 included in the 2-2$^{th}$ vibration array 900.

With reference to FIGS. 21A and 21B, a display apparatus according to an embodiment of the present disclosure may further include a partition 500. For example, the partition 500 may include a first partition member 510, a second partition member 520, a third partition member 530, a fourth partition member 540, and a fifth partition member 550. However, embodiments of the present disclosure are not limited thereto, and as described above with reference to FIG. 20A, the partition 500 may include a first partition member 510, a second partition member 520, a third partition member 530, and a sixth partition member 560. This is as described with reference to FIGS. 15 to 19B, and thus, their detailed descriptions are omitted.

Figure 22:
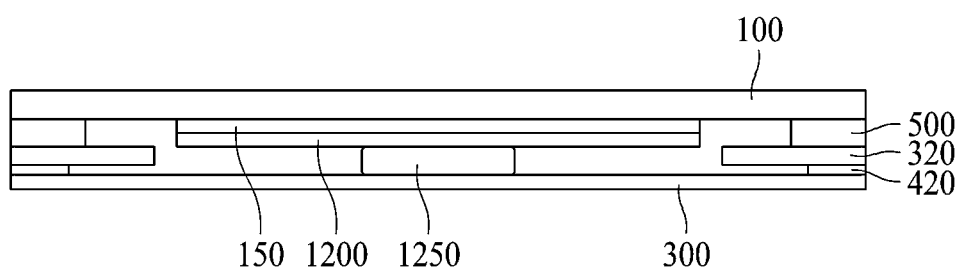
FIG. 22 illustrates a display apparatus according to another embodiment of the present disclosure.

FIG. 22 illustrates a display apparatus according to another embodiment of the present disclosure.

With reference to FIG. 22, the display apparatus according to another embodiment of the present disclosure may include a piezoelectric composite 1200, a pad member 1250, a supporting member 300, and a partition 500.

For example, the piezoelectric composite 1200 may be disposed on a rear surface of a display panel 100. The piezoelectric composite 1200 may be disposed on the rear surface of the display panel 100 by an adhesive member 150. The supporting member 300 may be disposed on the rear surface of the display panel 100. The pad member 1250 may be disposed on the rear surface of the piezoelectric composite 1200. For example, the pad member 1250 may be disposed between the piezoelectric composite 1200 and the supporting member 300.

The partition 500 may be disposed between the display panel 100 and the supporting member 300. A second supporting member 320 may be further disposed between the display panel 100 and the supporting member 300. The supporting member 300 may include a glass material. For example, the glass material may be sapphire glass, but embodiments are not limited thereto. The second supporting member 320 may be a metal material. For example, the metal material may include one material of Al, an A1 alloy, a Mg, a Mg alloy, and a Fe—Ni alloy, but is not limited thereto. The second supporting member 320 may be an inner plate, but the terms are not limited thereto. For example, the second supporting member 320 may secure a stiffness of the display panel 100 and may dissipate heat occurring in driving of the display panel 100. As another example, the second supporting member 320 may be omitted. The supporting member 300 may be attached on the second supporting member 320 by a second adhesive member 420. The second adhesive member 420 may include epoxy, acryl, silicone, or urethane, but embodiments are not limited thereto.

Therefore, because a pad member is provided between a plurality of vibration modules configuring a vibration array, a resonance frequency generated between the plurality of vibration modules may be controlled, thereby providing a display apparatus having an enhanced sound output characteristic.

Figure 23:
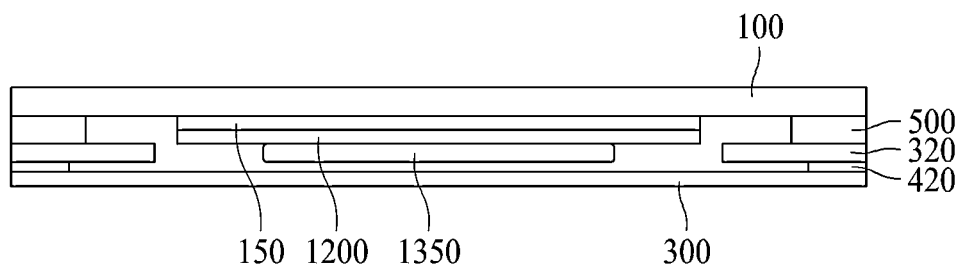
FIG. 23 illustrates a display apparatus according to another embodiment of the present disclosure.

FIG. 23 illustrates a display apparatus according to another embodiment of the present disclosure.

With reference to FIG. 23, the display apparatus according to another embodiment of the present disclosure may include a piezoelectric composite 1200, a pad member 1350, a supporting member 300, and a partition 500.

The pad member 1350 according to another embodiment of the present disclosure may be disposed on a rear surface of the piezoelectric composite 1200. For example, the pad member 1350 may include the same material as that of the piezoelectric composite 1200. With reference to FIG. 17A, the pad member 1350 may be disposed at a position at which the first pad member 1250-1 is disposed. For example, the pad member 1350 may be connected to the rear surface of the piezoelectric composite 1200, and spaced apart from the supporting member 300. The pad member 1350 may be a resonance control element, a resonance controller, or a resonance pad, but the terms are not limited thereto. The pad member 1350 may be disposed between vibration modules of the $1\text{-}1^{th}$ vibration array 600. For example, the pad member 1350 may be disposed between the $1\text{-}1^{th}$ vibration module 610, the $1\text{-}2^{th}$ vibration module 620, the $1\text{-}3^{th}$ vibration module 630, and the $1\text{-}4^{th}$ vibration module 640 arranged in the $1\text{-}1^{th}$ vibration array 600. For example, a size of the pad member 1350 may be greater than or equal to a size of a boundary region between the $1\text{-}1^{th}$ vibration module 610, the $1\text{-}2^{th}$ vibration module 620, the $1\text{-}3^{th}$ vibration module 630, and the $1\text{-}4^{th}$ vibration module 640. Also, the pad member 1350 may be further disposed between vibration modules of each of the $1\text{-}2^{th}$ vibration array 800, the $2\text{-}1^{th}$ vibration array 700, and the $2\text{-}2^{th}$ vibration array 900.

For example, the pad member 1350 may include the same material as that of the piezoelectric composite 1200. In a case where the pad member 1350 includes the same material as that of the piezoelectric composite 1200, a level of a signal applied to the pad member 1350 may be adjusted, and thus, a resonance of the vibration device may be easily controlled. For example, a plurality of second portions included in the piezoelectric composite 1200 may be disposed at edges of the $1\text{-}1^{th}$ vibration module 610, the $1\text{-}2^{th}$ vibration module 620, the $1\text{-}3^{th}$ vibration module 630, and the $1\text{-}4^{th}$ vibration module 640. For example, the pad member 1350 disposed between the $1\text{-}1^{th}$ vibration module 610, the $1\text{-}2^{th}$ vibration module 620, the $1\text{-}3^{th}$ vibration module 630, and the $1\text{-}4^{th}$ vibration module 640 may be disposed on a plurality of first portions and a plurality of second portions included in the piezoelectric composite 1200.

Figure 24:
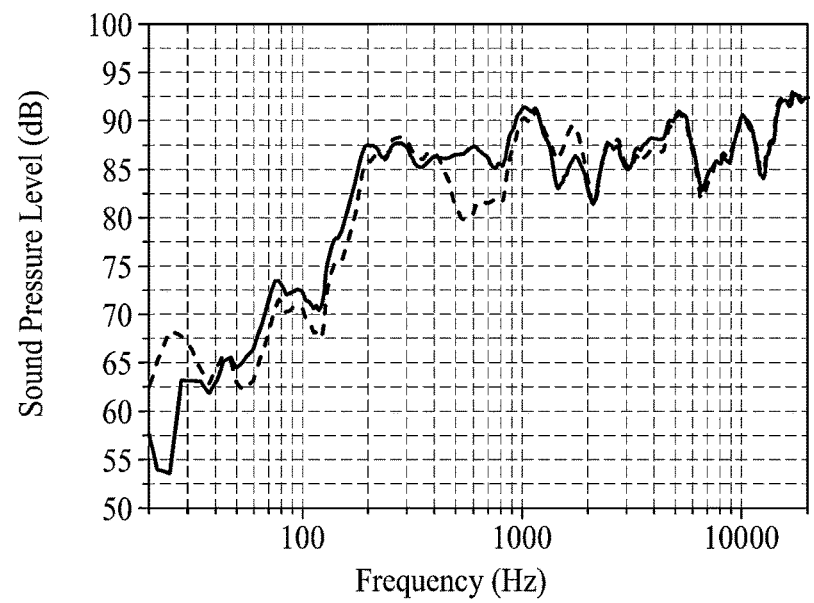
FIG. 24 illustrates a sound output characteristic of a display apparatus according to another embodiment of the present disclosure.

FIG. 24 illustrates a sound output characteristic of a display apparatus according to another embodiment of the present disclosure.

A sound output characteristic may be measured by a sound analysis apparatus. The sound analysis apparatus may include a sound card which transmits or receives a sound to or from a control personal computer (PC), an amplifier which amplifies a signal generated from the sound card and transfers the amplified signal to the sound generating module, and a microphone which collects a sound generated by a vibration device in a display panel. The sound collected through the microphone may be input to the control PC through the sound card, and a control program may check the input sound to analyze the sounds of the vibration device.

A dotted line of FIG. 24 shows a sound output characteristic of a display apparatus to which FIG. 16A is applied. A solid line of FIG. 24 shows a sound output characteristic of a display apparatus to which FIG. 17A is applied. FIG. 24, the abscissa axis represents a frequency (Hz), and the ordinate axis represents a sound pressure level (SPL) (dB).

With reference to FIG. 24, comparing with a display apparatus according to a dotted line, in a display apparatus including a pad member according to an embodiment of the present disclosure, it may be seen that a dip phenomenon is reduced in a frequency of about 600 Hz. For example, it may be seen that a sound pressure level in a frequency of about 600 Hz is about 80 dB to about 82 dB when a pad member is not applied, and when the pad member is applied, a sound pressure level in a frequency of about 600 Hz is about 87 dB. For example, when the pad member is not applied, it may be seen that a sound pressure level in a frequency of the middle-pitched sound band decreases by about 5 dB to about 7 dB in a boundary portion of a vibration module. On the other hand, when the pad member is applied, it may be seen that a sound pressure level in a frequency of the middle-pitched sound band increases by about 5 dB or more in the boundary portion of the vibration module. For example, when the pad member is applied, it may be seen that a sound pressure level in a frequency of the middle-pitched sound band increases by about 5 dB or more in a boundary portion of a center portion of the vibration module. For example, when the pad member is applied, it may be seen that a sound pressure level in a frequency of the middle-pitched sound band increases by about 5 dB or more.

For example, it may be seen that resonance intensity is about 60 µm/s in the boundary portion of the vibration module when the pad member is not applied, but when the pad member is applied, resonance intensity is about 20 µm/s in the boundary portion of the vibration module and resonance or reverse resonance decreases by about 66%. Resonance intensity is for measuring a displacement of a display panel, which occurs by applying a signal to the vibration module, by using a laser Doppler measurer. Therefore, as the pad member is provided between adjacent vibration modules, a dip phenomenon where a sound pressure level bounces or a degradation in sound quality may decrease in a specific frequency band, and thus, flatness of a sound pressure level may be enhanced, thereby providing a display apparatus where a sound pressure level is enhanced in the middle-pitched sound band.

Figure 25:
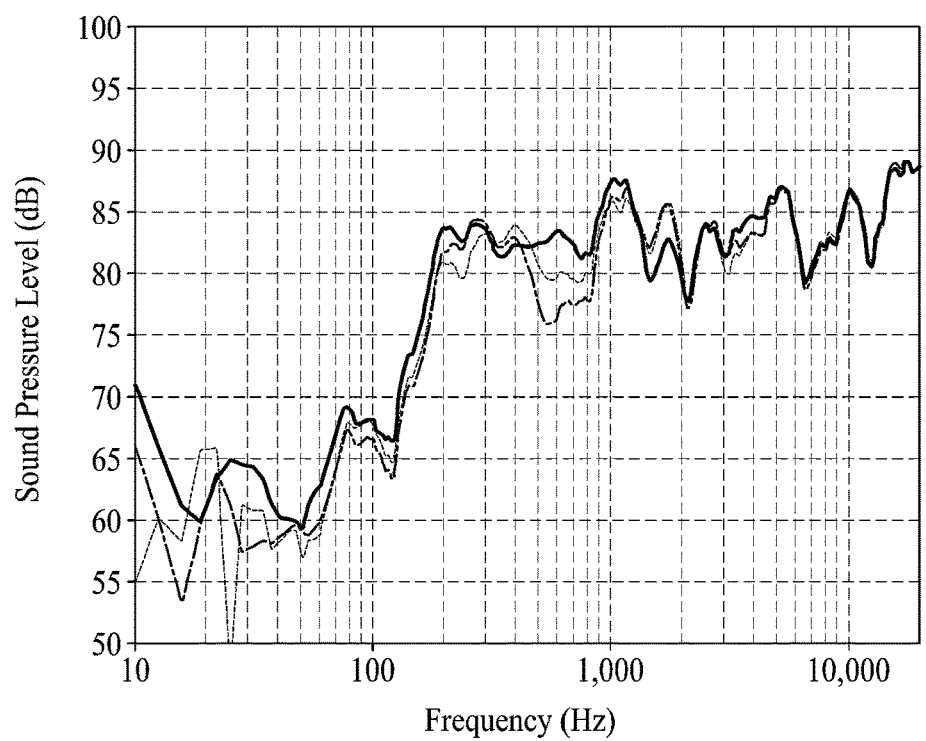
FIG. 25 illustrates a sound output characteristic of a display apparatus according to another embodiment of the present disclosure.

FIG. 25 illustrates a sound output characteristic of a display apparatus according to another embodiment of the present disclosure. Measuring of a sound output characteristic is as described above with reference to FIG. 24, and thus, its detailed description is omitted.

FIG. 25 shows a result obtained by measuring a sound output characteristic of a display apparatus to which FIG. 16A is applied. A one-dot-dashed line of FIG. 25 represents an example where a voltage of 0 V is applied to the pad member 1350 of FIG. 23, a dotted line represents an example where a voltage of 10 V is applied to the pad member 1350, and a solid line represents an example where a voltage of 20 V is applied to the pad member 1350. A voltage of 10 V has been applied to the piezoelectric composite 1200.

With reference to FIG. 25, it may be seen that a frequency characteristic varies based on a voltage applied to a pad member. For example, in a one-dot-dashed line representing a case where a voltage is not applied to the pad member, it may be seen that a dip phenomenon appears in the middle-pitched sound band. Also, in a dotted line representing a case where the same voltage as a voltage applied to a piezoelectric composite is applied to the pad member, it may be seen that a dip phenomenon appears in the middle-pitched sound band. For example, comparing with a case where a voltage is not applied to the pad member, it may be seen that a dip phenomenon decreases in a case where the same voltage as a voltage applied to the piezoelectric composite is applied to the pad member. Also, in a case where the same voltage as a voltage applied to the piezoelectric composite is applied to the pad member, a dip phenomenon may be reduced by a signal caused by destructive interference. In a solid line representing a case where a voltage applied to the pad member differs from a voltage applied to the piezoelectric composite, it may be seen that a dip phenomenon decreases in the middle-pitched sound band. In a case where a voltage applied to the pad member differs from a voltage applied to the piezoelectric composite, a dip phenomenon may be reduced by a signal caused by constructive interference. For example, in a case where a voltage applied to the pad member is higher than a voltage applied to the piezoelectric composite, it may be seen that a dip phenomenon decreases in the middle-pitched sound band. Therefore, as the pad member is provided between adjacent vibration modules, it may be seen that a dip phenomenon decreases in the middle-pitched sound band. For example, as the pad member is provided between adjacent vibration modules, it may be seen that a sound pressure level in a frequency of the middle-pitched sound band increases by about 5 dB to about 7 dB. For example, as the pad member including the same material as that of the piezoelectric composite is provided between adjacent vibration modules, it may be seen that a dip phenomenon decreases in the middle-pitched sound band. For example, as the pad member including the same material as that of the piezoelectric composite is provided between adjacent vibration modules and a voltage differing from a voltage applied to the piezoelectric composite is applied to the pad member, it may be seen that a dip phenomenon decreases in the middle-pitched sound band. Accordingly, as the pad member is provided between adjacent vibration modules, a dip phenomenon where a sound pressure level bounces or a degradation in sound quality may decrease in a specific frequency band, and thus, flatness of a sound pressure level may be enhanced, thereby providing a display apparatus where a sound pressure level is enhanced in the middle-pitched sound band.

The vibration device according to an embodiment of the present disclosure may be applied to a vibration device disposed on a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration device according to the present disclosure may be applied to organic light emitting lighting apparatuses or inorganic light emitting lighting apparatuses. When a vibration device or a sound generating device of the present disclosure is applied to a lighting apparatuses, the vibration device or the sound generating device may act as lighting and a speaker. Also, when the display apparatus of the present disclosure is applied to a mobile device, the vibration module may act as one or more of a speaker, a receiver, and a haptic, but embodiments of the present disclosure are not limited thereto.

A display apparatus according to an embodiment of the present disclosure will be described below.

According to an embodiment of the present disclosure, a display apparatus may include: a display panel configured to display an image, and a vibration device on a rear surface of the display panel to vibrate the display panel to generate a sound, the vibration device including a vibration array including a plurality of vibration modules.

According to some embodiments of the present disclosure, the display apparatus may further include a pad member between the plurality of vibration modules.

According to some embodiments of the present disclosure, the vibration array may include N (where N is a natural number of 2 or more) or more vibration modules.

According to some embodiments of the present disclosure, each of the plurality of vibration modules may include a plurality of first portion, and a plurality of second portion between the plurality of first portions.

According to some embodiments of the present disclosure, an arrangement direction of the at least one first portion and an arrangement direction of the at least one second portion may be the same as a widthwise direction or a lengthwise direction of the display panel.

According to some embodiments of the present disclosure, the first portion may include an inorganic material, and the second portion may include an organic material.

According to some embodiments of the present disclosure, each of the plurality of vibration modules may include a first electrode on the first portion and the second portion, and a second electrode under the first portion and the second portion.

According to some embodiments of the present disclosure, each of the plurality of vibration modules may include a first electrode on the first portion and the second portion, a second electrode under the first portion and the second portion, a first protection layer on the first electrode, and a second protection layer under the second electrode.

According to some embodiments of the present disclosure, the pad member may include an adhesive.

According to some embodiments of the present disclosure, the pad member may include the same material as a material of each of the plurality of vibration modules.

According to some embodiments of the present disclosure, the display apparatus may further include an adhesive member, by which the vibration device is attached to the rear surface of the display panel, the adhesive member may include a hollow portion between the display panel and the vibration device for providing an air gap between the display panel and the vibration device.

According to some embodiments of the present disclosure, the first portion may have a line pattern having a predetermined first width and the second portion may have a line pattern having a predetermined second width, the first width may be equal to or different from the second width.

According to some embodiments of the present disclosure, the second portion may have a modulus and viscoelasticity that are lower than those of the first portion.

According to some embodiments of the present disclosure, the second portion may include a material having a loss coefficient of 0.01 to about 1.0 and a modulus of 1 to 10 Gpa.

According to some embodiments of the present disclosure, a width of the second portion progressively may decrease in a direction from a center portion to both peripheries of the vibration device.

According to some embodiments of the present disclosure, the first portion may have a circular shape and the second portion surrounds the first portion.

According to an embodiment of the present disclosure, a display apparatus may include: a display panel configured to display an image and including a first region and a second region, a first vibration array in the first region, the first vibration array including a plurality of first vibration modules, and a second vibration array in the second region, the second vibration array including a plurality of second vibration modules.

According to some embodiments of the present disclosure, the display apparatus may further include a first pad member between the plurality of first vibration modules, and a second pad member between the plurality of second vibration modules.

According to some embodiments of the present disclosure, the first vibration array may include a $1\text{-}1^{th}$ vibration array and a $1\text{-}2^{th}$ vibration array, and the $1\text{-}1^{th}$ vibration array and the $1\text{-}2^{th}$ vibration array may be alternately disposed.

According to some embodiments of the present disclosure, the second vibration array may include a $2\text{-}1^{th}$ vibration array and a $2\text{-}2^{th}$ vibration array, and the $2\text{-}1^{th}$ vibration array and the $2\text{-}2^{th}$ vibration array may be alternately disposed.

According to some embodiments of the present disclosure, the first vibration array may include a $1\text{-}1^{th}$ vibration array and a $1\text{-}2^{th}$ vibration array, the second vibration array may include a $2\text{-}1^{th}$ vibration array and a $2\text{-}2^{th}$ vibration array, and the $1\text{-}2^{th}$ vibration array and the $2\text{-}2^{th}$ vibration array may be disposed between the $1\text{-}1^{th}$ vibration array and the $2\text{-}1^{th}$ vibration array.

According to some embodiments of the present disclosure, the first vibration array may include a $1\text{-}1^{th}$ vibration array and a $1\text{-}2^{th}$ vibration array, and the $1\text{-}1^{th}$ vibration array and the $1\text{-}2^{th}$ vibration array may be disposed in a lengthwise direction of the display panel.

According to some embodiments of the present disclosure, the first vibration array may include a $1\text{-}1^{th}$ vibration array and a $1\text{-}2^{th}$ vibration array, the second vibration array may include a $2\text{-}1^{th}$ vibration array and a $2\text{-}2^{th}$ vibration array, the $1\text{-}1^{th}$ vibration array and the $1\text{-}2^{th}$ vibration array may be disposed in a lengthwise direction of the display panel, and the $2\text{-}1^{th}$ vibration array and the $2\text{-}2^{th}$ vibration array may be disposed in the lengthwise direction of the display panel.

According to some embodiments of the present disclosure, the first vibration array may include a $1\text{-}1^{th}$ vibration array and a $1\text{-}2^{th}$ vibration array, the $1\text{-}1^{th}$ vibration array may include the plurality of first vibration modules, the $1\text{-}2^{th}$ vibration array may include a plurality of third vibration modules, and each of the plurality of first vibration modules and the plurality of third vibration modules may include one composite (or one-piece composite) including a plurality of first portions and a plurality of second portions between the plurality of first portions.

According to some embodiments of the present disclosure, an arrangement direction of the plurality of first portions and an arrangement direction of the plurality of second portions in the plurality of first vibration modules may differ from an arrangement direction of the plurality of first portions and an arrangement direction of the plurality of second portions in the plurality of second vibration modules.

According to some embodiments of the present disclosure, in each of the plurality of first vibration modules and the plurality of third vibration modules, an arrangement direction of the plurality of first portions and an arrangement direction of the plurality of second portions may be the same as a widthwise direction or a lengthwise direction of the display panel.

According to some embodiments of the present disclosure, the second vibration array may include a $2\text{-}1^{th}$ vibration array and a $2\text{-}2^{th}$ vibration array, the $2\text{-}1^{th}$ vibration array may include the plurality of second vibration modules, the $2\text{-}2^{th}$ vibration array may include a plurality of fourth vibration modules, and each of the plurality of second vibration modules and the plurality of fourth vibration modules may include one composite (or one-piece composite) including a plurality of first portions and a plurality of second portions between the plurality of first portions.

According to some embodiments of the present disclosure, an arrangement direction of the plurality of first portions and an arrangement direction of the plurality of second portions in the plurality of second vibration modules may differ from an arrangement direction of the plurality of first portions and an arrangement direction of the plurality of second portions in the plurality of fourth vibration modules.

According to some embodiments of the present disclosure, in each of the plurality of second vibration modules and the plurality of fourth vibration modules, an arrangement direction of the plurality of first portions and an arrangement direction of the plurality of second portions may be the same as a widthwise direction or a lengthwise direction of the display panel.

According to some embodiments of the present disclosure, each of the plurality of first vibration modules and the plurality of second vibration modules may include one composite (or one-piece composite) including a plurality of first portions and a plurality of second portions between the plurality of first portions.

According to some embodiments of the present disclosure, an arrangement direction of the plurality of first portions and an arrangement direction of the plurality of second portions in the plurality of first vibration modules may differ from an arrangement direction of the plurality of first portions and an arrangement direction of the plurality of second portions in the plurality of second vibration modules.

According to some embodiments of the present disclosure, an arrangement direction of the plurality of first portions and an arrangement direction of the plurality of second portions in each of the plurality of first vibration modules and the plurality of second vibration modules may be the same as a widthwise direction or a lengthwise direction of the display panel.

According to some embodiments of the present disclosure, each of the plurality of first vibration modules and the plurality of second vibration modules may include a first electrode on the plurality of first portions and the plurality of second portions, and a second electrode under the plurality of first portions and the plurality of second portions.

According to some embodiments of the present disclosure, each of the plurality of first vibration modules and the plurality of second vibration modules may include a first electrode on the plurality of first portions and the plurality of second portions, a second electrode under the plurality of first portions and the plurality of second portions, a first protection layer on the first electrode, and a second protection layer under the second electrode.

According to some embodiments of the present disclosure, the display apparatus may further include a first partition member surrounding the first vibration array, and a second partition member surrounding the second vibration array.

According to some embodiments of the present disclosure, the display apparatus may further include a first partition member surrounding the first vibration array, a second partition member surrounding the second vibration array, and a third partition member surrounding the first partition member and the second partition member.

According to some embodiments of the present disclosure, the display apparatus may further include a first partition member surrounding the first vibration array, a second partition member surrounding the second vibration array, and one or more fourth partition members between the first region and the second region.

According to some embodiments of the present disclosure, the display apparatus may further include a first partition member surrounding the first vibration array, a second partition member surrounding the second vibration array, a third partition member surrounding the first partition member and the second partition member, and one or more fourth partition members between the first region and the second region.

According to some embodiments of the present disclosure, each of the first pad member and the second pad member may include an adhesive.

According to some embodiments of the present disclosure, the first pad member and the second pad member may include the same material as a material of one of the plurality of first vibration modules and the plurality of second vibration modules.

According to some embodiments of the present disclosure, the first portion may have a line pattern having a predetermined first width and the second portion may have a line pattern having a predetermined second width, the first width may be equal to or different from the second width.

According to some embodiments of the present disclosure, the second portion may have a modulus and viscoelasticity that are lower than those of the first portion.

According to some embodiments of the present disclosure, the second portion may include a material having a loss coefficient of 0.01 to about 1.0 and a modulus of 1 to 10 Gpa.

According to some embodiments of the present disclosure, a width of the second portion progressively may decrease in a direction from a center portion to both peripheries of the vibration device.

A display apparatus according to embodiments of the present disclosure may include a vibration device which vibrates a display panel or a vibration plate, and thus, may generate a sound so that a traveling direction of the sound of the display apparatus or apparatus is a direction toward a front surface of the display panel or the vibration plate.

According to embodiments of the present disclosure, a pad member may be provided between adjacent vibration modules, thereby providing a display apparatus or an apparatus having an enhanced sound output characteristic.

It will be apparent to those skilled in the art that various modifications and variations can be made in the vibration device and the display apparatus of the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:
1. A display apparatus, comprising:
a display panel configured to display an image;
a vibration device on a rear surface of the display panel to vibrate the display panel to generate a sound, the vibration device including:
   a vibration array including a plurality of vibration modules; and
   a pad member between the plurality of vibration modules in a plan view and disposed at a rear surface of the vibration array; and
a partition member on the rear surface of the display panel, the partition member surrounding the vibration array and the pad member in the plan view,
wherein the pad member includes a different material from a material of the partition member.

2. The display apparatus of claim 1, wherein the vibration array comprises N (where N is a natural number of 2 or more) or more vibration modules.

3. The display apparatus of claim 1, wherein each of the plurality of vibration modules comprises:
a plurality of first portions; and
a plurality of second portions between the plurality of first portions.

4. The display apparatus of claim 3, wherein an arrangement direction of the at least one first portion and an arrangement direction of the at least one second portion are the same as a widthwise direction or a lengthwise direction of the display panel.

5. The display apparatus of claim 3, wherein:
the first portions comprise an inorganic material, and
the second portions comprise an organic material.

6. The display apparatus of claim 3, wherein each of the plurality of vibration modules comprises:
a first electrode on a front surface of the first portions and the second portions; and
a second electrode on a rear surface of the first portions and the second portions.

7. The display apparatus of claim 3, wherein each of the plurality of vibration modules comprises:
a first electrode on a front surface of the first portions and the second portions;
a second electrode on a rear surface of the first portions and the second portions;
a first protection layer on a front surface of the first electrode; and
a second protection layer on a rear surface of the second electrode.

8. The display apparatus of claim 3, wherein the first portions have a line pattern having a predetermined first width, and the second portions have a line pattern having a predetermined second width, the first width being equal to or different from the second width.

9. The display apparatus of claim 8, wherein the second portions have a modulus and viscoelasticity that are lower than those of the first portions.

10. The display apparatus of claim 9, wherein the second portions include a material having a loss coefficient of 0.01 to about 1.0 and a modulus of 1 to 10 GPa.

11. The display apparatus of claim 3, wherein a width of the second portions progressively decreases in a direction from a center portion to both peripheries of the vibration device.

12. The display apparatus of claim 1, wherein the pad member comprises an adhesive.

13. The display apparatus of claim 1, wherein the pad member comprises the same material as a material of each of the plurality of vibration modules.

14. The display apparatus of claim 1, further comprising:
an adhesive member, by which the vibration device is attached to the rear surface of the display panel,
wherein the adhesive member includes a hollow portion between the display panel and the vibration device for providing an air gap between the display panel and the vibration device.

15. The display apparatus of claim 1, wherein the first portions have a circular shape, and the second portions respectively surround the first portions.

16. The display apparatus of claim 1, wherein the first vibration array includes:
a first protection layer on the plurality of first vibration modules;
a second protection layer under the plurality of first vibration modules; and
a connection member between the first protection layer and the second protection layer and between the plurality of first vibration modules and the first protection layer.

17. A display apparatus, comprising:
a display panel configured to display an image and including a first region and a second region;
a first vibration array in the first region, the first vibration array including a plurality of first vibration modules;
a second vibration array in the second region, the second vibration array including a plurality of second vibration modules;
a first pad member between the plurality of first vibration modules in a plan view and disposed at a rear surface of the first vibration array;
a second pad member between the plurality of second vibration modules in the plan view and disposed at a rear surface of the second vibration array; and
a partition at least partially disposed between the first vibration array and the second vibration array in the plan view,
wherein the first pad member and the second pad member include a different material from a material of the partition.

18. The display apparatus of claim 17, wherein:
the first vibration array comprises a $1\text{-}1^{th}$ vibration array and a $1\text{-}2^{th}$ vibration array, and
the $1\text{-}1^{th}$ vibration array and the $1\text{-}2^{th}$ vibration array are alternately disposed.

19. The display apparatus of claim 17, wherein:
the second vibration array comprises a $2\text{-}1^{th}$ vibration array and a $2\text{-}2^{th}$ vibration array, and
the $2\text{-}1^{th}$ vibration array and the $2\text{-}2^{th}$ vibration array are alternately disposed.

20. The display apparatus of claim 17, wherein:
the first vibration array comprises a $1\text{-}1^{th}$ vibration array and a $1\text{-}2^{th}$ vibration array,
the second vibration array comprises a $2\text{-}1^{th}$ vibration array and a $2\text{-}2^{th}$ vibration array, and
the $1\text{-}2^{th}$ vibration array and the $2\text{-}2^{th}$ vibration array are disposed between the $1\text{-}1^{th}$ vibration array and the $2\text{-}1^{th}$ vibration array.

21. The display apparatus of claim 17, wherein:
the first vibration array comprises a $1\text{-}1^{th}$ vibration array and a $1\text{-}2^{th}$ vibration array, and
the $1\text{-}1^{th}$ vibration array and the $1\text{-}2^{th}$ vibration array are disposed in a lengthwise direction of the display panel.

22. The display apparatus of claim 17, wherein:
the first vibration array comprises a $1\text{-}1^{th}$ vibration array and a $1\text{-}2^{th}$ vibration array,
the second vibration array comprises a $2\text{-}1^{th}$ vibration array and a $2\text{-}2^{th}$ vibration array,
the $1\text{-}1^{th}$ vibration array and the $1\text{-}2^{th}$ vibration array are disposed in a lengthwise direction of the display panel, and
the $2\text{-}1^{th}$ vibration array and the $2\text{-}2^{th}$ vibration array are disposed in the lengthwise direction of the display panel.

23. The display apparatus of claim 17, wherein:
the first vibration array comprises a $1\text{-}1^{th}$ vibration array and a $1\text{-}2^{th}$ vibration array,
the $1\text{-}1^{th}$ vibration array comprises the plurality of first vibration modules,
the $1\text{-}2^{th}$ vibration array comprises a plurality of third vibration modules, and each of the plurality of first vibration modules and the plurality of third vibration modules comprises one composite including a plurality of first portions and a plurality of second portions between the plurality of first portions.

24. The display apparatus of claim 23, wherein an arrangement direction of the plurality of first portions and an arrangement direction of the plurality of second portions in the plurality of first vibration modules differ from an arrangement direction of the plurality of first portions and an arrangement direction of the plurality of second portions in the plurality of third vibration modules.

25. The display apparatus of claim 23, wherein, in each of the plurality of first vibration modules and the plurality of third vibration modules, an arrangement direction of the plurality of first portions and an arrangement direction of the plurality of second portions are the same as a widthwise direction or a lengthwise direction of the display panel.

26. The display apparatus of claim 23, wherein each of the plurality of first portions has a line pattern having a predetermined first width, and each of the plurality of second portions has a line pattern having a predetermined second width, the first width being equal to or different from the second width.

27. The display apparatus of claim 23, wherein each of the plurality of second portions has a modulus and viscoelasticity that are lower than those of each of the plurality of first portions.

28. The display apparatus of claim 27, wherein each of the plurality of second portions includes a material having a loss coefficient of 0.01 to about 1.0 and a modulus of 1 to 10 GPa.

29. The display apparatus of claim 23, wherein a width of the plurality of second portions progressively decreases in a direction from a center portion to both peripheries of the first vibration array or the second vibration array.

30. The display apparatus of claim 17, wherein:
the second vibration array comprises a 2-1$^{th}$ vibration array and a 2-2$^{th}$ vibration array,
the 2-1$^{th}$ vibration array comprises the plurality of second vibration modules,
the 2-2$^{th}$ vibration array comprises a plurality of fourth vibration modules, and
each of the plurality of second vibration modules and the plurality of fourth vibration modules comprises one composite including a plurality of first portions and a plurality of second portions between the plurality of first portions.

31. The display apparatus of claim 30, wherein an arrangement direction of the plurality of first portions and an arrangement direction of the plurality of second portions in the plurality of second vibration modules differ from an arrangement direction of the plurality of first portions and an arrangement direction of the plurality of second portions in the plurality of fourth vibration modules.

32. The display apparatus of claim 30, wherein, in each of the plurality of second vibration modules and the plurality of fourth vibration modules, an arrangement direction of the plurality of first portions and an arrangement direction of the plurality of second portions are the same as a widthwise direction or a lengthwise direction of the display panel.

33. The display apparatus of claim 17, wherein the partition includes:
a first partition member surrounding the first vibration array and the first pad member in the plan view; and
a second partition member surrounding the second vibration array and the second pad member in the plan view.

34. The display apparatus of claim 17, wherein the partition includes:
a first partition member surrounding the first vibration array and the first pad member in the plan view;
a second partition member surrounding the second vibration array and the second pad member in the plan view; and
a third partition member surrounding the first partition member and the second partition member.

35. The display apparatus of claim 17, wherein the partition includes:
a first partition member surrounding the first vibration array and the first pad member in the plan view;
a second partition member surrounding the second vibration array and the second pad member in the plan view; and
one or more fourth partition members between the first region and the second region.

36. The display apparatus of claim 17, wherein the partition includes:
a first partition member surrounding the first vibration array and the first pad member in the plan view;
a second partition member surrounding the second vibration array and the second pad member in the plan view;
a third partition member surrounding the first partition member and the second partition member; and
one or more fourth partition members between the first region and the second region.

37. The display apparatus of claim 17, wherein each of the first pad member and the second pad member comprises an adhesive.

38. The display apparatus of claim 17, wherein the first pad member and the second pad member comprise the same material as a material of one of the plurality of first vibration modules and the plurality of second vibration modules.

39. The display apparatus of claim 17, wherein the vibration array includes:
a first protection layer on the plurality of vibration modules;
a second protection layer under the plurality of vibration modules; and
a connection member between the first protection layer and the second protection layer and between the first protection layer and the plurality of vibration modules.

40. A display apparatus, comprising:
a display panel configured to display an image and including a first region and a second region;
a first vibration array in the first region, the first vibration array including a plurality of first vibration modules;
a second vibration array in the second region, the second vibration array including a plurality of second vibration modules;
a first pad member between the plurality of first vibration modules in a plan view and disposed at a rear surface of the first vibration array; and
a second pad member between the plurality of second vibration modules in the plan view and disposed at a rear surface of the second vibration array,
wherein each of the plurality of first vibration modules and the plurality of second vibration modules comprises one composite including a plurality of first portions and a plurality of second portions between the plurality of first portions,
wherein an arrangement direction of the plurality of first portions and an arrangement direction of the plurality of second portions in the plurality of first vibration modules differ from an arrangement direction of the plurality of first portions and an arrangement direction of the plurality of second portions in the plurality of second vibration modules.

41. The display apparatus of claim 40,
wherein the arrangement direction of the plurality of first portions and the arrangement direction of the plurality of second portions in each of the plurality of first vibration modules and the plurality of second vibration modules are the same as a widthwise direction or a lengthwise direction of the display panel.

42. The display apparatus of claim 40, wherein each of the plurality of first vibration modules and the plurality of second vibration modules comprises:
   a first electrode on the plurality of first portions and the plurality of second portions; and
   a second electrode under the plurality of first portions and the plurality of second portions.

43. The display apparatus of claim 40, wherein each of the plurality of first vibration modules and the plurality of second vibration modules comprises:
   a first electrode on the plurality of first portions and the plurality of second portions;
   a second electrode under the plurality of first portions and the plurality of second portions;
   a first protection layer on the first electrode; and
   a second protection layer under the second electrode.

* * * * *